United States Patent
Shao et al.

(10) Patent No.: US 10,587,378 B2
(45) Date of Patent: Mar. 10, 2020

(54) DOWNLINK INFORMATION PROCESSING METHOD, USER EQUIPMENT, BASE STATION, AND COMMUNICATIONS SYSTEM

(71) Applicant: HUAWEI TECHNOLOGIES CO., LTD., Shenzhen, Guangdong (CN)

(72) Inventors: Jiafeng Shao, Beijing (CN); Sha Ma, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 69 days.

(21) Appl. No.: 15/895,712

(22) Filed: Feb. 13, 2018

(65) Prior Publication Data
US 2018/0175987 A1    Jun. 21, 2018

Related U.S. Application Data

(63) Continuation of application No. PCT/CN2015/087090, filed on Aug. 14, 2015.

(51) Int. Cl.
*H04L 5/00* (2006.01)
*H04W 74/00* (2009.01)
(Continued)

(52) U.S. Cl.
CPC ............ *H04L 5/0048* (2013.01); *H04L 5/005* (2013.01); *H04L 5/0035* (2013.01);
(Continued)

(58) Field of Classification Search
CPC ... H04L 5/0048; H04L 5/0073; H04L 5/0035; H04L 5/0053; H04L 5/0051; H04L 5/005;
(Continued)

(56) References Cited

U.S. PATENT DOCUMENTS

2009/0232095 A1\* 9/2009 Ahn ................. H04W 74/006
370/331
2010/0023882 A1   1/2010 Jackson
(Continued)

FOREIGN PATENT DOCUMENTS

CN      102036301 A    4/2011
CN      102215083 A   10/2011
(Continued)

OTHER PUBLICATIONS

International Search Report issued in International Application No. PCT/CN2015/087090 dated May 18, 2016, 6 pages.
(Continued)

*Primary Examiner* — Kiet Tang
(74) *Attorney, Agent, or Firm* — Fish & Richard P.C.

(57) ABSTRACT

A downlink information processing method, user equipment, a base station, and a communications system are disclosed. In one aspect, a method performed by a terminal device such as user equipment (UE) includes: determining that a cell-specific frequency shift of downlink information is equal to a cell-specific frequency shift of a cell-specific reference signal (CRS), determining a resource element location according to the cell-specific frequency shift of the downlink information, where a duration of a transmission time interval (TTI) to which the resource element location belongs is less than or equal to a time length of one timeslot, receiving the downlink information at the resource element location, and demodulating downlink data according to the downlink information.

18 Claims, 11 Drawing Sheets

(51) Int. Cl.
   *H04W 28/04* (2009.01)
   *H04W 72/04* (2009.01)
(52) U.S. Cl.
   CPC .......... *H04L 5/0051* (2013.01); *H04L 5/0053* (2013.01); *H04L 5/0073* (2013.01); *H04W 28/04* (2013.01); *H04W 72/042* (2013.01); *H04L 5/0007* (2013.01); *H04L 5/0044* (2013.01); *H04W 72/0446* (2013.01)
(58) Field of Classification Search
   CPC .. H04L 5/0007; H04L 5/0044; H04W 72/042; H04W 28/04; H04W 72/0446
   See application file for complete search history.

(56) References Cited

U.S. PATENT DOCUMENTS

| | | | |
|---|---|---|---|
| 2013/0021964 A1 | 1/2013 | Shen et al. | |
| 2013/0114525 A1 | 5/2013 | Ahmadi et al. | |
| 2014/0198675 A1* | 7/2014 | He | H04L 5/0048 370/252 |

FOREIGN PATENT DOCUMENTS

| | | |
|---|---|---|
| CN | 104025496 A | 9/2014 |
| EP | 2557702 A2 | 2/2013 |
| EP | 2467985 B1 | 3/2016 |
| JP | 2013502798 A | 1/2013 |
| WO | 2007012193 A1 | 2/2007 |
| WO | 2013025551 A1 | 2/2013 |

OTHER PUBLICATIONS

3GPP TS 36.211 V12.6.0 (Jun. 2015);3rd Generation Partnership Project;Technical Specification Group Radio Access Network;Evolved Universal Terrestrial Radio Access (E-UTRA);Physical channels and modulation(Release 12),total 136 pages.

Extended European Search Report issued in European Application No. 15901259.0 dated Jun. 19, 2018, 9 pages.

Japanese Office Action issued in Japanese Application No. 2018-507493 dated Nov. 6, 2018, 3 pages.

* cited by examiner

DOWNLINK INFORMATION PROCESSING METHOD, USER EQUIPMENT, BASE STATION, AND COMMUNICATIONS SYSTEM

CROSS-REFERENCE TO RELATED APPLICATIONS

This application is a continuation of International Application No. PCT/CN2015/087090, filed on Aug. 14, 2015, the disclosure of which is hereby incorporated by reference in its entirety.

TECHNICAL FIELD

Embodiments of the present invention relate to the communications technologies, and in particular, to a downlink information processing method, user equipment, a base station, and a communications system.

BACKGROUND

In a Long Term Evolution (LTE) downlink system, a transmission time interval (TTI) includes a control region and a data region. The control region is mainly used to transmit control information by using a channel such as a physical downlink control channel (PDCCH). The data region is mainly used to transmit data information by using a channel such as a physical downlink shared channel (PDSCH). In addition, an enhanced physical downlink control channel (EPDCCH) may further be introduced in the data region as a supplement to and an enhancement of the PDCCH. In an LTE downlink transmission process, user equipment (UE) needs to demodulate downlink data on the PDSCH according to downlink information. An example in which the downlink information is a demodulation reference signal (DMRS) is used to describe a demodulation process. Generally, the process is specifically as follows: The UE first receives a DMRS sent by a base station, obtains a channel estimation result according to the DMRS, demodulates an EPDCCH by using the DMRS, so as to determine scheduling information of downlink control information (DCI), and demodulates downlink data on a PDSCH according to the DCI and the channel estimation result. If the UE can correctly demodulate the downlink data on the PDSCH, the UE feeds back an acknowledgement (ACK) to the base station; or if the UE cannot correctly demodulate the downlink data on the PDSCH, the UE feeds back a negative acknowledgement (NACK) to the base station.

A TTI in an existing LTE system is 1 ms. To achieve a shorter round trip time and a shorter data transmission delay, currently a scenario in which a length of the TTI is set shorter is proposed in an advanced solution of the LTE system. For example, the length of the TTI is set to 0.5 millisecond, a time length of one symbol, or the like. FIG. 1 is a general schematic diagram of a timeslot structure of one TTI in the prior art. As shown in FIG. 1, one TTI includes two timeslots (slot): a first timeslot slot 0 and a second timeslot slot 1. There are seven symbols per timeslot. According to a protocol specification in the prior art, a DMRS location is defined on the last two symbols of the slot 0 and the slot 1. In the existing LTE system with the TTI of 1 ms, the UE receives downlink information in an $m^{th}$ subframe, then demodulates downlink data, and sends acknowledgement information in an $(m+4)^{th}$ subframe by using an uplink channel. By analogy, if the TTI in the LTE system changes to a TTI whose time length is one timeslot, that is, one TTI includes only one timeslot, the UE receives downlink information in an $n^{th}$ timeslot, then demodulates downlink data, and sends acknowledgement information in an $(n+4)^{th}$ timeslot by using an uplink channel.

According to a demodulation method in the prior art, when duration of the TTI becomes shorter, the TTI may not include the last two symbols of the timeslot. Consequently, the UE cannot receive the downlink information within the TTI, resulting in a technical problem that the UE fails to complete subsequent demodulation of the downlink data.

SUMMARY

Embodiments of the present invention provide a downlink information processing method, user equipment, a base station, and a communications system, so that UE can receive, within a TTI whose duration is less than or equal to a time length of one timeslot, downlink information delivered by a base station, so as to complete a downlink data demodulation process.

According to a first aspect, an embodiment of the present invention provides a downlink information processing method, including:

determining, by user equipment UE, that a cell-specific frequency shift of the downlink information is equal to a cell-specific frequency shift of a cell-specific reference signal CRS, where the CRS is a cell-specific reference signal of a cell in which the UE is located;

determining, by the UE, a resource element location according to the cell-specific frequency shift of the downlink information, where duration of a transmission time interval TTI to which the resource element location belongs is less than or equal to a time length of one timeslot;

receiving, by the UE, the downlink information at the resource element location; and demodulating, by the UE, downlink data according to the downlink information.

With reference to the first aspect, in a first possible implementation of the first aspect, the downlink information includes any one of a demodulation reference signal DMRS, a physical downlink control channel PDCCH, or an enhanced physical downlink control channel EPDCCH.

With reference to the first possible implementation of the first aspect, in a second possible implementation of the first aspect, if the downlink information includes the DMRS and the duration of the TTI is equal to the time length of one timeslot, the determining, by the UE, a resource element location according to the cell-specific frequency shift of the downlink information includes:

determining, by the UE, a frequency domain index of the resource element location according to the cell-specific frequency shift of the downlink information;

determining, by the UE, a time domain index of the resource element location according to a time-domain intermediate variable; and determining, by the UE, the resource element location according to the frequency domain index of the resource element location and the time domain index of the resource element location; where the time-domain intermediate variable is a variable determined according to a type of a subframe in which the TTI is located.

With reference to the first possible implementation of the first aspect, in a third possible implementation of the first aspect, if the downlink information includes the DMRS and the duration of the TTI is equal to the time length of one timeslot, the determining, by the UE, a resource element location according to the cell-specific frequency shift of the downlink information includes:

determining, by the UE, a frequency domain index of the resource element location according to the cell-specific frequency shift of the downlink information;

determining, by the UE, a time domain index of the resource element location according to a time-domain intermediate variable and a control format indicator CFI, where the time-domain intermediate variable is a variable determined according to a type of a subframe in which the TTI is located, and the CFI is control format indicator information carried on a physical control format indicator channel PCFICH of the cell in which the UE is located; and determining, by the UE, the resource element location according to the frequency domain index of the resource element location and the time domain index of the resource element location.

With reference to the second or the third possible implementation of the first aspect, in a fourth possible implementation of the first aspect, the determining, by the UE, a frequency domain index of the resource element location according to the cell-specific frequency shift of the downlink information includes:

determining, by the UE, the frequency domain index k of the resource element location according to a formula $k=3m'+N_{sc}^{RB}n_{PRB}+k'+(v_{shift2}) \bmod 3+1$, where $m'=0, 1,$ or $2$, $k'=0$ or $1$, $N_{sc}^{RB}$ is a frequency domain resource block size, $n_{PRB}$ is a physical resource block number and $n_{PRB}$ is a positive integer, and $v_{shift2}$ is the cell-specific frequency shift of the downlink information.

With reference to the second possible implementation of the first aspect, in a fifth possible implementation of the first aspect, the determining a time domain index of the resource element location according to a time-domain intermediate variable includes:

determining, by the UE, the time domain index l of the resource element location according to a formula $l=l' \bmod 2$, where $l'$ is the time-domain intermediate variable, $$l' = \begin{cases} 0, 1, 2, \text{ or } 3; & \text{if } n_s \bmod 2 = 0, \text{ and the } TTI \text{ is in a special subframe} \\ & \text{of configuration } 1, 2, 6, \text{ or } 7 \\ 0 \text{ or } 1; & \text{if the } TTI \text{ is in a subframe other} \\ & \text{than a special subframe of configuration} \\ & 1, 2, 6, \text{ or } 7 \end{cases},$$

and $n_s$ is an index of a timeslot in which the TTI is located.

With reference to the third possible implementation of the first aspect, in a sixth possible implementation of the first aspect, the determining a time domain index of the resource element location according to a time-domain intermediate variable and a control format indicator CFI includes:

determining, by the UE, the time domain index l of the resource element location according to a formula $$l' = \begin{cases} l' \bmod 2 + CFI; & \text{if } n_s \bmod 2 = 0 \text{ and the } TTI \text{ is} \\ & \text{in a special subframe of configuration} \\ & 1, 2, 6, \text{ or } 7 \\ l' \bmod 2 + CFI + 3\lfloor l'/2 \rfloor; & \text{if } n_s \bmod 2 = 0 \text{ and the } TTI \text{ is} \\ & \text{in a special subframe of configuration} \\ & 1, 2, 6, \text{ or } 7 \end{cases},$$

where $n_s$ is an index of a timeslot in which the TTI is located, $l'$ is the time-domain intermediate variable, and $$l' = \begin{cases} 0, 1, 2, \text{ or } 3; & \text{if } n_s \bmod 2 = 0, \text{ and the } TTI \text{ is in a special} \\ & \text{subframe of configuration } 1, 2, 6, \text{ or } 7 \\ 0 \text{ or } 1; & \text{if the } TTI \text{ is in a subframe other than a} \\ & \text{special subframe of configuration } 1, 2, 6, \text{ or } 7 \end{cases}.$$

With reference to the first possible implementation of the first aspect, in a seventh possible implementation of the first aspect, if the downlink information includes the DMRS and the duration of the TTI is greater than or equal to a time length of one symbol and less than the time length of one timeslot, the determining, by the UE, a resource element location according to the cell-specific frequency shift of the downlink information includes:

determining, by the UE, a frequency domain index of the resource element location according to the cell-specific frequency shift of the downlink information;

determining, by the UE, an index of a symbol included in the TTI as a time domain index of the resource element location, where the symbol is an orthogonal frequency division multiplexing OFDM symbol or a single-carrier frequency division multiple access SC-FDMA symbol; and determining, by the UE, the resource element location according to the frequency domain index of the resource element location and the time domain index of the resource element location.

With reference to the seventh possible implementation of the first aspect, in an eighth possible implementation of the first aspect, the determining, by the UE, a frequency domain index of the resource element location according to the cell-specific frequency shift of the downlink information includes:

determining, by the UE, the frequency domain index k of the resource element location according to a formula $k=6m'+N_{sc}^{RB}n_{PRB}+(k'+v_{shift2}) \bmod 6$; $l \neq l''$, where $m'=0$ or $1$, $k'=0$ or $3$, $$l'' = \begin{cases} 0 \text{ or } N_{symb}^{DL} - 3; & \text{if } n = 1 \text{ or } 2 \\ 0, 1, \text{ or } N_{symb}^{DL} - 3; & \text{if } n = 4 \end{cases},$$

$N_{sc}^{RB}$ is a frequency domain resource block size, $n_{PRB}$ is a physical resource block number and $n_{PRB}$ is a positive integer, $v_{shift2}$ is the cell-specific frequency shift of the downlink information, n is a quantity of antenna ports configured for CRSs of the cell in which the UE is located, $N_{symb}^{DL}$ is a quantity of orthogonal frequency division multiplexing OFDM symbols or single-carrier frequency division multiple access SC-FDMA symbols in one downlink timeslot, and l is the time domain index of the resource element location.

With reference to the seventh possible implementation of the first aspect, in a ninth possible implementation of the first aspect, the determining, by the UE, a frequency domain index of the resource element location according to the cell-specific frequency shift of the downlink information includes:

determining, by the UE, the frequency domain index k of the resource element location according to a formula $k=6m'+N_{sc}^{RB}n_{PRB}+(k'+v_{shift2}) \bmod 6$; $l \neq l''$, where $m'=0$ or $1$, $k'=0$ or $3$, $$l'' = \begin{cases} 0 \text{ or } N_{symb}^{DL} - 3; & \text{if } n_s \bmod 2 = 1 \text{ and } n = 1 \text{ or } 2 \\ 0, 1, \text{ or } N_{symb}^{DL} - 3; & \text{if } n_s \bmod 2 = 1 \text{ and } n = 4 \\ (0 \text{ to } CFI - 1) \text{ or } N_{symb}^{DL} - 3; & \text{if } n_s \bmod 2 = 0 \text{ and } n = 1 \text{ or } 2, \\ (0 \text{ to } \max(CFI - 1, 1)) \text{ or } & \text{if } n_s \bmod 2 = 0 \text{ and } n = 4 \\ N_{symb}^{DL} - 3; \end{cases}$$

$N_{sc}^{RB}$ is a frequency domain resource block size, $n_{PRB}$ is a physical resource block number and $n_{PRB}$ is a positive integer, $v_{shift2}$ is the cell-specific frequency shift of the downlink information, n is a quantity of antenna ports configured for CRSs of the cell in which the UE is located, $N_{symb}^{DL}$ is a quantity of orthogonal frequency division multiplexing OFDM symbols or single-carrier frequency division multiple access SC-FDMA symbols in one downlink timeslot, a CFI is control format indicator information carried on a physical control format indicator channel PCFICH of the cell in which the UE is located, $n_s$ is an index of a timeslot in which the TTI is located, and l is the time domain index of the resource element location.

With reference to the first possible implementation of the first aspect, in a tenth possible implementation of the first aspect, if the downlink information includes the PDCCH or the EPDCCH, the determining, by the UE, a resource element location according to the cell-specific frequency shift of the downlink information includes:

determining, by the UE, a frequency domain index k of the resource element location according to a formula $$k = \begin{cases} 6m' + N_{sc}^{RB} n_{PRB} + (k' + v_{shift2}) \bmod 6; & l \neq l'' \\ 6m' + N_{sc}^{RB} n_{PRB} + (k' + m'' + v_{shift2}) \bmod 6; & l = l'' \end{cases},$$

where m'=0 or 1, $$l'' = \begin{cases} 0 \text{ or } N_{symb}^{DL} - 3; & \text{if } n = 1 \text{ or } 2 \\ 0, 1, \text{ or } N_{symb}^{DL} - 3; & \text{if } n = 4 \end{cases},$$

k'=0 or 3, $N_{sc}^{RB}$ is a frequency domain resource block size, $n_{PRB}$ is a physical resource block number and $n_{PRB}$ is a positive integer, $v_{shift2}$ is the cell-specific frequency shift of the downlink information, n is a quantity of antenna ports configured for CRSs of the cell in which the UE is located, $N_{symb}^{DL}$ is a quantity of orthogonal frequency division multiplexing OFDM symbols or single-carrier frequency division multiple access SC-FDMA symbols in one downlink timeslot, and m" is any one or a combination of −2, −1, 1, or 2;

determining, by the UE, an index of a symbol included in the TTI as a time domain index l of the resource element location, where the symbol is an orthogonal frequency division multiplexing OFDM symbol or a single-carrier frequency division multiple access SC-FDMA symbol; and determining, by the UE, the resource element location according to the frequency domain index of the resource element location and the time domain index of the resource element location.

With reference to the first possible implementation of the first aspect, in an eleventh possible implementation of the first aspect, if the downlink information includes the PDCCH or the EPDCCH, the determining, by the UE, a resource element location according to the cell-specific frequency shift of the downlink information includes:

determining, by the UE, a frequency domain index k of the resource element location according to a formula $$k = \begin{cases} 6m' + N_{sc}^{RB} n_{PRB} + (k' + v_{shift2}) \bmod 6; & l \neq l'' \\ 6m' + N_{sc}^{RB} n_{PRB} + (k' + m'' + v_{shift2}) \bmod 6; & l = l'' \end{cases},$$

where m'=0 or 1, $$l'' = \begin{cases} 0 \text{ or } N_{symb}^{DL} - 3; & \text{if } n_s \bmod 2 = 1 \text{ and } n = 1 \text{ or } 2 \\ 0, 1, \text{ or } N_{symb}^{DL} - 3; & \text{if } n_s \bmod 2 = 1 \text{ and } n = 4 \\ (0 \text{ to } CFI - 1) \text{ or } N_{symb}^{DL} - 3; & \text{if } n_s \bmod 2 = 0 \text{ and } n = 1 \text{ or } 2, \\ (0 \text{ to } \max(CFI - 1, 1)) \text{ or } & \text{if } n_s \bmod 2 = 0 \text{ and } n = 4 \\ N_{symb}^{DL} - 3; \end{cases}$$

k'=0 or 3, $N_{sc}^{RB}$ is a frequency domain resource block size, $n_{PRB}$ is a physical resource block number and $n_{PRB}$ is a positive integer, $v_{shift2}$ is the cell-specific frequency shift of the downlink information, n is a quantity of antenna ports configured for CRSs of the cell in which the UE is located, $N_{symb}^{DL}$ is a quantity of orthogonal frequency division multiplexing OFDM symbols or single-carrier frequency division multiple access SC-FDMA symbols in one downlink timeslot, m" is any one or a combination of −2, −1, 1, or 2, a CFI is control format indicator information carried on a physical control format indicator channel PCFICH of the cell in which the UE is located, and $n_s$ is an index of a timeslot in which the TTI is located;

determining, by the UE, an index of a symbol included in the TTI as a time domain index l of the resource element location, where the symbol is an orthogonal frequency division multiplexing OFDM symbol or a single-carrier frequency division multiple access SC-FDMA symbol; and determining, by the UE, the resource element location according to the frequency domain index of the resource element location and the time domain index of the resource element location.

With reference to any possible implementation of the first aspect, in a twelfth possible implementation of the first aspect, before the determining, by user equipment UE, that a cell-specific frequency shift of the downlink information is equal to a cell-specific frequency shift of a cell-specific reference signal CRS, the method further includes:

determining, by the UE, the cell-specific frequency shift $v_{shift1}$ of the CRS according to a formula $v_{shift1} = N_{ID}^{cell} \bmod 6$, where $N_{ID}^{cell}$ is a physical layer cell identifier of the cell in which the UE is located.

According to a second aspect, an embodiment of the present invention provides a downlink information processing method, including:

determining, by a base station, that a cell-specific frequency shift of the downlink information is equal to a cell-specific frequency shift of a cell-specific reference signal CRS, where the CRS is a cell-specific reference signal sent by the base station;

determining, by the base station, a resource element location according to the cell-specific frequency shift of the downlink information, where duration of a transmission time interval TTI to which the resource element location belongs is less than or equal to a time length of one timeslot; and sending, by the base station, the downlink information to UE at the resource element location.

With reference to the second aspect, in a first possible implementation of the second aspect, the downlink information includes any one of a demodulation reference signal DMRS, a physical downlink control channel PDCCH, or an enhanced physical downlink control channel EPDCCH.

With reference to the first possible implementation of the second aspect, in a second possible implementation of the second aspect, if the downlink information includes the DMRS and the duration of the TTI is equal to the time length of one timeslot, the determining, by the base station, a resource element location according to the cell-specific frequency shift of the downlink information includes:

determining, by the base station, a frequency domain index of the resource element location according to the cell-specific frequency shift of the downlink information;

determining, by the base station, a time domain index of the resource element location according to a time-domain intermediate variable, where the time-domain intermediate variable is a variable determined according to a type of a subframe in which the TTI is located; and determining, by the base station, the resource element location according to the frequency domain index of the resource element location and the time domain index of the resource element location.

With reference to the first possible implementation of the second aspect, in a third possible implementation of the second aspect, if the downlink information includes the DMRS and the duration of the TTI is equal to the time length of one timeslot, the determining, by the base station, a resource element location according to the cell-specific frequency shift of the downlink information includes:

determining, by the base station, a frequency domain index of the resource element location according to the cell-specific frequency shift of the downlink information;

determining, by the base station, a time domain index of the resource element location according to a time-domain intermediate variable and a control format indicator CFI, where the time-domain intermediate variable is a variable determined according to a type of a subframe in which the TTI is located, and the CFI is control format indicator information carried on a physical control format indicator channel PCFICH sent by the base station; and determining, by the base station, the resource element location according to the frequency domain index of the resource element location and the time domain index of the resource element location.

With reference to the second or the third possible implementation of the second aspect, in a fourth possible implementation of the second aspect, the determining, by the base station, a frequency domain index of the resource element location according to the cell-specific frequency shift of the downlink information includes:

determining, by the base station, the frequency domain index k of the resource element location according to a formula k=3m'+$N_{sc}^{RB}n_{PRB}$+k'+($v_{shift2}$)mod 3+1, where m'=0, 1, or 2, k'=1 or 0, $N_{sc}^{RB}$ is a frequency domain resource block size, $n_{PRB}$ is a physical resource block number and $n_{PRB}$ is a positive integer, and $v_{shift2}$ is the cell-specific frequency shift of the downlink information.

With reference to the second possible implementation of the second aspect, in a fifth possible implementation of the second aspect, the determining a time domain index of the resource element location according to a time-domain intermediate variable includes:

determining, by the base station, the time domain index l of the resource element location according to a formula l=l' mod 2, where l' is the time-domain intermediate variable, $$l' = \begin{cases} 0, 1, 2, \text{ or } 3; & \text{if } n_s \bmod 2 = 0 \text{ and the } TTI \text{ is in a special} \\ & \text{subframe of configuration 1, 2, 6, or 7} \\ 0 \text{ or } 1; & \text{if the } TTI \text{ is in a subframe other than a} \\ & \text{special subframe of configuration 1, 2, 6, or 7} \end{cases},$$

and $n_s$ is an index of a timeslot in which the TTI is located.

With reference to the third possible implementation of the second aspect, in a sixth possible implementation of the second aspect, the determining a time domain index of the resource element location according to a time-domain intermediate variable and a control format indicator CFI includes:

determining, by the base station, the time domain index l of the resource element location according to a formula $$l' = \begin{cases} l' \bmod 2 + CFI; & \text{if } n_s \bmod 2 = 0 \text{ and the } TTI \text{ is} \\ & \text{in a special subframe of configuration} \\ & 1, 2, 6, \text{ or } 7 \\ l' \bmod 2 + CFI + 3\lfloor l'/2 \rfloor; & \text{if } n_s \bmod 2 = 0 \text{ and the } TTI \text{ is} \\ & \text{in a special subframe of configuration} \\ & 1, 2, 6, \text{ or } 7 \end{cases},$$

where $n_s$ is an index of a timeslot in which the TTI is located, l' is the time-domain intermediate variable, and $$l' = \begin{cases} 0, 1, 2, \text{ or } 3; & \text{if } n_s \bmod 2 = 0 \text{ and the } TTI \text{ is in a special} \\ & \text{subframe of configuration 1, 2, 6, or 7} \\ 0 \text{ or } 1; & \text{if the } TTI \text{ is in a subframe other than a} \\ & \text{special subframe of configuration 1, 2, 6, or 7} \end{cases}.$$

With reference to the first possible implementation of the second aspect, in a seventh possible implementation of the second aspect, if the downlink information includes the DMRS and the duration of the TTI is greater than or equal to a time length of one symbol and less than the time length of one timeslot, the determining, by the base station, a resource element location according to the cell-specific frequency shift of the downlink information includes:

determining, by the base station, a frequency domain index of the resource element location according to the cell-specific frequency shift of the downlink information;

determining, by the base station, an index of a symbol included in the TTI as a time domain index of the resource element location, where the symbol is an orthogonal frequency division multiplexing OFDM symbol or a single-carrier frequency division multiple access SC-FDMA symbol; and determining, by the base station, the resource element location according to the frequency domain index of the resource element location and the time domain index of the resource element location.

With reference to the seventh possible implementation of the second aspect, in an eighth possible implementation of the second aspect, the determining, by the base station, a frequency domain index of the resource element location according to the cell-specific frequency shift of the downlink information includes:

determining, by the base station, the frequency domain index k of the resource element location according to a formula k=6m'+$N_{sc}^{RB}$$n_{PRB}$+(k'+$v_{shift2}$)mod 6; l≠l", where m'=0 or 1, k'=0 or 3, $$l'' = \begin{cases} 0 \text{ or } N_{symb}^{DL} - 3; & \text{if } n = 1 \text{ or } 2 \\ 0, 1, \text{ or } N_{symb}^{DL} - 3; & \text{if } n = 4 \end{cases},$$

$N_{sc}^{RB}$ is a frequency domain resource block size, $n_{PRB}$ is a physical resource block number and $n_{PRB}$ is a positive integer, $v_{shift2}$ is the cell-specific frequency shift of the downlink information, n is a quantity of antenna ports configured for CRSs sent by the base station, $N_{symb}^{DL}$ is a quantity of orthogonal frequency division multiplexing OFDM symbols or single-carrier frequency division multiple access SC-FDMA symbols in one downlink timeslot, and l is the time domain index of the resource element location.

With reference to the seventh possible implementation of the second aspect, in a ninth possible implementation of the second aspect, the determining a frequency domain index of the resource element location according to the cell-specific frequency shift of the downlink information includes:

determining, by the base station, the frequency domain index k of the resource element location according to a formula k=6m'+$N_{sc}^{RB}$$n_{PRB}$+(k'+$v_{shift2}$)mod 6; l≠l", where m'=0 or 1, k'=0 or 3, $$l'' = \begin{cases} 0 \text{ or } N_{symb}^{DL} - 3; & \text{if } n_s \bmod 2 = 1 \text{ and } n = 1 \text{ or } 2 \\ 0, 1, \text{ or } N_{symb}^{DL} - 3; & \text{if } n_s \bmod 2 = 1 \text{ and } n = 4 \\ (0 \text{ to } CFI - 1) \text{ or } N_{symb}^{DL} - 3; & \text{if } n_s \bmod 2 = 0 \text{ and } n = 1 \text{ or } 2 \\ (0 \text{ to } \max(CFI - 1, 1)) \text{ or } & \text{if } n_s \bmod 2 = 0 \text{ and } n = 4 \\ N_{symb}^{DL} - 3; & \end{cases},$$

$N_{sc}^{RB}$ is a frequency domain resource block size, $n_{PRB}$ is a physical resource block number and $n_{PRB}$ is a positive integer, $v_{shift2}$ is the cell-specific frequency shift of the downlink information, n is a quantity of antenna ports configured for CRSs sent by the base station, $N_{symb}^{DL}$ is a quantity of orthogonal frequency division multiplexing OFDM symbols or single-carrier frequency division multiple access SC-FDMA symbols in one downlink timeslot, a CFI is control format indicator information carried on a physical control format indicator channel PCFICH sent by the base station, $n_s$ is an index of a timeslot in which the TTI is located, and l is the time domain index of the resource element location.

With reference to the first possible implementation of the second aspect, in a tenth possible implementation of the second aspect, if the downlink information includes the PDCCH or the EPDCCH, the determining, by the base station, a resource element location according to the cell-specific frequency shift of the downlink information includes:

determining, by the base station, a frequency domain index k of the resource element location according to a formula $$k = \begin{cases} 6m' + N_{sc}^{RB} n_{PRB} + (k' + v_{shift2}) \bmod 6; & l \neq l'' \\ 6m' + N_{sc}^{RB} n_{PRB} + (k' + m'' + v_{shift2}) \bmod 6; & l = l'' \end{cases},$$

where m'=0 or 1, $$l'' = \begin{cases} 0 \text{ or } N_{symb}^{DL} - 3; & \text{if } n = 1 \text{ or } 2 \\ 0, 1, \text{ or } N_{symb}^{DL} - 3; & \text{if } n = 4 \end{cases},$$

k'=0 or 3, $N_{sc}^{RB}$ is a frequency domain resource block size, $n_{PRB}$ is a physical resource block number and $n_{PRB}$ is a positive integer, $v_{shift2}$ is the cell-specific frequency shift of the downlink information, n is a quantity of antenna ports configured for CRSs sent by the base station, $N_{symb}^{DL}$ is a quantity of orthogonal frequency division multiplexing OFDM symbols or single-carrier frequency division multiple access SC-FDMA symbols in one downlink timeslot, and m" is any one or a combination of −2, −1, 1, or 2;

determining, by the base station, an index of a symbol included in the TTI as a time domain index l of the resource element location, where the symbol is an orthogonal frequency division multiplexing OFDM symbol or a single-carrier frequency division multiple access SC-FDMA symbol; and determining, by the base station, the resource element location according to the frequency domain index of the resource element location and the time domain index of the resource element location.

With reference to the first possible implementation of the second aspect, in an eleventh possible implementation of the second aspect, if the downlink information includes the PDCCH or the EPDCCH, the determining, by the base station, a resource element location according to the cell-specific frequency shift of the downlink information includes:

determining, by the base station, a frequency domain index k of the resource element location according to a formula $$k = \begin{cases} 6m' + N_{sc}^{RB} n_{PRB} + (k' + v_{shift2}) \bmod 6; & l \neq l'' \\ 6m' + N_{sc}^{RB} n_{PRB} + (k' + m'' + v_{shift2}) \bmod 6; & l = l'' \end{cases},$$

where m'=0 or 1, $$l'' = \begin{cases} 0 \text{ or } N_{symb}^{DL} - 3; & \text{if } n_s \bmod 2 = 1 \text{ and } n = 1 \text{ or } 2 \\ 0, 1, \text{ or } N_{symb}^{DL} - 3; & \text{if } n_s \bmod 2 = 1 \text{ and } n = 4 \\ (0 \text{ to } CFI - 1) \text{ or } N_{symb}^{DL} - 3; & \text{if } n_s \bmod 2 = 0 \text{ and } n = 1 \text{ or } 2 \\ (0 \text{ to } \max(CFI - 1, 1)) \text{ or } & \text{if } n_s \bmod 2 = 0 \text{ and } n = 4 \\ N_{symb}^{DL} - 3; & \end{cases},$$

k'=0 or 3, $N_{sc}^{RB}$ is a frequency domain resource block size, $n_{PRB}$ is a physical resource block number and $n_{PRB}$ is a positive integer, $v_{shift2}$ is the cell-specific frequency shift of the downlink information, n is a quantity of antenna ports configured for CRSs sent by the base station, $N_{symb}^{DL}$ is a quantity of orthogonal frequency division multiplexing OFDM symbols or single-carrier frequency division multiple access SC-FDMA symbols in one downlink timeslot, m" is any one or a combination of −2, −1, 1, or 2, a CFI is format indicator information carried on a physical control format indicator channel PCFICH sent by the base station, and $n_s$ is an index of a timeslot in which the TTI is located;

determining, by the base station, an index of a symbol included in the TTI as a time domain index l of the resource element location, where the symbol is an orthogonal frequency division multiplexing OFDM symbol or a single-carrier frequency division multiple access SC-FDMA symbol; and determining, by the base station, the resource element location according to the frequency domain index of the resource element location and the time domain index of the resource element location.

With reference to any possible implementation of the second aspect, in a twelfth possible implementation of the second aspect, before the determining, by a base station, that a cell-specific frequency shift of the downlink information is equal to a cell-specific frequency shift of a cell-specific reference signal CRS, the method further includes:

determining, by the base station, the cell-specific frequency shift $v_{shift1}$ of the CRS according to a formula $v_{shift1}=N_{ID}^{cell}$ mod 6, where $N_{ID}^{cell}$ is a physical layer cell identifier of a cell in which the UE is located.

According to a third aspect, an embodiment of the present invention provides user equipment UE, including:

a determining module, configured to determine that a cell-specific frequency shift of the downlink information is equal to a cell-specific frequency shift of a cell-specific reference signal CRS, where the CRS is a cell-specific reference signal of a cell in which the UE is located;

a processing module, configured to determine a resource element location according to the cell-specific frequency shift of the downlink information, where duration of a transmission time interval TTI to which the resource element location belongs is less than or equal to a time length of one timeslot;

a receiving module, configured to receive the downlink information at the resource element location; and a demodulation module, configured to demodulate downlink data according to the downlink information.

With reference to the third aspect, in a first possible implementation of the third aspect, the downlink information includes any one of a demodulation reference signal DMRS, a physical downlink control channel PDCCH, or an enhanced physical downlink control channel EPDCCH.

With reference to the first possible implementation of the third aspect, in a second possible implementation of the third aspect, if the downlink information includes the DMRS and the duration of the TTI is equal to the time length of one timeslot, that the processing module determines the resource element location according to the cell-specific frequency shift of the downlink information includes:

the processing module determines a frequency domain index of the resource element location according to the cell-specific frequency shift of the downlink information, determines a time domain index of the resource element location according to a time-domain intermediate variable, and determines the resource element location according to the frequency domain index of the resource element location and the time domain index of the resource element location, where the time-domain intermediate variable is a variable determined according to a type of a subframe in which the TTI is located.

With reference to the first possible implementation of the third aspect, in a third possible implementation of the third aspect, if the downlink information includes the DMRS and the duration of the TTI is equal to the time length of one timeslot, that the processing module determines the resource element location according to the cell-specific frequency shift of the downlink information includes:

the processing module determines a frequency domain index of the resource element location according to the cell-specific frequency shift of the downlink information; determines a time domain index of the resource element location according to a time-domain intermediate variable and a control format indicator CFI, where the time-domain intermediate variable is a variable determined according to a type of a subframe in which the TTI is located, and the CFI is control format indicator information carried on a physical control format indicator channel PCFICH of the cell in which the UE is located; and determines the resource element location according to the frequency domain index of the resource element location and the time domain index of the resource element location.

With reference to the second or the third possible implementation of the third aspect, in a fourth possible implementation of the third aspect, that the processing module determines a frequency domain index of the resource element location according to the cell-specific frequency shift of the downlink information includes:

the processing module determines the frequency domain index k of the resource element location according to a formula $k=3m'+N_{sc}^{RB}n_{PRB}+k'+(v_{shift2})\mod 3+1$, where $m'=0, 1,$ or $2$, $k'=0$ or $1$, $N_{sc}^{RB}$ is a frequency domain resource block size, $n_{PRB}$ is a physical resource block number and $n_{PRB}$ is a positive integer, and $v_{shift2}$ is the cell-specific frequency shift of the downlink information.

With reference to the second possible implementation of the third aspect, in a fifth possible implementation of the third aspect, that the processing module determines a time domain index of the resource element location according to a time-domain intermediate variable includes:

the processing module determines the time domain index $l$ of the resource element location according to a formula $l=l'$ mod 2, where $l'$ is the time-domain intermediate variable, $$l' = \begin{cases} 0, 1, 2, \text{ or } 3; & \text{if } n_s \bmod 2 = 0 \text{ and the } TTI \text{ is in a special} \\ & \text{subframe of configuration 1, 2, 6, or 7} \\ 0 \text{ or } 1; & \text{if the } TTI \text{ is in a subframe other than a} \\ & \text{special subframe of configuration 1, 2, 6, or 7} \end{cases},$$

and $n_s$ is an index of a timeslot in which the TTI is located.

With reference to the third possible implementation of the third aspect, in a sixth possible implementation of the third aspect, that the processing module determines a time domain index of the resource element location according to a time-domain intermediate variable and a control format indicator CFI includes:

the processing module determines the time domain index $l$ of the resource element location according to a formula $$l = \begin{cases} l' \bmod 2 + CFI; & \text{if } n_s \bmod 2 = 0 \text{ and the } TTI \text{ is} \\ & \text{in a special subframe of configuration} \\ & 1, 2, 6, \text{ or } 7 \\ l' \bmod 2 + CFI + 3\lfloor l'/2 \rfloor; & \text{if } n_s \bmod 2 = 0 \text{ and the } TTI \text{ is} \\ & \text{in a special subframe of configuration} \\ & 1, 2, 6, \text{ or } 7 \end{cases},$$

where $n_s$ is an index of a timeslot in which the TTI is located, $l'$ is the time-domain intermediate variable, and $$l' = \begin{cases} 0, 1, 2, \text{ or } 3; & \text{if } n_s \bmod 2 = 0 \text{ and the } TTI \text{ is in a special} \\ & \text{subframe of configuration 1, 2, 6, or 7} \\ 0 \text{ or } 1; & \text{if the } TTI \text{ is in a subframe other than a} \\ & \text{special subframe of configuration 1, 2, 6, or 7} \end{cases}$$

With reference to the first possible implementation of the third aspect, in a seventh possible implementation of the third aspect, if the downlink information includes the DMRS and the duration of the TTI is greater than or equal to a time length of one symbol and less than the time length of one timeslot, that the processing module determines the resource element location according to the cell-specific frequency shift of the downlink information includes:

the processing module determines a frequency domain index of the resource element location according to the cell-specific frequency shift of the downlink information, determines an index of a symbol included in the TTI as a time domain index of the resource element location, where the symbol is an orthogonal frequency division multiplexing OFDM symbol or a single-carrier frequency division multiple access SC-FDMA symbol, and determines the resource element location according to the frequency domain index of the resource element location and the time domain index of the resource element location.

With reference to the seventh possible implementation of the third aspect, in an eighth possible implementation of the third aspect, that the processing module determines a frequency domain index of the resource element location according to the cell-specific frequency shift of the downlink information includes:

the processing module determines the frequency domain index k of the resource element location according to a formula k=6m'+$N_{sc}^{RB}n_{PRB}$+(k'+$v_{shift2}$)mod 6; l≠l", where m'=0 or 1, k'=0 or 3, $$l'' = \begin{cases} 0 \text{ or } N_{symb}^{DL} - 3; & \text{if } n = 1 \text{ or } 2 \\ 0, 1, \text{ or } N_{symb}^{DL} - 3; & \text{if } n = 4 \end{cases},$$

$N_{sc}^{RB}$ is a frequency domain resource block size, $n_{PRB}$ is a physical resource block number and $n_{PRB}$ is a positive integer, $v_{shift2}$ is the cell-specific frequency shift of the downlink information, n is a quantity of antenna ports configured for CRSs of the cell in which the UE is located, $N_{symb}^{DL}$ is a quantity of orthogonal frequency division multiplexing OFDM symbols or single-carrier frequency division multiple access SC-FDMA symbols in one downlink timeslot, and l is the time domain index of the resource element location.

With reference to the seventh possible implementation of the third aspect, in a ninth possible implementation of the third aspect, that the processing module determines a frequency domain index of the resource element location according to the cell-specific frequency shift of the downlink information includes:

the processing module determines the frequency domain index k of the resource element location according to a formula k=6m'+$N_{sc}^{RB}n_{PRB}$+(k'+$v_{shift2}$)mod 6; l≠l", where m'=0 or 1, k'=0 or 3, $$l'' = \begin{cases} 0 \text{ or } N_{symb}^{DL} - 3; & \text{if } n_s \bmod 2 = 1 \text{ and } n = 1 \text{ or } 2 \\ 0, 1, \text{ or } N_{symb}^{DL} - 3; & \text{if } n_s \bmod 2 = 1 \text{ and } n = 4 \\ (0 \text{ to } CFI - 1) \text{ or } N_{symb}^{DL} - 3; & \text{if } n_s \bmod 2 = 0 \text{ and } n = 1 \text{ or } 2 \\ (0 \text{ to } \max(CFI - 1, 1)) \text{ or } & \text{if } n_s \bmod 2 = 0 \text{ and } n = 4 \\ N_{symb}^{DL} - 3; & \end{cases}$$

$N_{sc}^{RB}$ is a frequency domain resource block size, $n_{PRB}$ is a physical resource block number and $n_{PRB}$ is a positive integer, $v_{shift2}$ is the cell-specific frequency shift of the downlink information, n is a quantity of antenna ports configured for CRSs of the cell in which the UE is located, $N_{symb}^{DL}$ is a quantity of orthogonal frequency division multiplexing OFDM symbols or single-carrier frequency division multiple access SC-FDMA symbols in one downlink timeslot, a CFI is control format indicator information carried on a physical control format indicator channel PCFICH of the cell in which the UE is located, $n_s$ is an index of a timeslot in which the TTI is located, and l is the time domain index of the resource element location.

With reference to the first possible implementation of the third aspect, in a tenth possible implementation of the third aspect, if the downlink information includes the PDCCH or the EPDCCH, that the processing module determines the resource element location according to the cell-specific frequency shift of the downlink information includes:

the processing module determines a frequency domain index k of the resource element location according to a formula $$k = \begin{cases} 6m' + N_{sc}^{RB}n_{PRB} + (k' + v_{shift2}) \bmod 6; & l \ne l'' \\ 6m' + N_{sc}^{RB}n_{PRB} + (k' + m'' + v_{shift2}) \bmod 6; & l = l'' \end{cases},$$

determines an index of a symbol included in the TTI as a time domain index l of the resource element location, and determines the resource element location according to the frequency domain index of the resource element location and the time domain index of the resource element location, where m'=0 or 1, $$l'' = \begin{cases} 0 \text{ or } N_{symb}^{DL} - 3; & \text{if } n = 1 \text{ or } 2 \\ 0, 1, \text{ or } N_{symb}^{DL} - 3; & \text{if } n = 4 \end{cases},$$

k'=0 or 3, $N_{sc}^{RB}$ is a frequency domain resource block size, $n_{PRB}$ is a physical resource block number and $n_{PRB}$ is a positive integer, $v_{shift2}$ is the cell-specific frequency shift of the downlink information, n is a quantity of antenna ports configured for CRSs of the cell in which the UE is located, $N_{symb}^{DL}$ is a quantity of orthogonal frequency division multiplexing OFDM symbols or single-carrier frequency division multiple access SC-FDMA symbols in one downlink timeslot, m" is any one or a combination of −2, −1, 1, or 2, and the symbol is an orthogonal frequency division multiplexing OFDM symbol or a single-carrier frequency division multiple access SC-FDMA symbol.

With reference to the first possible implementation of the third aspect, in an eleventh possible implementation of the third aspect, if the downlink information includes the PDCCH or the EPDCCH, that the processing module determines the resource element location according to the cell-specific frequency shift of the downlink information includes:

the processing module determines a frequency domain index k of the resource element location according to a formula $$k = \begin{cases} 6m' + N_{sc}^{RB} n_{PRB} + (k' + v_{shift2}) \bmod 6; & l \ne l'' \\ 6m' + N_{sc}^{RB} n_{PRB} + (k' + m'' + v_{shift2}) \bmod 6; & l = l'' \end{cases},$$

determines an index of a symbol included in the TTI as a time domain index l of the resource element location, and determines the resource element location according to the frequency domain index of the resource element location and the time domain index of the resource element location, where m'=0 or 1, $$l'' = \begin{cases} 0 \text{ or } N_{symb}^{DL} - 3; & \text{if } n_s \bmod 2 = 1 \text{ and } n = 1 \text{ or } 2 \\ 0, 1, \text{ or } N_{symb}^{DL} - 3; & \text{if } n_s \bmod 2 = 1 \text{ and } n = 4 \\ (0 \text{ to } CFI - 1) \text{ or } N_{symb}^{DL} - 3; & \text{if } n_s \bmod 2 = 0 \text{ and } n = 1 \text{ or } 2, \\ (0 \text{ to } \max(CFI - 1, 1)) \text{ or } & \text{if } n_s \bmod 2 = 0 \text{ and } n = 4 \\ N_{symb}^{DL} - 3; & \end{cases}$$

k'=0 or 3, $N_{sc}^{RB}$ is a frequency domain resource block size, $n_{PRB}$ is a physical resource block number and $n_{PRB}$ is a positive integer, $v_{shift2}$ is the cell-specific frequency shift of the downlink information, n is a quantity of antenna ports configured for CRSs of the cell in which the UE is located, $N_{symb}^{DL}$ is a quantity of orthogonal frequency division multiplexing OFDM symbols or single-carrier frequency division multiple access SC-FDMA symbols in one downlink timeslot, m" is any one or a combination of −2, −1, 1, or 2, a CFI is control format indicator information carried on a physical control format indicator channel PCFICH of the cell in which the UE is located, $n_s$ is an index of a timeslot in which the TTI is located, and the symbol is an orthogonal frequency division multiplexing OFDM symbol or a single-carrier frequency division multiple access SC-FDMA symbol.

With reference to any possible implementation of the third aspect, in a twelfth possible implementation of the third aspect, the determining module is further configured to determine the cell-specific frequency shift $v_{shift1}$ of the CRS according to a formula $v_{shift1} = N_{ID}^{cell} \bmod 6$, where $N_{ID}^{cell}$ is a physical layer cell identifier of the cell in which the UE is located.

According to a fourth aspect, an embodiment of the present invention provides a base station, including:

a determining module, configured to determine that a cell-specific frequency shift of downlink information is equal to a cell-specific frequency shift of a cell-specific reference signal CRS, where the CRS is a cell-specific reference signal sent by the base station;

a processing module, configured to determine a resource element location according to the cell-specific frequency shift of the downlink information, where duration of a transmission time interval TTI to which the resource element location belongs is less than or equal to a time length of one timeslot; and a sending module, configured to send the downlink information to UE at the resource element location.

With reference to the fourth aspect, in a first possible implementation of the fourth aspect, the downlink information includes any one of a demodulation reference signal DMRS, a physical downlink control channel PDCCH, or an enhanced physical downlink control channel EPDCCH.

With reference to the first possible implementation of the fourth aspect, in a second possible implementation of the fourth aspect, if the downlink information includes the DMRS and the duration of the TTI is equal to the time length of one timeslot, that the processing module determines the resource element location according to the cell-specific frequency shift of the downlink information includes:

the processing module determines a frequency domain index of the resource element location according to the cell-specific frequency shift of the downlink information, determines a time domain index of the resource element location according to a time-domain intermediate variable, where the time-domain intermediate variable is a variable determined according to a type of a subframe in which the TTI is located, and determines the resource element location according to the frequency domain index of the resource element location and the time domain index of the resource element location.

With reference to the first possible implementation of the fourth aspect, in a third possible implementation of the fourth aspect, if the downlink information includes the DMRS and the duration of the TTI is equal to the time length of one timeslot, that the processing module determines the resource element location according to the cell-specific frequency shift of the downlink information includes:

the processing module determines a frequency domain index of the resource element location according to the cell-specific frequency shift of the downlink information; determines a time domain index of the resource element location according to a time-domain intermediate variable and a control format indicator CFI, where the time-domain intermediate variable is a variable determined according to a type of a subframe in which the TTI is located, and the CFI is control format indicator information carried on a physical control format indicator channel PCFICH sent by the base station; and determines the resource element location according to the frequency domain index of the resource element location and the time domain index of the resource element location.

With reference to the second or the third possible implementation of the fourth aspect, in a fourth possible implementation of the fourth aspect, that the processing module determines a frequency domain index of the resource element location according to the cell-specific frequency shift of the downlink information includes:

the processing module determines the frequency domain index k of the resource element location according to a formula k=3m'+$N_{sc}^{RB}$$n_{PRB}$+k'+($v_{shift2}$)mod 3+1, where m'=0, 1, or 2, k'=1 or 0, $N_{sc}^{RB}$ is a frequency domain resource block size, $n_{PRB}$ is a physical resource block number and $n_{PRB}$ is a positive integer, and $v_{shift2}$ is the cell-specific frequency shift of the downlink information.

With reference to the second possible implementation of the fourth aspect, in a fifth possible implementation of the fourth aspect, that the processing module determines a time domain index of the resource element location according to a time-domain intermediate variable includes:

the processing module determines the time domain index l of the resource element location according to a formula l=l' mod 2, where l' is the time-domain intermediate variable, $$l' = \begin{cases} 0, 1, 2, \text{ or } 3; & \text{if } n_s \bmod 2 = 0 \text{ and the } TTI \text{ is in a special} \\ & \text{subframe of configuration } 1, 2, 6, \text{ or } 7 \\ 0 \text{ or } 1; & \text{if the } TTI \text{ is in a subframe other than a} \\ & \text{special subframe of configuration } 1, 2, 6, \text{ or } 7 \end{cases},$$

and $n_s$ is an index of a timeslot in which the TTI is located.

With reference to the third possible implementation of the fourth aspect, in a sixth possible implementation of the fourth aspect, that the processing module determines a time domain index of the resource element location according to a time-domain intermediate variable and a control format indicator CFI includes:

the processing module determines the time domain index l of the resource element location according to a formula $$l = \begin{cases} l' \bmod 2 + CFI; & \text{if } n_s \bmod 2 = 0 \text{ and the } TTI \text{ is} \\ & \text{in a special subframe of configuration} \\ & 1, 2, 6, \text{ or } 7 \\ l' \bmod 2 + CFI + 3\lfloor l'/2 \rfloor; & \text{if } n_s \bmod 2 = 0 \text{ and the } TTI \text{ is} \\ & \text{in a special subframe of configuration} \\ & 1, 2, 6, \text{ or } 7 \end{cases},$$

where $n_s$ is an index of a timeslot in which the TTI is located, l' is the time-domain intermediate variable, and $$l' = \begin{cases} 0, 1, 2, \text{ or } 3; & \text{if } n_s \bmod 2 = 0 \text{ and the } TTI \text{ is in a special} \\ & \text{subframe of configuration } 1, 2, 6, \text{ or } 7 \\ 0 \text{ or } 1; & \text{if the } TTI \text{ is in a subframe other than a} \\ & \text{special subframe of configuration } 1, 2, 6, \text{ or } 7 \end{cases}.$$

With reference to the first possible implementation of the fourth aspect, in a seventh possible implementation of the fourth aspect, if the downlink information includes the DMRS and the duration of the TTI is greater than or equal to a time length of one symbol and less than the time length of one timeslot, that the processing module determines the resource element location according to the cell-specific frequency shift of the downlink information includes:

the processing module determines a frequency domain index of the resource element location according to the cell-specific frequency shift of the downlink information, determines an index of a symbol included in the TTI as a time domain index of the resource element location, where the symbol is an orthogonal frequency division multiplexing OFDM symbol or a single-carrier frequency division multiple access SC-FDMA symbol, and determines the resource element location according to the frequency domain index of the resource element location and the time domain index of the resource element location.

With reference to the seventh possible implementation of the fourth aspect, in an eighth possible implementation of the fourth aspect, that the processing module determines a frequency domain index of the resource element location according to the cell-specific frequency shift of the downlink information includes:

the processing module determines the frequency domain index k of the resource element location according to a formula $k=6m'+N_{sc}^{RB}n_{PRB}+(k'+v_{shift2})\bmod 6;\ l \neq l''$, where m'=0 or 1, k'=0 or 3, $$l'' = \begin{cases} 0 \text{ or } N_{symb}^{DL} - 3; & \text{if } n = 1 \text{ or } 2 \\ 0, 1, \text{ or } N_{symb}^{DL} - 3; & \text{if } n = 4 \end{cases},$$

$N_{sc}^{RB}$ is a frequency domain resource block size, $n_{PRB}$ is a physical resource block number and $n_{PRB}$ is a positive integer, $v_{shift2}$ is the cell-specific frequency shift of the downlink information, n is a quantity of antenna ports configured for CRSs sent by the base station, $N_{symb}^{DL}$ is a quantity of orthogonal frequency division multiplexing OFDM symbols or single-carrier frequency division multiple access SC-FDMA symbols in one downlink timeslot, and l is the time domain index of the resource element location.

With reference to the seventh possible implementation of the fourth aspect, in a ninth possible implementation of the fourth aspect, that the processing module determines a frequency domain index of the resource element location according to the cell-specific frequency shift of the downlink information includes:

the processing module determines the frequency domain index k of the resource element location according to a formula $k=6m'+N_{sc}^{RB}n_{PRB}+(k'+v_{shift2})\bmod 6;\ l \neq l''$, where m'=0 or 1, k'=0 or 3, $$l'' = \begin{cases} 0 \text{ or } N_{symb}^{DL} - 3; & \text{if } n_s \bmod 2 = 1 \text{ and } n = 1 \text{ or } 2 \\ 0, 1, \text{ or } N_{symb}^{DL} - 3; & \text{if } n_s \bmod 2 = 1 \text{ and } n = 4 \\ (0 \text{ to } CFI - 1) \text{ or } N_{symb}^{DL} - 3; & \text{if } n_s \bmod 2 = 0 \text{ and } n = 1 \text{ or } 2 \\ (0 \text{ to } \max(CFI - 1, 1)) \text{ or } N_{symb}^{DL} - 3; & \text{if } n_s \bmod 2 = 0 \text{ and } n = 4 \end{cases},$$

$N_{sc}^{RB}$ is a frequency domain resource block size, $n_{PRB}$ is a physical resource block number and $n_{PRB}$ is a positive integer, $v_{shift2}$ is the cell-specific frequency shift of the downlink information, n is a quantity of antenna ports configured for CRSs sent by the base station, $N_{symb}^{DL}$ is a quantity of orthogonal frequency division multiplexing OFDM symbols or single-carrier frequency division multiple access SC-FDMA symbols in one downlink timeslot, a CFI is control format indicator information carried on a physical control format indicator channel PCFICH sent by the base station, $n_s$ is an index of a timeslot in which the TTI is located, and l is the time domain index of the resource element location.

With reference to the first possible implementation of the fourth aspect, in a tenth possible implementation of the fourth aspect, if the downlink information includes the PDCCH or the EPDCCH, that the processing module determines the resource element location according to the cell-specific frequency shift of the downlink information includes:

the processing module determines a frequency domain index k of the resource element location according to a formula $$k = \begin{cases} 6m' + N_{sc}^{RB}n_{PRB} + (k' + v_{shift2})\bmod 6; & l \neq l'' \\ 6m' + N_{sc}^{RB}n_{PRB} + (k' + m'' + v_{shift2})\bmod 6; & l = l'' \end{cases},$$

determines an index of a symbol included in the TTI as a time domain index l of the resource element location, and determines the resource element location according to the frequency domain index of the resource element location and the time domain index of the resource element location, where m'=0 or 1, $$l'' = \begin{cases} 0 \text{ or } N_{symb}^{DL} - 3; & \text{if } n = 1 \text{ or } 2 \\ 0, 1, \text{ or } N_{symb}^{DL} - 3; & \text{if } n = 4 \end{cases},$$

k'=0 or 3, $N_{sc}^{RB}$ is a frequency domain resource block size, $n_{PRB}$ is a physical resource block number and $n_{PRB}$ is a positive integer, $v_{shift2}$ is the cell-specific frequency shift of the downlink information, n is a quantity of antenna ports configured for CRSs sent by the base station, $N_{symb}^{DL}$ is a quantity of orthogonal frequency division multiplexing OFDM symbols or single-carrier frequency division multiple access SC-FDMA symbols in one downlink timeslot, m" is any one or a combination of -2, -1, 1, or 2, and the symbol is an orthogonal frequency division multiplexing OFDM symbol or a single-carrier frequency division multiple access SC-FDMA symbol.

With reference to the first possible implementation of the fourth aspect, in an eleventh possible implementation of the fourth aspect, if the downlink information includes the PDCCH or the EPDCCH, that the processing module determines the resource element location according to the cell-specific frequency shift of the downlink information includes:

the processing module determines a frequency domain index k of the resource element location according to a formula $$k = \begin{cases} 6m' + N_{sc}^{RB} n_{PRB} + (k' + v_{shift2}) \bmod 6; & l \ne l'' \\ 6m' + N_{sc}^{RB} n_{PRB} + (k' + m'' + v_{shift2}) \bmod 6; & l = l'' \end{cases},$$

determines an index of a symbol included in the TTI as a time domain index l of the resource element location, and determines the resource element location according to the frequency domain index of the resource element location and the time domain index of the resource element location, where m'=0 or 1, $$l'' = \begin{cases} 0 \text{ or } N_{symb}^{DL} - 3; & \text{if } n_s \bmod 2 = 1 \text{ and } n = 1 \text{ or } 2 \\ 0, 1, \text{ or } N_{symb}^{DL} - 3; & \text{if } n_s \bmod 2 = 1 \text{ and } n = 4 \\ (0 \text{ to } CFI - 1) \text{ or } N_{symb}^{DL} - 3; & \text{if } n_s \bmod 2 = 0 \text{ and } n = 1 \text{ or } 2 \\ (0 \text{ to } \max(CFI - 1, 1)) \text{ or } N_{symb}^{DL} - 3; & \text{if } n_s \bmod 2 = 0 \text{ and } n = 4 \end{cases},$$

k'=0 or 3, $N_{sc}^{RB}$ is a frequency domain resource block size, $n_{PRB}$ is a physical resource block number and $n_{PRB}$ is a positive integer, $v_{shift2}$ is the cell-specific frequency shift of the downlink information, n is a quantity of antenna ports configured for CRSs sent by the base station, $N_{symb}^{DL}$ is a quantity of orthogonal frequency division multiplexing OFDM symbols or single-carrier frequency division multiple access SC-FDMA symbols in one downlink timeslot, m" is any one or a combination of -2, -1, 1, or 2, a CFI is format indicator information carried on a physical control format indicator channel PCFICH sent by the base station, $n_s$ is an index of a timeslot in which the TTI is located, and the symbol is an orthogonal frequency division multiplexing OFDM symbol or a single-carrier frequency division multiple access SC-FDMA symbol.

With reference to any possible implementation of the fourth aspect, in a twelfth possible implementation of the fourth aspect, the determining module is further configured to determine the cell-specific frequency shift $v_{shift1}$ of the CRS according to a formula $v_{shift1} = N_{ID}^{cell} \bmod 6$, where $N_{ID}^{cell}$ is a physical layer cell identifier of a cell in which the UE is located.

According to a fifth aspect, an embodiment of the present invention provides UE, including a processor and a receiver, where the processor is configured to determine that a cell-specific frequency shift of downlink information is equal to a cell-specific frequency shift of a cell-specific reference signal CRS, where the CRS is a cell-specific reference signal of a cell in which the UE is located;

the processor is further configured to determine a resource element location according to the cell-specific frequency shift of the downlink information, where duration of a transmission time interval TTI to which the resource element location belongs is less than or equal to a time length of one timeslot;

the receiver is configured to receive the downlink information at the resource element location; and the processor is further configured to demodulate downlink data according to the downlink information.

With reference to the fifth aspect, in a first possible implementation of the fifth aspect, the downlink information includes any one of a demodulation reference signal DMRS, a physical downlink control channel PDCCH, or an enhanced physical downlink control channel EPDCCH.

With reference to the first possible implementation of the fifth aspect, in a second possible implementation of the fifth aspect, if the downlink information includes the DMRS and the duration of the TTI is equal to the time length of one timeslot, that the processor determines the resource element location according to the cell-specific frequency shift of the downlink information includes:

the processor determines a frequency domain index of the resource element location according to the cell-specific frequency shift of the downlink information, determines a time domain index of the resource element location according to a time-domain intermediate variable, and determines the resource element location according to the frequency domain index of the resource element location and the time domain index of the resource element location, where the time-domain intermediate variable is a variable determined according to a type of a subframe in which the TTI is located.

With reference to the first possible implementation of the fifth aspect, in a third possible implementation of the fifth aspect, if the downlink information includes the DMRS and the duration of the TTI is equal to the time length of one timeslot, that the processor determines the resource element location according to the cell-specific frequency shift of the downlink information includes:

the processor determines a frequency domain index of the resource element location according to the cell-specific frequency shift of the downlink information; determines a time domain index of the resource element location according to a time-domain intermediate variable and a control format indicator CFI, where the time-domain intermediate variable is a variable determined according to a type of a subframe in which the TTI is located, and the CFI is control format indicator information carried on a physical control format indicator channel PCFICH of the cell in which the UE is located; and determines the resource element location according to the frequency domain index of the resource element location and the time domain index of the resource element location.

With reference to the second or the third possible implementation of the fifth aspect, in a fourth possible implementation of the fifth aspect, that the processor determines a frequency domain index of the resource element location according to the cell-specific frequency shift of the downlink information includes:

the processor determines the frequency domain index k of the resource element location according to a formula $k=3m'+N_{sc}^{RB}n_{PRB}+k'+(v_{shift2})\bmod 3+1$, where $m'=0, 1,$ or $2$, $k'=0$ or $1$, $N_{sc}^{RB}$ is a frequency domain resource block size, $n_{PRB}$ is a physical resource block number and $n_{PRB}$ is a positive integer, and $v_{shift2}$ is the cell-specific frequency shift of the downlink information.

With reference to the second possible implementation of the fifth aspect, in a fifth possible implementation of the fifth aspect, that the processor determines a time domain index of the resource element location according to a time-domain intermediate variable includes:

the processor determines the time domain index l of the resource element location according to a formula $l=l'\bmod 2$, where l' is the time-domain intermediate variable, $$l' = \begin{cases} 0, 1, 2, \text{ or } 3; & \text{if } n_s \bmod 2 = 0 \text{ and the } TTI \text{ is in a special subframe of configuration } 1, 2, 6, \text{ or } 7 \\ 0 \text{ or } 1; & \text{if the } TTI \text{ is in a subframe other than a special subframe of configuration } 1, 2, 6, \text{ or } 7 \end{cases},$$

and $n_s$ is an index of a timeslot in which the TTI is located.

With reference to the third possible implementation of the fifth aspect, in a sixth possible implementation of the fifth aspect, that the processor determines a time domain index of the resource element location according to a time-domain intermediate variable and a control format indicator CFI includes:

the processor determines the time domain index l of the resource element location according to a formula $$l = \begin{cases} l'\bmod 2 + CFI; & \text{if } n_s \bmod 2 = 0 \text{ and the } TTI \text{ is in a subframe other than a special subframe of configuration } 1, 2, 6, \text{ or } 7 \\ l'\bmod 2 + CFI + 3\lfloor l'/2 \rfloor; & \text{if } n_s \bmod 2 = 0 \text{ and the } TTI \text{ is in a special subframe of configuration } 1, 2, 6, \text{ or } 7 \end{cases},$$

where $n_s$ is an index of a timeslot in which the TTI is located, l' is the time-domain intermediate variable, and $$l' = \begin{cases} 0, 1, 2, \text{ or } 3; & \text{if } n_s \bmod 2 = 0 \text{ and the } TTI \text{ is in a special subframe of configuration } 1, 2, 6, \text{ or } 7 \\ 0 \text{ or } 1; & \text{if the } TTI \text{ is in a subframe other than a special subframe of configuration } 1, 2, 6, \text{ or } 7 \end{cases}.$$

With reference to the first possible implementation of the fifth aspect, in a seventh possible implementation of the fifth aspect, if the downlink information includes the DMRS and the duration of the TTI is greater than or equal to a time length of one symbol and less than the time length of one timeslot, that the processor determines the resource element location according to the cell-specific frequency shift of the downlink information includes:

the processor determines a frequency domain index of the resource element location according to the cell-specific frequency shift of the downlink information, determines an index of a symbol included in the TTI as a time domain index of the resource element location, where the symbol is an orthogonal frequency division multiplexing OFDM symbol or a single-carrier frequency division multiple access SC-FDMA symbol, and determines the resource element location according to the frequency domain index of the resource element location and the time domain index of the resource element location.

With reference to the seventh possible implementation of the fifth aspect, in an eighth possible implementation of the fifth aspect, that the processor determines a frequency domain index of the resource element location according to the cell-specific frequency shift of the downlink information includes:

the processor determines the frequency domain index k of the resource element location according to a formula $k=6m'+N_{sc}^{RB}n_{PRB}+(k'+v_{shift2})\bmod 6$; $l\ne l''$, where $m'=0$ or $1$, $k'=0$ or $3$, $$l'' = \begin{cases} 0 \text{ or } N_{symb}^{DL} - 3; & \text{if } n = 1 \text{ or } 2 \\ 0, 1, \text{ or } N_{symb}^{DL} - 3; & \text{if } n = 4 \end{cases},$$

$N_{sc}^{RB}$ is a frequency domain resource block size, $n_{PRB}$ is a physical resource block number and $n_{PRB}$ is a positive integer, $v_{shift2}$ is the cell-specific frequency shift of the downlink information, n is a quantity of antenna ports configured for CRSs of the cell in which the UE is located, $N_{symb}^{DL}$ is a quantity of orthogonal frequency division multiplexing OFDM symbols or single-carrier frequency division multiple access SC-FDMA symbols in one downlink timeslot, and l is the time domain index of the resource element location.

With reference to the seventh possible implementation of the fifth aspect, in a ninth possible implementation of the fifth aspect, that the processor determines a frequency domain index of the resource element location according to the cell-specific frequency shift of the downlink information includes:

the processor determines the frequency domain index k of the resource element location according to a formula $k=6m'+N_{sc}^{RB}n_{PRB}+(k'+v_{shift2})\bmod 6$; $l\ne l''$, where $m'=0$ or $1$, $k'=0$ or $3$, $$l'' = \begin{cases} 0 \text{ or } N_{symb}^{DL} - 3; & \text{if } n_s \bmod 2 = 1 \text{ and } n = 1 \text{ or } 2 \\ 0, 1, \text{ or } N_{symb}^{DL} - 3; & \text{if } n_s \bmod 2 = 1 \text{ and } n = 4 \\ (0 \text{ to } CFI - 1) \text{ or } N_{symb}^{DL} - 3; & \text{if } n_s \bmod 2 = 0 \text{ and } n = 1 \text{ or } 2 \\ (0 \text{ to } \max(CFI - 1, 1)) \text{ or } N_{symb}^{DL} - 3; & \text{if } n_s \bmod 2 = 0 \text{ and } n = 4 \end{cases},$$

$N_{sc}^{RB}$ is a frequency domain resource block size, $n_{PRB}$ is a physical resource block number and $n_{PRB}$ is a positive integer, $v_{shift2}$ is the cell-specific frequency shift of the downlink information, n is a quantity of antenna ports configured for CRSs of the cell in which the UE is located, $N_{symb}^{DL}$ is a quantity of orthogonal frequency division multiplexing OFDM symbols or single-carrier frequency division multiple access SC-FDMA symbols in one downlink timeslot, a CFI is control format indicator information carried on a physical control format indicator channel PCFICH of the cell in which the UE is located, $n_s$ is an index of a timeslot in which the TTI is located, and l is the time domain index of the resource element location.

With reference to the first possible implementation of the fifth aspect, in a tenth possible implementation of the fifth aspect, if the downlink information includes the PDCCH or the EPDCCH, that the processor determines the resource element location according to the cell-specific frequency shift of the downlink information includes:

the processor determines a frequency domain index k of the resource element location according to a formula $$k = \begin{cases} 6m' + N_{sc}^{RB} n_{PRB} + (k' + v_{shift2}) \mod 6; & l \neq l'' \\ 6m' + N_{sc}^{RB} n_{PRB} + (k' + m'' + v_{shift2}) \mod 6; & l = l'' \end{cases},$$

determines an index of a symbol included in the TTI as a time domain index l of the resource element location, and determines the resource element location according to the frequency domain index of the resource element location and the time domain index of the resource element location, where m'=0 or 1, $$l'' = \begin{cases} 0 \text{ or } N_{symb}^{DL} - 3; & \text{if } n = 1 \text{ or } 2 \\ 0, 1, \text{ or } N_{symb}^{DL} - 3; & \text{if } n = 4 \end{cases},$$

k'=0 or 3, $N_{sc}^{RB}$ is a frequency domain resource block size, $n_{PRB}$ is a physical resource block number and $n_{PRB}$ is a positive integer, $v_{shift2}$ is the cell-specific frequency shift of the downlink information, n is a quantity of antenna ports configured for CRSs of the cell in which the UE is located, $N_{symb}^{DL}$ is a quantity of orthogonal frequency division multiplexing OFDM symbols or single-carrier frequency division multiple access SC-FDMA symbols in one downlink timeslot, m" is any one or a combination of −2, −1, 1, or 2, and the symbol is an orthogonal frequency division multiplexing OFDM symbol or a single-carrier frequency division multiple access SC-FDMA symbol.

With reference to the first possible implementation of the fifth aspect, in an eleventh possible implementation of the fifth aspect, if the downlink information includes the PDCCH or the EPDCCH, that the processor determines the resource element location according to the cell-specific frequency shift of the downlink information includes:

the processor determines a frequency domain index k of the resource element location according to a formula $$k = \begin{cases} 6m' + N_{sc}^{RB} n_{PRB} + (k' + v_{shift2}) \mod 6; & l \neq l'' \\ 6m' + N_{sc}^{RB} n_{PRB} + (k' + m'' + v_{shift2}) \mod 6; & l = l'' \end{cases},$$

determines an index of a symbol included in the TTI as a time domain index l of the resource element location, and determines the resource element location according to the frequency domain index of the resource element location and the time domain index of the resource element location, where m'=0 or 1, $$l'' = \begin{cases} 0 \text{ or } N_{symb}^{DL} - 3; & \text{if } n_s \mod 2 = 1 \text{ and } n = 1 \text{ or } 2 \\ 0, 1, \text{ or } N_{symb}^{DL} - 3; & \text{if } n_s \mod 2 = 1 \text{ and } n = 4 \\ (0 \text{ to } CFI - 1) \text{ or } N_{symb}^{DL} - 3; & \text{if } n_s \mod 2 = 0 \text{ and } n = 1 \text{ or } 2 \\ (0 \text{ to } \max(CFI - 1, 1)) \text{ or } N_{symb}^{DL} - 3; & \text{if } n_s \mod 2 = 0 \text{ and } n = 4 \end{cases},$$

k'=0 or 3, $N_{sc}^{RB}$ is a frequency domain resource block size, $n_{PRB}$ is a physical resource block number and $n_{PRB}$ is a positive integer, $v_{shift2}$ is the cell-specific frequency shift of the downlink information, n is a quantity of antenna ports configured for CRSs of the cell in which the UE is located, $N_{symb}^{DL}$ is a quantity of orthogonal frequency division multiplexing OFDM symbols or single-carrier frequency division multiple access SC-FDMA symbols in one downlink timeslot, m" is any one or a combination of −2, −1, 1, or 2, a CFI is control format indicator information carried on a physical control format indicator channel PCFICH of the cell in which the UE is located, $n_s$ is an index of a timeslot in which the TTI is located, and the symbol is an orthogonal frequency division multiplexing OFDM symbol or a single-carrier frequency division multiple access SC-FDMA symbol.

With reference to the first possible implementation of the fifth aspect, in a twelfth possible implementation of the fifth aspect, the processor is further configured to determine the cell-specific frequency shift $v_{shift1}$ of the CRS according to a formula $v_{shift1} = N_{ID}^{cell} \mod 6$, where $N_{ID}^{cell}$ is a physical layer cell identifier of the cell in which the UE is located.

According to a sixth aspect, an embodiment of the present invention provides a base station, including a processor and a transmitter, where the processor is configured to determine that a cell-specific frequency shift of downlink information is equal to a cell-specific frequency shift of a cell-specific reference signal CRS, where the CRS is a cell-specific reference signal sent by the base station;

the processor is further configured to determine a resource element location according to the cell-specific frequency shift of the downlink information, where duration of a transmission time interval TTI to which the resource element location belongs is less than or equal to a time length of one timeslot; and the transmitter sends the downlink information to UE at the resource element location.

With reference to the sixth aspect, in a first possible implementation of the sixth aspect, the downlink information includes any one of a demodulation reference signal DMRS, a physical downlink control channel PDCCH, or an enhanced physical downlink control channel EPDCCH.

With reference to the first possible implementation of the sixth aspect, in a second possible implementation of the sixth aspect, if the downlink information includes the DMRS and the duration of the TTI is equal to the time length of one timeslot, that the processor determines the resource element location according to the cell-specific frequency shift of the downlink information includes:

the processor determines a frequency domain index k of the resource element location according to the cell-specific frequency shift of the downlink information, determines a time domain index of the resource element location according to a time-domain intermediate variable, where the time-domain intermediate variable is a variable determined according to a type of a subframe in which the TTI is located, and determines the resource element location according to the frequency domain index of the resource element location and the time domain index of the resource element location.

With reference to the first possible implementation of the sixth aspect, in a third possible implementation of the sixth aspect, if the downlink information includes the DMRS and the duration of the TTI is equal to the time length of one timeslot, that the processor determines the resource element location according to the cell-specific frequency shift of the downlink information includes:

the processor determines a frequency domain index k of the resource element location according to the cell-specific frequency shift of the downlink information; determines a time domain index of the resource element location according to a time-domain intermediate variable and a control format indicator CFI, where the time-domain intermediate variable is a variable determined according to a type of a subframe in which the TTI is located, and the CFI is control format indicator information carried on a physical control format indicator channel PCFICH sent by the base station; and determines the resource element location according to the frequency domain index of the resource element location and the time domain index of the resource element location.

With reference to the second or the third possible implementation of the sixth aspect, in a fourth possible implementation of the sixth aspect, that the processor determines a frequency domain index k of the resource element location according to the cell-specific frequency shift of the downlink information includes:

the processor determines the frequency domain index k of the resource element location according to a formula $k=3m'+N_{sc}^{RB}n_{PRB}+k'+(v_{shift2}) \bmod 3+1$, where $m'=0, 1,$ or $2$, $k'=1$ or $0$, $N_{sc}^{RB}$ is a frequency domain resource block size, $n_{PRB}$ is a physical resource block number and $n_{PRB}$ is a positive integer, and $v_{shift2}$ is the cell-specific frequency shift of the downlink information.

With reference to the second possible implementation of the sixth aspect, in a fifth possible implementation of the sixth aspect, that the processor determines a time domain index of the resource element location according to a time-domain intermediate variable includes:

the processor determines the time domain index l of the resource element location according to a formula $l=l' \bmod 2$, where l' is the time-domain intermediate variable, $$l' = \begin{cases} 0, 1, 2, \text{ or } 3; & \text{if } n_s \bmod 2 = 0 \text{ and the } TTI \text{ is in a special subframe} \\ & \text{of configuration } 1, 2, 6, \text{ or } 7 \\ 0 \text{ or } 1; & \text{if the } TTI \text{ is in a subframe other than a special} \\ & \text{subframe of configuration } 1, 2, 6, \text{ or } 7 \end{cases}$$

and $n_s$ is an index of a timeslot in which the TTI is located.

With reference to the third possible implementation of the sixth aspect, in a sixth possible implementation of the sixth aspect, that the processor determines a time domain index of the resource element location according to a time-domain intermediate variable and a control format indicator CFI includes:

the processor determines the time domain index l of the resource element location according to a formula $$l = \begin{cases} l' \bmod 2 + CFI; & \text{if } n_s \bmod 2 = 0 \text{ and the } TTI \text{ is in a subframe other than a special subframe} \\ & \text{of configuration } 1, 2, 6, \text{ or } 7 \\ l' \bmod 2 + CFI + 3\lfloor l'/2 \rfloor; & \text{if } n_s \bmod 2 = 0 \text{ and the } TTI \text{ is in a special subframe of configuration } 1, 2, 6, \text{ or } 7 \end{cases}$$

where $n_s$ is an index of a timeslot in which the TTI is located, l' is the time-domain intermediate variable, and $$l' = \begin{cases} 0, 1, 2, \text{ or } 3; & \text{if } n_s \bmod 2 = 0 \text{ and the } TTI \text{ is in a special subframe of configuration } 1, 2, 6, \text{ or } 7 \\ 0 \text{ or } 1; & \text{if the } TTI \text{ is in a subframe other than a special subframe of configuration } 1, 2, 6, \text{ or } 7 \end{cases}$$

With reference to the first possible implementation of the sixth aspect, in a seventh possible implementation of the sixth aspect, if the downlink information includes the DMRS and the duration of the TTI is greater than or equal to a time length of one symbol and less than the time length of one timeslot, that the processor determines the resource element location according to the cell-specific frequency shift of the downlink information includes:

the processor determines a frequency domain index k of the resource element location according to the cell-specific frequency shift of the downlink information, determines an index of a symbol included in the TTI as a time domain index of the resource element location, where the symbol is an orthogonal frequency division multiplexing OFDM symbol or a single-carrier frequency division multiple access SC-FDMA symbol, and determines the resource element location according to the frequency domain index of the resource element location and the time domain index of the resource element location.

With reference to the seventh possible implementation of the sixth aspect, in an eighth possible implementation of the sixth aspect, that the processor determines a frequency domain index k of the resource element location according to the cell-specific frequency shift of the downlink information includes:

the processor determines the frequency domain index k of the resource element location according to a formula $k=6m'+N_{sc}^{RB}n_{PRB}+(k'+v_{shift2}) \bmod 6$; $l \neq l''$, where $m'=0$ or $1$, $k'=0$ or $3$, $$l'' = \begin{cases} 0 \text{ or } N_{symb}^{DL} - 3; & \text{if } n = 1 \text{ or } 2 \\ 0, 1, \text{ or } N_{symb}^{DL} - 3; & \text{if } n = 4 \end{cases}$$

$N_{sc}^{RB}$ is a frequency domain resource block size, $n_{PRB}$ is a physical resource block number and $n_{PRB}$ is a positive integer, $v_{shift2}$ is the cell-specific frequency shift of the downlink information, n is a quantity of antenna ports configured for CRSs sent by the base station, $N_{symb}^{DL}$ is a quantity of orthogonal frequency division multiplexing OFDM symbols or single-carrier frequency division multiple access SC-FDMA symbols in one downlink timeslot, and l is the time domain index of the resource element location.

With reference to the seventh possible implementation of the sixth aspect, in a ninth possible implementation of the sixth aspect, that the processor determines a frequency domain index k of the resource element location according to the cell-specific frequency shift of the downlink information includes:

the processor determines the frequency domain index k of the resource element location according to a formula $k=6m'+N_{sc}^{RB}n_{PRB}+(k'+v_{shift2})\mod 6$; $l \neq l''$, where $m'=0$ or $1$, $k'=0$ or $3$, $$l'' = \begin{cases} 0 \text{ or } N_{symb}^{DL} - 3; & \text{if } n_s \mod 2 = 1 \text{ and } n = 1 \text{ or } 2 \\ 0, 1, \text{ or } N_{symb}^{DL} - 3; & \text{if } n_s \mod 2 = 1 \text{ and } n = 4 \\ (0 \text{ to } CFI - 1) \text{ or } N_{symb}^{DL} - 3; & \text{if } n_s \mod 2 = 0 \text{ and } n = 1 \text{ or } 2 \\ (0 \text{ to } \max(CFI - 1, 1)) \text{ or } N_{symb}^{DL} - 3; & \text{if } n_s \mod 2 = 0 \text{ and } n = 4 \end{cases},$$

$N_{sc}^{RB}$ is a frequency domain resource block size, $n_{PRB}$ is a physical resource block number and $n_{PRB}$ is a positive integer, $v_{shift2}$ is the cell-specific frequency shift of the downlink information, n is a quantity of antenna ports configured for CRSs sent by the base station, $N_{symb}^{DL}$ is a quantity of orthogonal frequency division multiplexing OFDM symbols or single-carrier frequency division multiple access SC-FDMA symbols in one downlink timeslot, a CFI is control format indicator information carried on a physical control format indicator channel PCFICH sent by the base station, $n_s$ is an index of a timeslot in which the TTI is located, and l is the time domain index of the resource element location.

With reference to the first possible implementation of the sixth aspect, in a tenth possible implementation of the sixth aspect, if the downlink information includes the PDCCH or the EPDCCH, that the processor determines the resource element location according to the cell-specific frequency shift of the downlink information includes:

the processor determines a frequency domain index k of the resource element location according to a formula $$k = \begin{cases} 6m' + N_{sc}^{RB}n_{PRB} + (k' + v_{shift2})\mod 6; & l \neq l'' \\ 6m' + N_{sc}^{RB}n_{PRB} + (k' + m'' + v_{shift2})\mod 6; & l = l'' \end{cases},$$

determines an index of a symbol included in the TTI as a time domain index l of the resource element location, and determines the resource element location according to the frequency domain index of the resource element location and the time domain index of the resource element location, where $m'=0$ or $1$, $$l'' = \begin{cases} 0 \text{ or } N_{symb}^{DL} - 3; & \text{if } n = 1 \text{ or } 2 \\ 0, 1, \text{ or } N_{symb}^{DL} - 3; & \text{if } n = 4 \end{cases},$$

$k'=0$ or $3$, $N_{sc}^{RB}$ is a frequency domain resource block size, $n_{PRB}$ is a physical resource block number and $n_{PRB}$ is a positive integer, $v_{shift2}$ is the cell-specific frequency shift of the downlink information, n is a quantity of antenna ports configured for CRSs sent by the base station, $N_{symb}^{DL}$ is a quantity of orthogonal frequency division multiplexing OFDM symbols or single-carrier frequency division multiple access SC-FDMA symbols in one downlink timeslot, m" is any one or a combination of $-2$, $-1$, $1$, or $2$, and the symbol is an orthogonal frequency division multiplexing OFDM symbol or a single-carrier frequency division multiple access SC-FDMA symbol.

With reference to the first possible implementation of the sixth aspect, in an eleventh possible implementation of the sixth aspect, if the downlink information includes the PDCCH or the EPDCCH, that the processor determines the resource element location according to the cell-specific frequency shift of the downlink information includes:

the processor determines a frequency domain index k of the resource element location according to a formula $$k = \begin{cases} 6m' + N_{sc}^{RB}n_{PRB} + (k' + v_{shift2})\mod 6; & l \neq l'' \\ 6m' + N_{sc}^{RB}n_{PRB} + (k' + m'' + v_{shift2})\mod 6; & l = l'' \end{cases},$$

determines an index of a symbol included in the TTI as a time domain index l of the resource element location, and determines the resource element location according to the frequency domain index of the resource element location and the time domain index of the resource element location, where $m'=0$ or $1$, $$l'' = \begin{cases} 0 \text{ or } N_{symb}^{DL} - 3; & \text{if } n_s \mod 2 = 1 \text{ and } n = 1 \text{ or } 2 \\ 0, 1, \text{ or } N_{symb}^{DL} - 3; & \text{if } n_s \mod 2 = 1 \text{ and } n = 4 \\ (0 \text{ to } CFI - 1) \text{ or } N_{symb}^{DL} - 3; & \text{if } n_s \mod 2 = 0 \text{ and } n = 1 \text{ or } 2 \\ (0 \text{ to } \max(CFI - 1, 1)) \text{ or } N_{symb}^{DL} - 3; & \text{if } n_s \mod 2 = 0 \text{ and } n = 4 \end{cases},$$

$k'=0$ or $3$, $N_{sc}^{RB}$ is a frequency domain resource block size, $n_{PRB}$ is a physical resource block number and $n_{PRB}$ is a positive integer, $v_{shift2}$ is the cell-specific frequency shift of the downlink information, n is a quantity of antenna ports configured for CRSs sent by the base station, $N_{symb}^{DL}$ is a quantity of orthogonal frequency division multiplexing OFDM symbols or single-carrier frequency division multiple access SC-FDMA symbols in one downlink timeslot, m" is any one or a combination of $-2$, $-1$, $1$, or $2$, a CFI is format indicator information carried on a physical control format indicator channel PCFICH sent by the base station, $n_s$ is an index of a timeslot in which the TTI is located, and the symbol is an orthogonal frequency division multiplexing OFDM symbol or a single-carrier frequency division multiple access SC-FDMA symbol.

With reference to any possible implementation of the sixth aspect, in a twelfth possible implementation of the sixth aspect, the processor is further configured to determine the cell-specific frequency shift $v_{shift1}$ of the CRS according to a formula $v_{shift1}=N_{ID}^{cell}\mod 6$, where $N_{ID}^{cell}$ is a physical layer cell identifier of a cell in which the UE is located.

According to a seventh aspect, an embodiment of the present invention provides a communications system, including the user equipment UE according to any embodiment of the fifth aspect and the base station according to any embodiment of the sixth aspect.

According to the downlink information processing method, the user equipment, the base station, and the communications system that are provided in the embodiments, the UE determines that the cell-specific frequency shift of the downlink information is equal to the cell-specific frequency shift of the CRS, determines the resource element location according to the cell-specific frequency shift of the downlink information, receives the downlink information at the resource element location, and demodulates the downlink data according to the downlink information. In the embodiments, when the duration of the TTI is less than or equal to the time length of one timeslot, the UE resets, according to the cell-specific frequency shift of the downlink information, a resource element location for receiving the downlink information. Because the cell-specific frequency shift of the downlink information is equal to the cell-specific frequency shift of the CRS, the resource element location for receiving the downlink information varies with a resource element location for receiving the CRS, thereby ensuring that when the TTI becomes shorter, the UE can receive the downlink information within the current TTI and complete demodulation processing according to the downlink information.

BRIEF DESCRIPTION OF DRAWINGS

To describe the technical solutions in the embodiments of the present invention or in the prior art more clearly, the following briefly describes the accompanying drawings required for describing the embodiments or the prior art. Apparently, the accompanying drawings in the following description show some embodiments of the present invention, and a person of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

The method in the embodiments of the present invention is intended to resolve a technical problem in the prior art that UE cannot complete subsequent demodulation of a PDSCH because after duration of a TTI becomes shorter, the UE may fail to receive a DMRS or a downlink control channel in a timeslot in which the TTI is located.

Specific embodiments are used below to describe in detail the technical solutions of the present invention. The following several specific embodiments may be combined with each other, and a same or similar concept or process may not be described repeatedly in some embodiments.

Embodiment 1

Figure 2:
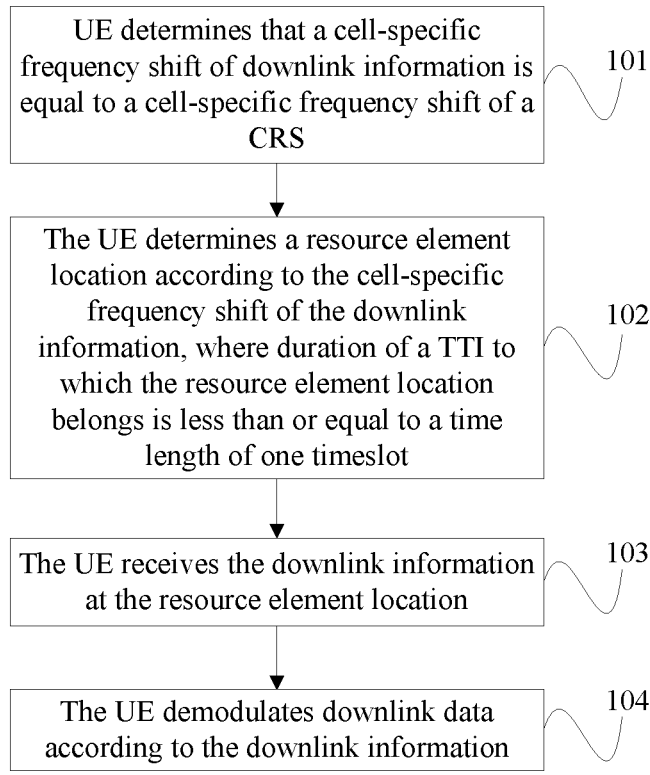
FIG. 2 is a flowchart of a downlink information processing method according to Embodiment 1 of the present invention.

FIG. 2 is a flowchart of a downlink information processing method according to Embodiment 1 of the present invention. This embodiment relates to a specific process in which UE determines, according to a cell-specific frequency shift of downlink information, a resource element location for receiving the downlink information within a TTI, receives the downlink information at the resource location, and demodulates downlink data according to the downlink information. As shown in FIG. 2, the method includes the following steps.

Step 101: The UE determines that the cell-specific frequency shift of the downlink information is equal to a cell-specific frequency shift of a cell-specific reference signal (CRS).

The CRS is a cell-specific reference signal of a cell in which the UE is located.

Figure 1:
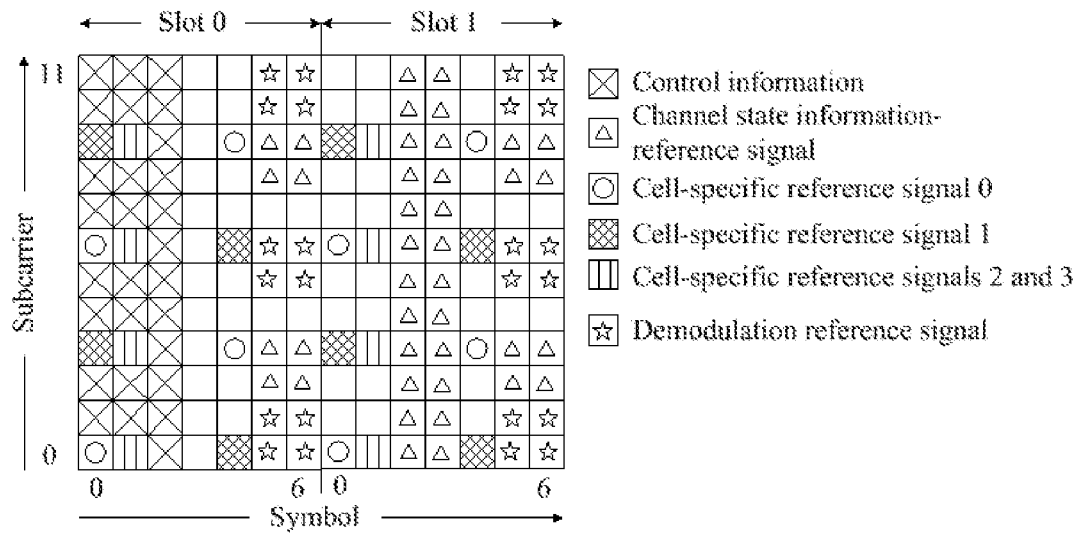
FIG. 1 is a general schematic diagram of a timeslot structure of one TTI in the prior art.

In this embodiment, as shown in FIG. 1, there are three CRS patterns. The three CRS patterns correspond to an antenna port 0, an antenna port 1, and antenna ports 2 and 3, respectively. It can be learned from FIG. 1 that CRSs each are located at a relatively front symbol location in each timeslot. It should be noted that, in a current LTE system, the CRS is full-bandwidth. For example, a system bandwidth of the cell in which the current UE is located is 20 MHz, and antenna ports configured for CRSs of the cell in which the current UE is located are {0, 1, 2, 3}. In this case, all physical resource blocks (PRB) on the bandwidth of 20 MHz have the three CRS patterns. The downlink information in this embodiment may be a demodulation reference signal, or may be a physical downlink control channel.

Step 102: The UE determines the resource element location according to the cell-specific frequency shift of the downlink information, where duration of the TTI to which the resource element location belongs is less than or equal to a time length of one timeslot.

In this embodiment, after an index of a symbol included in the TTI is determined, if a symbol index corresponding to the resource element location is the same as a symbol index of a resource element location of the CRS, for example, the TTI includes symbols 0 and 1 in a slot 0, a subcarrier number corresponding to the resource element location for receiving the downlink information may be set according to the cell-specific frequency shift of the downlink information by using a preset formula or a predefined manner, so that the resource element location does not coincide with the resource element location at which the CRS is located. For example, the preset formula or the predefined method is used to make the subcarrier number corresponding to the resource element location be 1, 2, or the like. Alternatively, the preset formula or the predefined method is used to make the subcarrier number corresponding to the resource element location for receiving the downlink information be not equal to a number 0, 3, or the like of a subcarrier on which the CRS signal is located. If a symbol index corresponding to the resource element location is different from a symbol index of the CRS, the resource element location may be set to a location adjacent to a resource element location at which the CRS is located. For example, when the TTI includes symbols 2 and 3 in the slot 0, the resource element location may be set to a location at which a symbol is 3 and subcarrier numbers are 0 and 3 in the slot 0.

In addition, in this embodiment, the downlink information cannot be received at the resource element location for receiving the CRS. Therefore, it is determined that the cell-specific frequency shift of the downlink information is equal to the cell-specific frequency shift of the CRS, and the frequency shift of the downlink information varies with the cell-specific frequency shift of the CRS, thereby ensuring that the resource element location for receiving the downlink information does not coincide with the resource element location for receiving the CRS. For example, if the cell-specific frequency shift of the CRS is 2, the frequency shift of the downlink information is also 2. Therefore, this can not only ensure that the resource element location for receiving the downlink information does not coincide with the resource element location for receiving the CRS, but also ensure that the UE can receive the downlink information within the current TTI. For example, the cell-specific frequency shift of the CRS is $v_{shift1}=N_{ID}^{cell} \bmod 6$, where $N_{ID}^{cell}$ is a physical layer cell identifier.

It should be noted that a timeslot length in this embodiment is less than or equal to 0.5 ms, that is, the duration of the TTI is less than or equal to 0.5 ms. In an LTE system with a 15 kHz subcarrier spacing, a length of one timeslot is 0.5 ms. In a communications system with a subcarrier spacing greater than 15 kHz, a length of one timeslot may be a time unit shorter than 0.5 ms.

Step 103: The UE receives the downlink information at the resource element location.

In this embodiment, after determining the resource element location, the UE receives, at the resource element location, the downlink information sent by a base station.

Step 104: The UE demodulates the downlink data according to the downlink information.

In this embodiment, when the duration of the TTI becomes shorter, the UE may determine, according to the cell-specific frequency shift of the downlink information, the resource element location for receiving the downlink information. Particularly, when the symbol index corresponding to the resource element location is different from the symbol index of the CRS, the subcarrier number corresponding to the resource element location may be the same as or adjacent to the subcarrier number of the CRS, so that the UE can receive the downlink information and complete demodulation processing of the downlink data according to the downlink information. For example, when the downlink information received by the UE is a PDCCH or an EPDCCH, the UE may demodulate the downlink data according to downlink control information (DCI) information in the PDCCH or the EPDCCH; alternatively, when the downlink information received by the UE is a DMRS, the UE may demodulate the downlink data according to the DMRS information. A demodulation mode in the prior art may be used in a specific demodulation process. Details are not described herein.

According to the downlink information processing method provided in this embodiment, the UE determines that the cell-specific frequency shift of the downlink information is equal to the cell-specific frequency shift of the CRS, determines the resource element location according to the cell-specific frequency shift of the downlink information, receives the downlink information at the resource element location, and demodulates the downlink data according to the downlink information. In this embodiment, when the duration of the TTI is less than or equal to the time length of one timeslot, the UE resets, according to the cell-specific frequency shift of the downlink information, the resource element location for receiving the downlink information. Because the cell-specific frequency shift of the downlink information is equal to the cell-specific frequency shift of the CRS, the resource element location for receiving the downlink information varies with the resource element location for receiving the CRS, thereby ensuring that when the TTI becomes shorter, the UE can receive the downlink information within the current TTI and complete demodulation processing according to the downlink information.

Optionally, in the foregoing Embodiment 1, the downlink information includes any one of the DMRS, the PDCCH, or the EPDCCH.

The following describes detailed implementations of this embodiment of the present invention in multiple cases according to a type of information included in the downlink information and the duration of the TTI.

Embodiment 2

Figure 3:
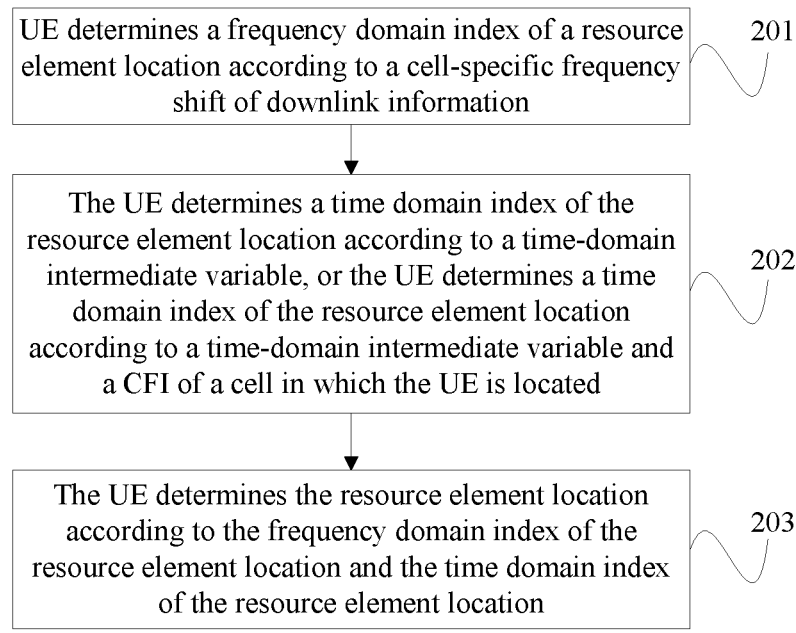
FIG. 3 is a flowchart of a downlink information processing method according to Embodiment 2 of the present invention.

FIG. 3 is a flowchart of a downlink information processing method according to Embodiment 2 of the present invention. This embodiment relates to a specific implementation process of the step "the UE determines the resource element location according to the cell-specific frequency shift of the downlink information" in a case in which the downlink information includes a DMRS and duration of a TTI is equal to a time length of one timeslot. As shown in FIG. 3, the method includes the following steps.

Step 201: The UE determines a frequency domain index k of the resource element location according to the cell-specific frequency shift of the downlink information.

In this embodiment, the determining, by the UE, a frequency domain index of the resource element location according to the cell-specific frequency shift of the downlink information includes: determining the frequency domain index k of the resource element location according to a formula $k=3m'+N_{sc}^{RB}n_{PRB}+k'+(v_{shift2}) \bmod 3+1$, where m'=0, 1, or 2, k'=0 or 1, $N_{sc}^{RB}$ is a frequency domain resource block size, $n_{PRB}$ is a physical resource block number and $n_{PRB}$ is a positive integer, and $v_{shift2}$ is the cell-specific frequency shift of the downlink information. It should be noted that, in this embodiment, a value of k' depends on a number p of an antenna port on which the DMRS is located. For example, when p∈{107,108}, k'=1; or when p∈{109,110}, k'=0. The port numbers 107, 108, 109, and 110 are merely an example for describing the solution in this embodiment. Alternatively, the number p of the antenna port on which the DMRS is located may be another port number. This is not limited in the present invention.

Step 202: The UE determines a time domain index of the resource element location according to a time-domain intermediate variable, or the UE determines a time domain index of the resource element location according to a time-domain intermediate variable and a control format indicator (CFI) of a cell in which the UE is located.

The time-domain intermediate variable is a variable determined according to a type of a subframe in which the TTI is located, and the CFI is control format indicator information carried on a physical control format indicator channel (PCFICH) of the cell in which the UE is located.

In this embodiment, when a resource element location for receiving a downlink signal may be set in a control region or a non-control region, the determining, by the UE, a time domain index of the resource element location according to a time-domain intermediate variable includes: determining the time domain index l of the resource element location according to a formula l=l' mod 2, where l' is the time-domain intermediate variable, $$l' = \begin{cases} 0, 1, 2, \text{ or } 3; & \text{if } n_s \bmod 2 = 0 \text{ and the } \mathit{TTI} \text{ is in a special subframe of configuration 1, 2, 6, or 7} \\ 0 \text{ or } 1; & \text{if the } \mathit{TTI} \text{ is in a subframe other than a special subframe of configuration 1, 2, 6, or 7} \end{cases},$$

and $n_s$ is an index of a timeslot in which the TTI is located.

In this embodiment, when a resource element location for receiving a downlink signal can be set only in a non-control region, the determining a time domain index of the resource element location according to a time-domain intermediate variable and a CFI of a cell in which the UE is located includes: determining, by the UE, the time domain index l of the resource element location according to a formula $$l = \begin{cases} l' \bmod 2 + \mathit{CFI}; & \text{if } n_s \bmod 2 = 0 \text{ and the } \mathit{TTI} \text{ is in a subframe other than a special subframe of configuration 1, 2, 6, or 7} \\ l' \bmod 2 + \mathit{CFI} + 3\lfloor l'/2 \rfloor; & \text{if } n_s \bmod 2 = 0 \text{ and the } \mathit{TTI} \text{ is in a special subframe of configuration 1, 2, 6, or 7} \end{cases},$$

where $n_s$ is an index of a timeslot in which the TTI is located, l' is the time-domain intermediate variable, and $$l' = \begin{cases} 0, 1, 2, \text{ or } 3; & \text{if } n_s \bmod 2 = 0 \text{ and the } \mathit{TTI} \text{ is in a special subframe of configuration 1, 2, 6, or 7} \\ 0 \text{ or } 1; & \text{if the } \mathit{TTI} \text{ is in a subframe other than a special subframe of configuration 1, 2, 6, or 7} \end{cases}.$$

In this embodiment, the downlink information is specifically the DMRS sent by a base station, and the duration of the TTI is equal to the time length of one timeslot. The time domain index of the resource element location is an index of a symbol included in the TTI, and the frequency domain index of the resource element location is a subcarrier number. The resource element location may be determined according to the frequency domain index of the resource element location and the time domain index of the resource element location. When the timeslot in which the TTI is located is a slot 1, because a control region of an existing LTE system does not exist in the slot 1, the time domain index of the resource element location needs to be determined according to only the time-domain intermediate variable, and the resource element location may be set to a relatively front symbol location in the timeslot, for example, a resource element location at which a subcarrier number is 0 and a symbol index is 2 in the slot 1, so as to provide more demodulation processing time for the UE. When the timeslot in which the TTI is located is a slot 0, because a control region of an existing LTE system may exist in the timeslot, the time domain index of the resource element location needs to be determined according to the time-domain intermediate variable and the CFI. Therefore, in this embodiment, the resource element location for receiving the downlink information within the TTI less than or equal to the time length of one timeslot cannot be set to a resource element location of the control region of the existing LTE system, so as to avoid a case in which a process in which UE still using a legacy demodulation mode receives control information in the control region is affected when the downlink information is received within the TTI less than or equal to the time length of one timeslot. For example, the downlink signal cannot be received at a resource element location at which a subcarrier number is 0 and a symbol index is 2 in the slot 0.

It should be noted that, in this embodiment, the slot 0 represents a timeslot whose timeslot index mod 2 is equal to 0, and the slot 1 represents a timeslot whose timeslot index mod 2 is equal to 1. A frequency domain resource or time domain resource used in the TTI less than or equal to the time length of one timeslot may be different from that used in the existing LTE system. In this case, the time domain index of the resource element location needs to be determined according to only the time-domain intermediate variable, without differentiating a relationship between the slot 0 and the slot 1.

It should be noted that a condition for a value of the time-domain intermediate variable l' provided in this embodiment is merely an example showing that a subframe type in the solution in this embodiment coexists with that of the existing LTE system. Alternatively, l' may be a value in {0, 1}, {2, 3}, or {0, 1, 2, 3}. This is not limited in the present invention.

Step 203: The UE determines the resource element location according to the frequency domain index of the resource element location and the time domain index of the resource element location.

It should be noted that other steps in this embodiment are the same as the method steps in the embodiment shown in FIG. 2. Details are not described herein again.

According to the downlink information processing method provided in this embodiment, the downlink information includes the DMRS and the duration of the TTI is equal to the time length of one timeslot, the UE determines the frequency domain index of the resource element location according to the cell-specific frequency shift of the downlink information and determines the time domain index of the resource element location according to the time-domain intermediate variable, or determines the frequency domain index of the resource element location according to the cell-specific frequency shift of the downlink information and determines the time domain index of the resource element location according to the time-domain intermediate variable and the CFI of the cell in which the UE is located, and then determines the resource element location according to the frequency domain index of the resource element location and the time domain index of the resource element location; and the UE receives the downlink information at the resource element location within the TTI, and demodulates downlink data according to the downlink information. For timeslots in which different TTIs are located, the UE may determine a frequency domain index of a resource element location according to the cell-specific frequency shift of the downlink information, and determine a time domain index of the resource element location according to a time-domain intermediate variable, or determine a time domain index of the resource element location according to a time-domain intermediate variable and a CFI. In this way, not only the downlink information can be received at a front symbol location in the timeslot in which the TTI is located, so as to provide more demodulation processing time for the UE, but also the resource element location can be prevented from being set to the resource element location of the control region, so as to avoid a case in which receiving of the control information in the control region by the UE still using the legacy demodulation mode in the existing LTE system is affected when the UE receives the downlink information within the TTI whose duration is the time length of one timeslot.

Embodiment 3

Figure 4:
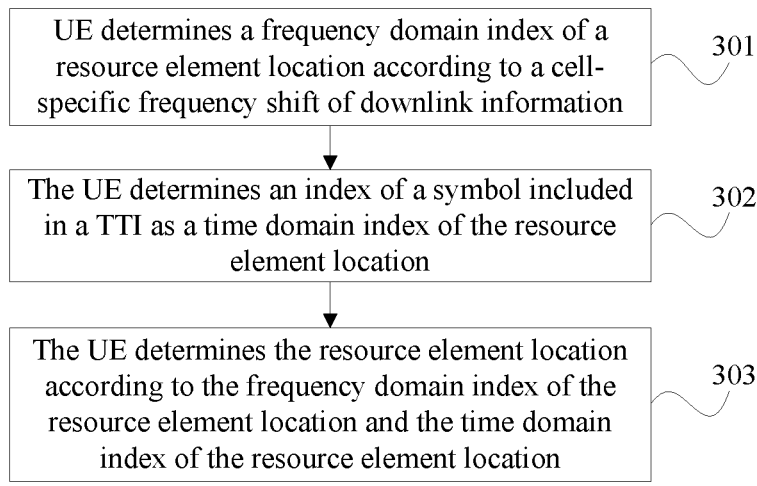
FIG. 4 is a flowchart of a downlink information processing method according to Embodiment 3 of the present invention.

FIG. 4 is a flowchart of a downlink information processing method according to Embodiment 3 of the present invention. This embodiment relates to a specific implementation of the step "the UE determines the resource element location according to the cell-specific frequency shift of the downlink information" in a case in which the downlink information includes a DMRS and duration of a TTI is greater than or equal to a time length of one symbol and less than a time length of one timeslot. As shown in FIG. 4, the method includes the following steps.

Step 301: The UE determines a frequency domain index k of the resource element location according to the cell-specific frequency shift of the downlink information.

In this embodiment, the determining a frequency domain index of the resource element location according to the cell-specific frequency shift of the downlink information includes: determining the frequency domain index k of the resource element location according to a formula $k=6m'+N_{sc}^{RB}n_{PRB}+(k'+v_{shift2})\mod 6$; $l\ne l''$, where $m'=0$ or 1, $k'=0$ or 3, $$l'' = \begin{cases} 0 \text{ or } N_{symb}^{DL} - 3; & \text{if } n = 1 \text{ or } 2 \\ 0, 1, \text{ or } N_{symb}^{DL} - 3; & \text{if } n = 4 \end{cases},$$

$N_{sc}^{RB}$ is a frequency domain resource block size, $n_{PRB}$ is a physical resource block number and $n_{PRB}$ is a positive integer, $v_{shift2}$ is the cell-specific frequency shift of the downlink information, n is a quantity of antenna ports configured for CRSs of a cell in which the UE is located, $N_{symb}^{DL}$ is a quantity of orthogonal frequency division multiple access (OFDMA) symbols or single-carrier frequency division multiple access (SC-FDMA) symbols in one downlink timeslot, and l is a time domain index of the resource element location.

In this embodiment, a time-domain intermediate variable l'' is determined by the UE according to the quantity $N_{symb}^{DL}$ of OFDM symbols or SC-FDMA symbols in one downlink timeslot and the quantity n of antenna ports configured for the CRSs of the cell in which the UE is located. When l=l'', the frequency domain index k of the resource element location is determined according to the formula $k=6m'+N_{sc}^{RB}n_{PRB}+(k'+v_{shift2})\mod 6$. The resource element location determined by using this method may be a resource element location of a non-control region or may be a resource element location of a control region. As shown in FIG. 1, the UE may receive the DMRS at a resource element location of a control region at which a symbol index is 3 and a subcarrier number is 0 in a slot 0. In this way, when the duration of the TTI is less than the time length of one timeslot, the UE can still receive the DMRS, so as to complete demodulation processing.

It should be noted that, in this embodiment, if l=l'', the UE does not need to receive the DMRS sent by a base station, but uses the CRS signal to demodulate downlink data. In addition, in this embodiment, a value of k' depends on a number p of an antenna port on which the DMRS is located. For example, when p∈{107}, k'=0; or when p∈{108}, k'=3. The port numbers 107 and 108 are merely an example for describing the solution in this embodiment. Alternatively, the number p of the antenna port on which the DMRS is located may be another port number. This is not limited in the present invention.

In this embodiment, the step "the UE determines a frequency domain index k of the resource element location according to the cell-specific frequency shift of the downlink information" may alternatively be implemented by using the following method, including: determining the frequency domain index k of the resource element location according to a formula $k=6m'+N_{sc}^{RB}n_{PRB}+(k'+v_{shift2})\mod 6$; $l\ne l''$, where $m'=0$ or 1, $k'=0$ or 3, $$l'' = \begin{cases} 0 \text{ or } N_{symb}^{DL} - 3; & \text{if } n_s \mod 2 = 1 \text{ and} \\ & n = 1 \text{ or } 2 \\ 0, 1, \text{ or } N_{symb}^{DL} - 3; & \text{if } n_s \mod 2 = 1 \text{ and } n = 4 \\ (0 \text{ to } CFI - 1) \text{ or } N_{symb}^{DL} - 3; & \text{if } n_s \mod 2 = 0 \text{ and} \\ & n = 1 \text{ or } 2 \\ (0 \text{ to } \max(CFI - 1, 1)) \text{ or } N_{symb}^{DL} - 3; & \text{if } n_s \mod 2 = 0 \text{ and } n = 4 \end{cases},$$

$N_{sc}^{RB}$ is a frequency domain resource block size, $n_{PRB}$ is a physical resource block number and $n_{PRB}$ is a positive integer, $v_{shift2}$ is the cell-specific frequency shift of the downlink information, n is a quantity of antenna ports configured for CRSs of a cell in which the UE is located, $N_{symb}^{DL}$ is a quantity of OFDM symbols or SC-FDMA symbols in one downlink timeslot, a CFI is control format indicator information carried on a PCFICH of the cell in which the UE is located, $n_s$ is an index of a timeslot in which the TTI is located, and l is a time domain index of the resource element location. It should be noted that the CFI may be a value and a value range of the CFI is (1, 2, 3). Therefore, 0 to CFI-1 indicates that a value of l'' is any integer in an interval between 0 and CFI-1. For example, if the value of the CFI is equal to 3, the value of l'' is 0, 1, or 2. Likewise, 0 to max(CFI-1, 1) indicates that the value of l" is any integer in an interval between 0 and max(CFI-1, 1). For example, if the value of the CFI is equal to 1, the value of l" is 0 or 1. For example, a CFI value is determined according to a CFI code word. Table 1 is a relationship between a CFI value and a CFI code word.

TABLE 1

| CFI | CFI code word $<b_0, b_1, \ldots, b_{31}>$ |
|---|---|
| 1 | <0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1> |
| 2 | <1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0> |
| 3 | <1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1> |
| 4 (Reserved) | <0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0> |

In this embodiment, a time-domain intermediate variable l" is a variable determined by the UE according to the quantity $N_{symb}^{DL}$ of OFDM symbols or SC-FDMA symbols in one downlink timeslot, the quantity n of antenna ports configured for the CRSs of the cell in which the UE is located, the CFI, and the index of the timeslot in which the TTI is located. When l=l", the frequency domain index k of the resource element location is determined according to the formula $k = 6m' + N_{sc}^{RB}n_{PRB} + (k' + v_{shift2}) \mod 6$. The time-domain intermediate variable l" is limited, so that the resource element location does not coincide with a resource element location of a control region, thereby avoiding a case in which a process in which UE still using a legacy demodulation mode receives control information in the control region is affected when the UE receives the downlink information within the TTI that is less than the time length of one timeslot and greater than or equal to the time length of one symbol. As shown in FIG. 1, the UE cannot receive the DMRS at a resource element location at which a symbol index is 2 and a subcarrier number is 0 in a slot 0.

It should be noted that, in this embodiment, if l=l", the UE does not need to receive the DMRS sent by a base station, but uses the CRS signal to demodulate downlink data.

Step 302: The UE determines an index of a symbol included in the TTI as a time domain index of the resource element location.

The symbol is an OFDMA symbol or an SC-FDMA symbol.

In this embodiment, because the duration of the TTI is greater than or equal to the time length of one symbol and less than the time length of one timeslot, the time domain index of the resource element location is the index of the symbol on which the TTI is located. For example, as shown in FIG. 1, if symbols on which a TTI is located are a symbol 4 and a symbol 5 in the slot 0, time domain indexes of resource element locations are 4 and 5, that is, the UE can receive the downlink information at the resource element locations corresponding to the symbols on which the TTI is located, that is, the symbol 4 and the symbol 5 in the slot 0.

Step 303: The UE determines the resource element location according to the frequency domain index of the resource element location and the time domain index of the resource element location.

The time-domain intermediate variable is a variable determined according to a type of a subframe in which the TTI is located.

In this embodiment, the time domain index of the resource element location is the index of the symbol included in the TTI, and the frequency domain index of the resource element location is a subcarrier number. The resource element location may be determined according to the frequency domain index of the resource element location and the time domain index of the resource element location.

It should be noted that other steps in this embodiment are the same as the method steps in the embodiment shown in FIG. 2. Details are not described herein again.

According to the downlink information processing method provided in this embodiment, the downlink information includes the DMRS and the duration of the TTI is greater than or equal to the time length of one symbol and less than the time length of one timeslot, the UE determines the frequency domain index of the resource element location according to the cell-specific frequency shift of the downlink information, determines the index of the symbol included in the TTI as the time domain index of the resource element location, and determines the resource element location according to the frequency domain index of the resource element location and the time domain index of the resource element location. In this way, when the duration of the TTI is greater than or equal to the time length of one symbol and less than the time length of one timeslot, the UE can still receive the downlink information and complete demodulation processing of the downlink data according to the downlink information.

Embodiment 4

Figure 5:
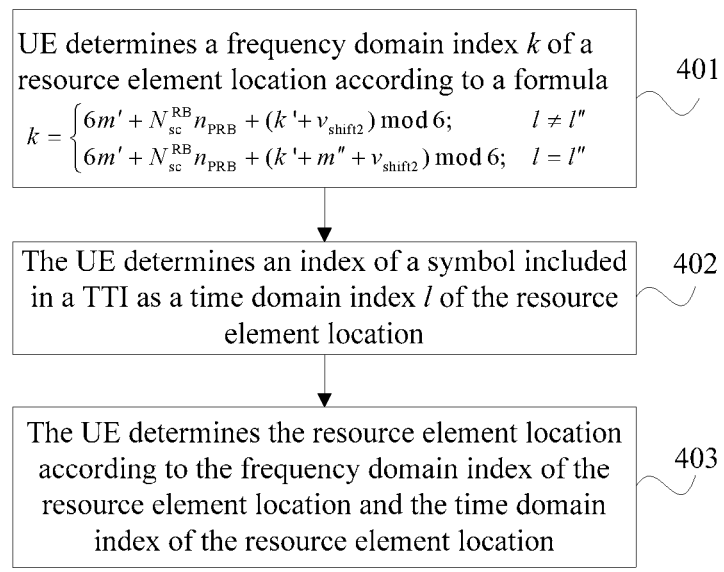
FIG. 5 is a flowchart of a downlink information processing method according to Embodiment 4 of the present invention.

FIG. 5 is a flowchart of a downlink information processing method according to Embodiment 4 of the present invention. This embodiment relates to a specific implementation of the step "the UE determines the resource element location according to the cell-specific frequency shift of the downlink information" in a case in which the downlink information includes a PDCCH or an EPDCCH. As shown in FIG. 5, the method includes the following steps.

Step 401: The UE determines a frequency domain index k of the resource element location according to a formula $$k = \begin{cases} 6m' + N_{sc}^{RB}n_{PRB} + (k' + v_{shift2}) \mod 6; & l \neq l'' \\ 6m' + N_{sc}^{RB}n_{PRB} + (k' + m'' + v_{shift2}) \mod 6; & l = l'' \end{cases}.$$

m'=0 or 1, $$l'' = \begin{cases} 0 \text{ or } N_{symb}^{DL} - 3; & \text{if } n = 1 \text{ or } 2 \\ 0, 1, \text{ or } N_{symb}^{DL} - 3; & \text{if } n = 4 \end{cases},$$

k'=0 or 3, $N_{sc}^{RB}$ is a frequency domain resource block size, $n_{PRB}$ is a physical resource block number and $n_{PRB}$ is a positive integer, $v_{shift2}$ is the cell-specific frequency shift of the downlink information, n is a quantity of antenna ports configured for CRSs of a cell in which the UE is located, $N_{symb}^{DL}$ is a quantity of OFDM symbols or SC-FDMA symbols in one downlink timeslot, and m" is any one or a combination of −2, −1, 1, or 2.

In this embodiment, a time-domain intermediate variable l" is a variable determined by the UE according to the quantity $N_{symb}^{DL}$ of OFDM symbols or SC-FDMA symbols in one downlink timeslot and the quantity n of antenna ports configured for the CRSs of the cell in which the UE is located. In this method, considering that a frequency domain resource or time domain resource used by the UE within a TTI less than or equal to a time length of one timeslot may be different from that used by UE within a TTI whose duration is 1 ms in an existing LTE system, the resource element location may be set to a resource element location of a non-control region or may be set to a resource element location of a control region.

In this embodiment, the UE may receive the PDCCH or the EPDCCH at a resource element location of a symbol on which the TTI is located, so that the UE can demodulate downlink data within a shorter TTI, thereby achieving a shorter round trip time (RTT) and a shorter data transmission delay.

Optionally, in this embodiment, if the downlink information includes a PDCCH or an EPDCCH, considering that a segment of time domain or frequency domain resource used by the UE within a TTI less than or equal to a time length of one timeslot may be the same as that used by UE using a legacy demodulation mode, the step "determining the resource element location according to the cell-specific frequency shift of the downlink information" may alternatively be completed by using the following method, and the method is specifically as follows:

The UE determines a frequency domain index k of the resource element location according to a formula $$k = \begin{cases} 6m' + N_{sc}^{RB} n_{PRB} + (k' + v_{shift2}) \bmod 6; & l \neq l'' \\ 6m' + N_{sc}^{RB} n_{PRB} + (k' + m'' + v_{shift2}) \bmod 6; & l = l'' \end{cases},$$

where m'=0 or 1, $$l'' = \begin{cases} 0 \text{ or } N_{symb}^{DL} - 3; & \text{if } n_s \bmod 2 = 1 \text{ and } n = 1 \text{ or } 2 \\ 0, 1, \text{ or } N_{symb}^{DL} - 3; & \text{if } n_s \bmod 2 = 1 \text{ and } n = 4 \\ (0 \text{ to } CFI-1) \text{ or } N_{symb}^{DL} - 3; & \text{if } n_s \bmod 2 = 0 \text{ and } n = 1 \text{ or } 2 \\ (0 \text{ to } \max(CFI-1, 1)) \text{ or } & \text{if } n_s \bmod 2 = 0 \text{ and } n = 4 \\ N_{symb}^{DL} - 3; \end{cases}$$

k'=0 or 3, $N_{sc}^{RB}$ is a frequency domain resource block size, $n_{PRB}$ is a physical resource block number and $n_{PRB}$ is a positive integer, $v_{shift2}$ is the cell-specific frequency shift of the downlink information, n is a quantity of antenna ports configured for CRSs of a cell in which the UE is located, $N_{symb}^{DL}$ is a quantity of OFDM symbols or SC-FDMA symbols in one downlink timeslot, m" is any one or a combination of −2, −1, 1, or 2, a CFI is control format indicator information carried on a PCFICH of the cell in which the UE is located, and $n_s$ is an index of a timeslot in which the TTI is located. It should be noted that the CFI may be a value and a value range of the CFI is (1, 2, 3). Therefore, 0 to CFI-1 indicates that a value of l" is any integer in an interval between 0 and CFI-1. For example, if a value of the CFI is equal to 3, the value of l" is 0, 1, or 2. Likewise, 0 to max(CFI-1, 1) indicates that the value of l" is any integer in an interval between 0 and max(CFI-1, 1). For example, if the value of the CFI is equal to 1, the value of l" is 0 or 1.

In this embodiment, considering that the segment of time domain resource or frequency domain resource used by the UE within the TTI less than or equal to the time length of one timeslot may be the same as that used by the UE using the legacy demodulation mode, the UE can receive the PDCCH or the EPDCCH within the TTI less than or equal to the time length of one timeslot only at a resource element location of a non-control region, so as to avoid a case in which a process in which the UE still using the legacy demodulation mode receives control information in a control region is affected when the UE receives the downlink information within the TTI less than or equal to the time length of one timeslot. Therefore, a time-domain intermediate variable l" is related to the CFI and the index of the timeslot in which the TTI is located. For example, in a slot 0 shown in FIG. 1, the UE cannot receive the PDCCH or the EPDCCH within the TTI less than or equal to the time length of one timeslot at a resource element location at which a symbol index is 3 and a subcarrier number is 0.

Step 402: The UE determines an index of a symbol included in a TTI as a time domain index l of the resource element location.

The symbol is an OFDM symbol or an SC-FDMA symbol.

In this embodiment, because duration of the TTI is greater than or equal to a time length of one symbol and less than the time length of one timeslot, the time domain index of the resource element location is the index l of the symbol included in the TTI.

Step 403: The UE determines the resource element location according to the frequency domain index of the resource element location and the time domain index of the resource element location.

It should be noted that other steps in this embodiment are the same as the method steps in the embodiment shown in FIG. 2. Details are not described herein again.

According to the downlink information processing method provided in this embodiment, the downlink information includes the PDCCH or the EPDCCH, the UE determines the frequency domain index of the resource element location according to the formula $$k = \begin{cases} 6m' + N_{sc}^{RB} n_{PRB} + (k' + v_{shift2}) \bmod 6; & l \neq l'' \\ 6m' + N_{sc}^{RB} n_{PRB} + (k' + m'' + v_{shift2}) \bmod 6; & l = l'' \end{cases},$$

and determines the index of the symbol included in the TTI as the time domain index l of the resource element location, so that when the downlink information is a downlink control channel such as the PDCCH or the EPDCCH, the UE can still receive the downlink information and complete demodulation processing of the downlink data according to the downlink information. In addition, the time-domain intermediate variable may be limited, so as to flexibly set whether the resource element location can coincide with the resource element location of the control region, so that the UE can select a proper method according to a current situation to set a resource element location for receiving the downlink information. This improves downlink information reception performance of the UE, and can avoid the case in which the process in which the UE still using the legacy demodulation mode receives the control information in the control region is affected when the UE receives the downlink information within the TTI less than or equal to the time length of one timeslot.

Optionally, in any one of the foregoing embodiments, before the UE determines that the cell-specific frequency shift of the downlink information is equal to the cell-specific frequency shift of the CRS, the method further includes: determining, by the UE, the cell-specific frequency shift $v_{shift1}$ of the CRS according to a formula $v_{shift1}=N_{ID}^{cell}$ mod 6, where $N_{ID}^{cell}$ is a physical layer cell identifier of the cell in which the UE is located.

Embodiment 5

Figure 6A:
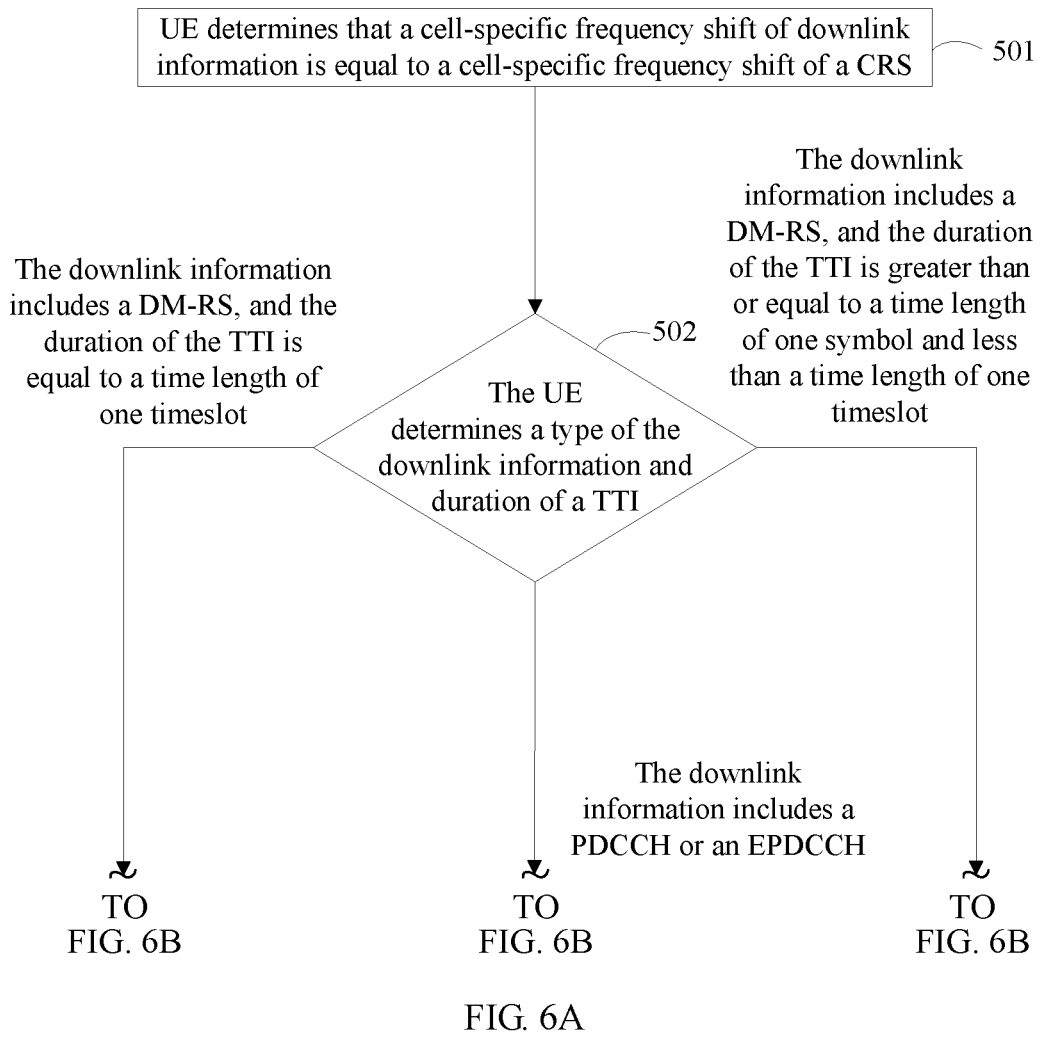
FIG. 6A and FIG. 6B are an instance flowchart of a downlink information processing method according to Embodiment 5 of the present invention.
Figure 6B:
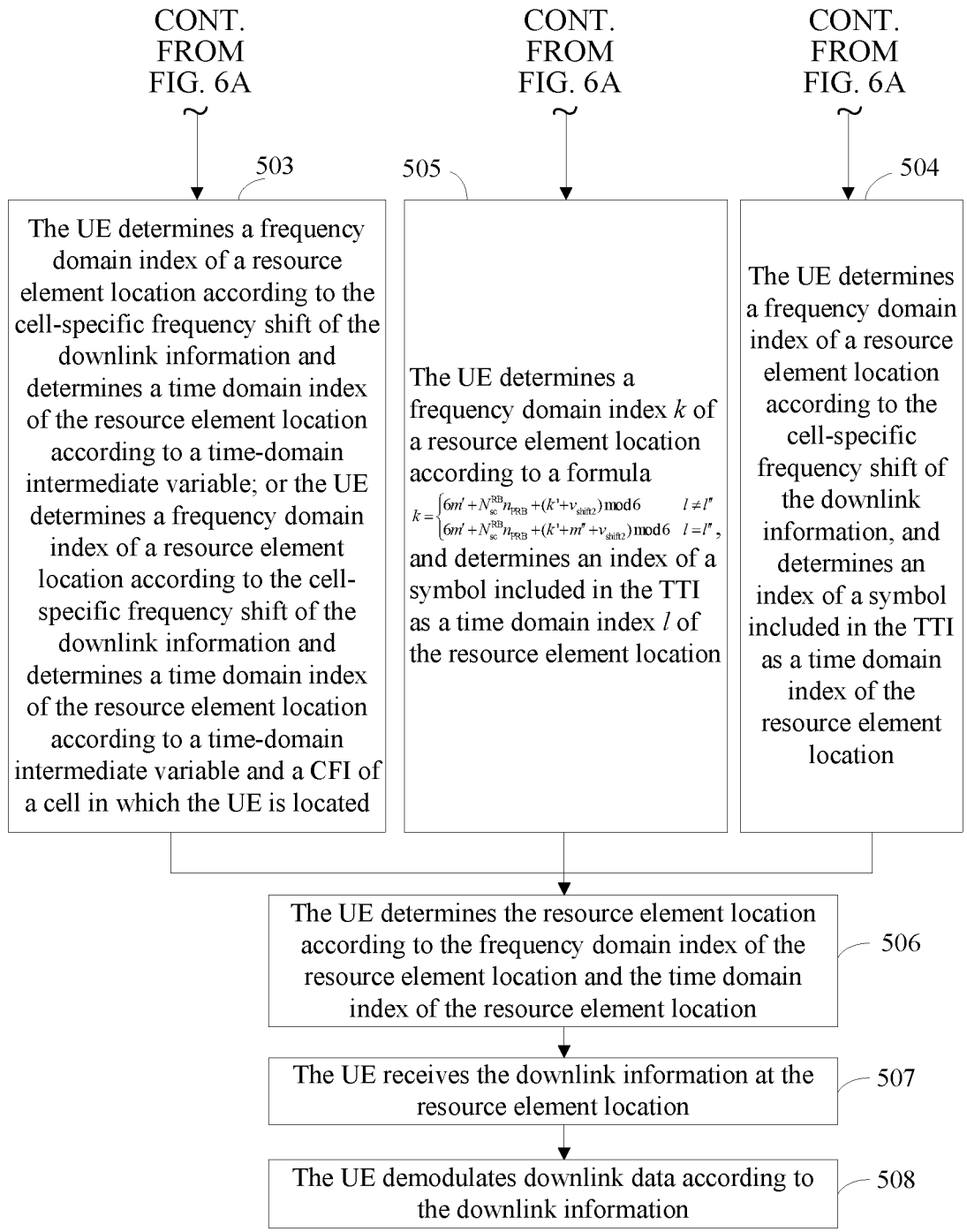

FIG. 6A and FIG. 6B are an instance flowchart of a downlink information processing method according to Embodiment 5 of the present invention. As shown in FIG. 6A and FIG. 6B, the method includes the following steps.

Step 501: UE determines that a cell-specific frequency shift of downlink information is equal to a cell-specific frequency shift of a CRS.

The CRS is a cell-specific reference signal of a cell in which the UE is located, and the downlink information includes any one of a DMRS, a PDCCH, or an EPDCCH.

In this embodiment, the UE determines the cell-specific frequency shift $v_{shift1}$ of the CRS according to a formula $v_{shift1}=N_{ID}^{cell}$ mod 6, where $N_{ID}^{cell}$ is a physical layer cell identifier of the cell in which the UE is located.

Step 502: The UE determines a type of the downlink information and duration of a TTI; the UE performs step 503 if the downlink information includes a DMRS and the duration of the TTI is equal to a time length of one timeslot; or the UE performs step 504 if the downlink information includes a DMRS and the duration of the TTI is greater than or equal to a time length of one symbol and less than a time length of one timeslot; or the UE performs step 505 if the downlink information includes a PDCCH or an EPDCCH.

Step 503: The UE determines a frequency domain index k of a resource element location according to the cell-specific frequency shift of the downlink information and determines a time domain index of the resource element location according to a time-domain intermediate variable; or the UE determines a frequency domain index k of a resource element location according to the cell-specific frequency shift of the downlink information and determines a time domain index of the resource element location according to a time-domain intermediate variable and a CFI of a cell in which the UE is located; then, the UE performs step 506.

In this embodiment, the determining, by the UE, a frequency domain index of a resource element location according to the cell-specific frequency shift of the downlink information includes: determining, by the UE, the frequency domain index k of the resource element location according to a formula $k=3m'+N_{sc}^{RB}n_{PRB}+k'+(v_{shift2})$mod 3+1, where m'=0, 1, or 2, k'=0 or 1, $N_{sc}^{RB}$ is a frequency domain resource block size, $n_{PRB}$ is a physical resource block number and $n_{PRB}$ is a positive integer, and $v_{shift2}$ is the cell-specific frequency shift of the downlink information.

In this embodiment, the UE determines the time domain index of the resource element location by using the following two specific methods:

A first method: If the UE receives the downlink information within the TTI whose duration is the time length of one timeslot, and a frequency domain resource or time domain resource used by the UE is different from that used by UE using a legacy demodulation mode in an existing LTE system, the UE may receive the DMRS at a resource element location of a control region or a non-control region. Specifically, the UE determines the time domain index l of the resource element location according to a formula l=l' mod 2, where l' is the time-domain intermediate variable, $$l' = \begin{cases} 0, 1, 2, \text{ or } 3; & \text{if } n_s \bmod 2 = 0 \text{ and the } TTI \text{ is in a special} \\ & \text{subframe of configuration 1, 2, 6, or 7} \\ 0 \text{ or } 1; & \text{if the } TTI \text{ is in a subframe other than a} \\ & \text{special subframe of configuration 1, 2, 6, or 7} \end{cases},$$

and $n_s$ is an index of a timeslot in which the TTI is located.

A second method: If the UE receives the downlink information within the TTI whose duration is the time length of one timeslot, and a frequency domain resource or time domain resource used by the UE is the same as that used by UE using a legacy demodulation mode in an existing LTE system, the UE can receive the DMRS only at a resource element location of a non-control region, so as to avoid a case in which receiving of control information in a control region by the UE still using the legacy demodulation mode in the existing LTE system is affected when the UE receives the downlink information within the TTI whose duration is the time length of one timeslot. Specifically, the UE determines the time domain index l of the resource element location according to a formula $$l = \begin{cases} l' \bmod 2 + CFI; & \text{if } n_s \bmod 2 = 0 \text{ and the } TTI \text{ is} \\ & \text{in a special subframe of configuration} \\ & 1, 2, 6, \text{ or } 7 \\ l' \bmod 2 + CFI + 3\lfloor l'/2 \rfloor; & \text{if } n_s \bmod 2 = 0 \text{ and the } TTI \text{ is} \\ & \text{in a special subframe of configuration} \\ & 1, 2, 6, \text{ or } 7 \end{cases},$$

where $n_s$ is an index of a timeslot in which the TTI is located, l' is the time-domain intermediate variable, and $$l' = \begin{cases} 0, 1, 2, \text{ or } 3; & \text{if } n_s \bmod 2 = 0 \text{ and the } TTI \text{ is in a special} \\ & \text{subframe of configuration 1, 2, 6, or 7} \\ 0 \text{ or } 1; & \text{if the } TTI \text{ is in a subframe other than a} \\ & \text{special subframe of configuration 1, 2, 6, or 7} \end{cases}.$$

Step 504: The UE determines a frequency domain index k of a resource element location according to the cell-specific frequency shift of the downlink information, and determines an index of a symbol included in the TTI as a time domain index of the resource element location; then, the UE performs step 506.

In this embodiment, because the duration of the TTI is the time length of one symbol, the time domain index of the resource element location is the index of the symbol included in the TTI. The frequency domain index of the resource element location is determined by using the following two specific methods:

A first method: If the UE receives the downlink information within the TTI whose duration is greater than or equal to the time length of one symbol and less than the time length of one timeslot, and a frequency domain resource or time domain resource used by the UE is different from that used by UE using a legacy demodulation mode, the UE may receive the DMRS at a resource element location of a control region or a non-control region. Specifically, the UE determines the frequency domain index k of the resource element location according to a formula $k=6m'+N_{sc}^{RB}n_{PRB}+(k'+v_{shift2})$mod 6; l≠l", where m"=0 or 1, k'=0 or 3, $$l'' = \begin{cases} 0 \text{ or } N_{symb}^{DL} - 3; & \text{if } n = 1 \text{ or } 2 \\ 0, 1, \text{ or } N_{symb}^{DL} - 3; & \text{if } n = 4 \end{cases},$$

$N_{sc}^{RB}$ is a frequency domain resource block size, $n_{PRB}$ is a physical resource block number and $n_{PRB}$ is a positive integer, $v_{shift2}$ is the cell-specific frequency shift of the downlink information, n is a quantity of antenna ports configured for CRSs of the cell in which the UE is located, $N_{symb}^{DL}$ is a quantity of OFDM symbols or SC-FDMA symbols in one downlink timeslot, and l is the time domain index of the resource element location.

A second method: If the UE receives the downlink information within the TTI whose duration is greater than or equal to the time length of one symbol and less than the time length of one timeslot, and a frequency domain resource or time domain resource used by the UE is the same as that used by UE using a legacy demodulation mode in an existing LTE system, the UE can receive the DMRS only at a resource element location of a non-control region, so as to avoid affecting receiving of control information in a control region by the UE using the legacy demodulation mode in the existing LTE system. Specifically, the UE determines the frequency domain index k of the resource element location according to a formula $k = 6m' + N_{sc}^{RB} n_{PRB} + (k' + v_{shift2}) \mod 6$; $l \neq l''$, where m'=0 or 1, k'=0 or 3, $$l'' = \begin{cases} 0 \text{ or } N_{symb}^{DL} - 3; & \text{if } n_s \mod 2 = 1 \text{ and } n = 1 \text{ or } 2 \\ 0, 1, \text{ or } N_{symb}^{DL} - 3; & \text{if } n_s \mod 2 = 1 \text{ and } n = 4 \\ (0 \text{ to } CFI - 1) \text{ or } N_{symb}^{DL} - 3; & \text{if } n_s \mod 2 = 0 \text{ and } n = 1 \text{ or } 2, \\ (0 \text{ to } \max(CFI - 1, 1)) \text{ or } & \text{if } n_s \mod 2 = 0 \text{ and } n = 4 \\ N_{symb}^{DL} - 3; \end{cases}$$

$N_{sc}^{RB}$ is a frequency domain resource block size, $n_{PRB}$ is a physical resource block number and $n_{PRB}$ is a positive integer, $v_{shift2}$ is the cell-specific frequency shift of the downlink information, n is a quantity of antenna ports configured for CRSs of the cell in which the UE is located, $N_{symb}^{DL}$ is a quantity of OFDM symbols or SC-FDMA symbols in one downlink timeslot, a CFI is control format indicator information carried on a PCFICH of the cell in which the UE is located, $n_s$ is an index of a timeslot in which the TTI is located, and the time domain index l of the resource element location is the index of the symbol included in the TTI. It should be noted that the CFI may be a value and a value range of the CFI is (1, 2, 3). Therefore, 0 to CFI-1 indicates that a value of l" is any integer in an interval between 0 and CFI-1. For example, if a value of the CFI is equal to 3, the value of l" is 0, 1, or 2. Likewise, 0 to max(CFI-1, 1) indicates that the value of l" is any integer in an interval between 0 and max(CFI-1, 1). For example, if the value of the CFI is equal to 1, the value of l" is 0 or 1.

Step 505: The UE determines a frequency domain index k of a resource element location according to a formula $$k = \begin{cases} 6m' + N_{sc}^{RB} n_{PRB} + (k' + v_{shift2}) \mod 6; & l \neq l'' \\ 6m' + N_{sc}^{RB} n_{PRB} + (k' + m'' + v_{shift2}) \mod 6; & l = l'' \end{cases},$$

and determines an index of a symbol included in the TTI as a time domain index l of the resource element location, where m'=0 or 1, l" is an intermediate time-domain variable, k'=0 or 3, $N_{sc}^{RB}$ is a frequency domain resource block size, $n_{PRB}$ is a physical resource block number and $n_{PRB}$ is a positive integer, $v_{shift2}$ is the cell-specific frequency shift of the downlink information, n is a quantity of antenna ports configured for CRSs of a cell in which the UE is located, and m" is any one or a combination of −2, −1, 1, or 2.

In this embodiment, the downlink information is the PDCCH or the EPDCCH. Because the PDCCH or the EPDCCH is corresponding to one symbol, the time domain index l of the resource element location is the index of the symbol included in the TTI. In this embodiment, a value of the frequency domain index of the resource element location may be changed by controlling a value of the intermediate variable l", and there are the following two methods:

A first method: If a frequency domain resource or time domain resource used by the UE is different from that used by UE using a legacy demodulation mode, the UE may receive the DMRS at a resource element location of a control region or a non-control region, $$l'' = \begin{cases} 0 \text{ or } N_{symb}^{DL} - 3; & \text{if } n = 1 \text{ or } 2 \\ 0, 1, \text{ or } N_{symb}^{DL} - 3; & \text{if } n = 4 \end{cases},$$

and $N_{symb}^{DL}$ is a quantity of OFDM symbols or SC-FDMA symbols in one downlink timeslot.

A second method: If a frequency domain resource or time domain resource used by the UE is the same as that used by UE using a legacy demodulation mode in an existing LTE system, the UE can receive the DMRS only at a resource element location of a non-control region, so as to avoid affecting receiving of control information in a control region by the UE using the legacy demodulation mode in the existing LTE system, $$l'' = \begin{cases} 0 \text{ or } N_{symb}^{DL} - 3; & \text{if } n_s \mod 2 = 1 \text{ and } n = 1 \text{ or } 2 \\ 0, 1, \text{ or } N_{symb}^{DL} - 3; & \text{if } n_s \mod 2 = 1 \text{ and } n = 4 \\ (0 \text{ to } CFI - 1) \text{ or } N_{symb}^{DL} - 3; & \text{if } n_s \mod 2 = 0 \text{ and } n = 1 \text{ or } 2, \\ (0 \text{ to } \max(CFI - 1, 1)) \text{ or } & \text{if } n_s \mod 2 = 0 \text{ and } n = 4 \\ N_{symb}^{DL} - 3; \end{cases}$$

k'=0 or 3, n is a quantity of antenna ports configured for CRSs of the cell in which the UE is located, $N_{symb}^{DL}$ is a quantity of OFDM symbols or SC-FDMA symbols in one downlink timeslot, a CFI is control format indicator information carried on a PCFICH of the cell in which the UE is located, and $n_s$ is an index of a timeslot in which the TTI is located. It should be noted that a value range of the CFI is (1, 2, 3). Therefore, 0 to CFI-1 indicates that a value of l" is any integer in an interval between 0 and CFI-1. For example, if a value of the CFI is equal to 3, the value of l" is 0, 1, or 2. Likewise, 0 to max(CFI-1, 1) indicates that the value of l" is any integer in an interval between 0 and max(CFI-1, 1). For example, if the value of the CFI is equal to 1, the value of l" is 0 or 1.

Step 506: The UE determines the resource element location according to the frequency domain index of the resource element location and the time domain index of the resource element location.

Step 507: The UE receives the downlink information at the resource element location.

Step 508: The UE demodulates downlink data according to the downlink information.

According to the downlink information processing method provided in this embodiment, the UE determines that the cell-specific frequency shift of the downlink information is equal to the cell-specific frequency shift of the CRS; determines the type of the downlink information and the duration of the TTI; and if the downlink information includes the DMRS and the duration of the TTI is equal to the time length of one timeslot, determines the frequency domain index of the resource element location according to the cell-specific frequency shift of the downlink information and determines the time domain index of the resource element location according to the time-domain intermediate variable, or determines the frequency domain index of the resource element location according to the cell-specific frequency shift of the downlink information and determines the time domain index of the resource element location according to the time-domain intermediate variable and the CFI of the cell in which the UE is located; if the downlink information includes the DMRS and the duration of the TTI is greater than or equal to the time length of one symbol and less than the time length of one timeslot, determines the frequency domain index of the resource element location according to the cell-specific frequency shift of the downlink information and determines the index of the symbol included in the TTI as the time domain index l of the resource element location; or if the downlink information includes the PDCCH or the EPDCCH, determines the frequency domain index of the resource element location according to the formula $$k = \begin{cases} 6m' + N_{sc}^{RB} n_{PRB} + (k' + v_{shift2}) \bmod 6; & l \neq l'' \\ 6m' + N_{sc}^{RB} n_{PRB} + (k' + m'' + v_{shift2}) \bmod 6; & l = l'' \end{cases}$$

and determines the index of the symbol included in the TTI as the time domain index l of the resource element location; and then the UE determines the resource element location according to the frequency domain index of the resource element location and the time domain index of the resource element location. In this embodiment, the resource element location is obtained by using different methods according to a type of a received signal and the duration of the TTI, so that the UE can receive the downlink information within the TTI in various cases, and demodulate the downlink data according to the downlink information. Particularly, when a frequency domain resource and a time domain resource used by the UE within a relatively short TTI are the same as those used by the UE using the legacy demodulation mode in the existing LTE system, the resource element location is prevented from being set in the control region, so as to avoid a technical problem that receiving of the control information in the control region by the UE using the legacy demodulation mode in the existing LTE system is affected when the UE receives the downlink information within the relatively short TTI.

Embodiment 6

Figure 7:
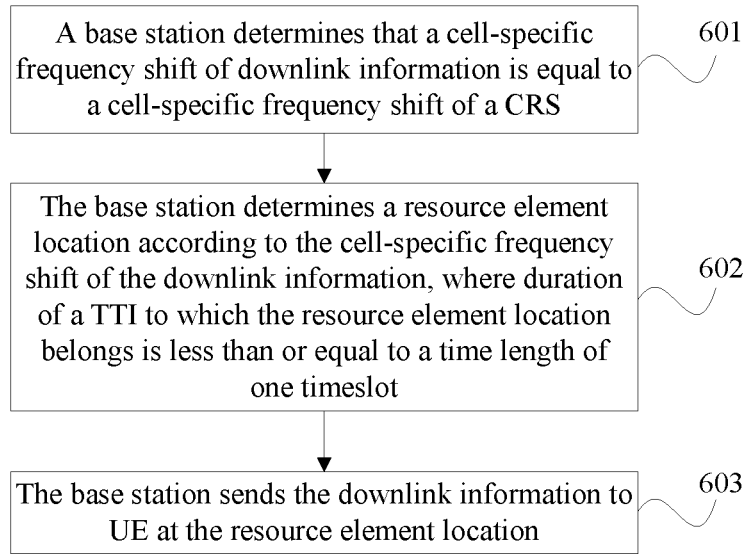
FIG. 7 is a flowchart of a downlink information processing method according to Embodiment 6 of the present invention.

FIG. 7 is a flowchart of a downlink information processing method according to Embodiment 6 of the present invention. This embodiment relates to a base station-side method embodiment corresponding to the embodiment shown in FIG. 2, and specifically relates to a specific process in which a base station determines, according to a cell-specific frequency shift of downlink information, a resource element location for sending the downlink information within a TTI. As shown in FIG. 7, the method includes the following steps.

Step 601: The base station determines that the cell-specific frequency shift of the downlink information is equal to a cell-specific frequency shift of a CRS.

The CRS is a cell-specific reference signal sent by the base station.

In this embodiment, as shown in FIG. 1, there are three CRS patterns. The three CRS patterns correspond to an antenna port 0, an antenna port 1, and antenna ports 2 and 3, respectively. It can be learned from FIG. 1 that CRSs each are located at a relatively front symbol location in each timeslot. It should be noted that, in a current LTE system, the CRS is full-bandwidth. For example, a system bandwidth of a cell in which current UE is located is 20 MHz, and antenna ports configured for CRSs of the cell in which the current UE is located are {0, 1, 2, 3}. In this case, all PRBs on the bandwidth of 20 MHz have the three CRS patterns. The downlink information in this embodiment may be a demodulation reference signal, or may be a physical downlink control channel.

It should be noted that one base station may serve one or more cells simultaneously. A cell served by the base station has a unique physical layer cell identifier. The base station may use the physical layer cell identifier to determine a cell-specific frequency shift of a CRS of the cell. In addition, the physical layer cell identifier of the cell in this embodiment is a physical layer cell identifier of a cell in which UE corresponding to the base station is located.

Step 602: The base station determines the resource element location according to the cell-specific frequency shift of the downlink information, where duration of the TTI to which the resource element location belongs is less than or equal to a time length of one timeslot.

In this embodiment, after an index of a symbol included in the TTI is determined, if a symbol index corresponding to the resource element location is the same as a symbol index of a resource element location of the CRS, for example, the TTI includes symbols 0 and 1 in a slot 0, a subcarrier number corresponding to the resource element location for receiving the downlink information may be set according to the cell-specific frequency shift of the downlink information by using a preset formula or a predefined manner, so that the resource element location does not coincide with the resource element location at which the CRS is located. For example, the preset formula or the predefined method is used to make a subcarrier number corresponding to the resource element location for receiving the downlink information be 1, 2, or the like. Alternatively, the preset formula or the predefined method is used to make a subcarrier number corresponding to the resource element location for receiving the downlink information be not equal to a number 0, 3, or the like of a subcarrier on which the CRS signal is located. If a symbol index corresponding to the resource element location is different from a symbol index of the CRS, the resource element location may be set to a location adjacent to a resource element location at which the CRS is located. For example, when the TTI includes symbols 2 and 3 in a slot 0, the resource element location may be set to a location at which a symbol is 3 and subcarrier numbers are 0 and 3 in the slot 0.

In addition, in this embodiment, the downlink information cannot be sent at the resource element location for sending the CRS. Therefore, it is determined that the cell-specific frequency shift of the downlink information is equal to the cell-specific frequency shift of the CRS, and the frequency shift of the downlink information varies with the cell-specific frequency shift of the CRS, thereby ensuring that the resource element location for sending the downlink information does not coincide with the resource element location for sending the CRS. For example, if the cell-specific frequency shift of the CRS is 2, the frequency shift of the downlink information is also 2. Therefore, this can not only ensure that the resource element location for sending the downlink information does not coincide with the resource element location for sending the CRS, but also ensure that the UE can receive, within the current TTI, the downlink information delivered by the base station. For example, the cell-specific frequency shift of the CRS is $v_{shift1}=N_{ID}^{cell}$ mod 6, where $N_{ID}^{cell}$ is a physical layer cell identifier.

It should be noted that a timeslot length in this embodiment is less than or equal to 0.5 ms, that is, the duration of the TTI is less than or equal to 0.5 ms.

Step 603: The base station sends the downlink information to UE at the resource element location.

In this embodiment, after determining the resource element location, the base station sends the downlink information to the UE at the resource element location, so that the UE demodulates downlink data according to the downlink information. When the duration of the TTI becomes shorter, the base station may determine, according to the cell-specific frequency shift of the downlink information, the resource element location for sending the downlink information, and send the downlink information to the UE at the resource element location.

According to the downlink information processing method provided in this embodiment, the base station determines that the cell-specific frequency shift of the downlink information is equal to the cell-specific frequency shift of the CRS, determines the resource element location according to the cell-specific frequency shift of the downlink information, and sends the downlink information at the resource element location. In this embodiment, when the duration of the TTI is less than or equal to the time length of one timeslot, the base station resets, according to the cell-specific frequency shift of the downlink information, the resource element location for sending the downlink information. Because the cell-specific frequency shift of the downlink information is equal to the cell-specific frequency shift of the CRS, the resource element location for sending the downlink information varies with the resource element location of the CRS, thereby ensuring that when the TTI becomes shorter, the UE can receive, within the current TTI, the downlink information delivered by the base station and complete demodulation processing according to the downlink information.

Optionally, in the foregoing Embodiment 6, the downlink information includes any one of a DMRS, a PDCCH, or an EPDCCH.

Embodiment 7

Figure 8:
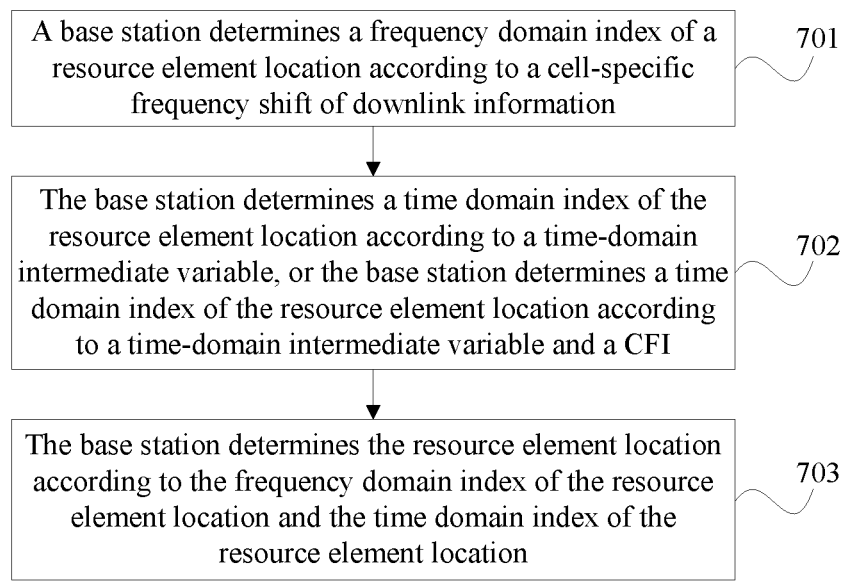
FIG. 8 is a flowchart of a downlink information processing method according to Embodiment 7 of the present invention.

FIG. 8 is a flowchart of a downlink information processing method according to Embodiment 7 of the present invention. This embodiment relates to a specific implementation process of the step "the base station determines the resource element location according to the cell-specific frequency shift of the downlink information" in a case in which the downlink information includes a DMRS and duration of a TTI is equal to a time length of one timeslot. As shown in FIG. 8, the method includes the following steps.

Step 701: The base station determines a frequency domain index k of the resource element location according to the cell-specific frequency shift of the downlink information.

In this embodiment, the determining, by the base station, a frequency domain index of the resource element location according to the cell-specific frequency shift of the downlink information includes: determining the frequency domain index k of the resource element location according to a formula $k=3m'+N_{sc}^{RB}n_{PRB}+k'+(v_{shift2})\mod 3+1$, where $m'=0, 1,$ or $2$, $k'=0$ or $1$, $N_{sc}^{RB}$ is a frequency domain resource block size, $n_{PRB}$ is a physical resource block number and $n_{PRB}$ is a positive integer, and $v_{shift2}$ is the cell-specific frequency shift of the downlink information. It should be noted that a value of k' depends on a number p of an antenna port on which the DMRS is located. For example, when $p\in\{107,108\}$, $k'=1$; or when $p\in\{109,110\}$, $k'=0$. The port numbers 107, 108, 109, and 110 are merely an example for describing the solution in this embodiment. Alternatively, the number p of the antenna port on which the DMRS is located may be another port number. This is not limited in the present invention.

Step 702: The base station determines a time domain index of the resource element location according to a time-domain intermediate variable, or the base station determines a time domain index of the resource element location according to a time-domain intermediate variable and a CFI.

The time-domain intermediate variable is a variable determined according to a type of a subframe in which the TTI is located, and the CFI is control format indicator information carried on a PCFICH sent by the base station.

In this embodiment, when a resource element location for sending a downlink signal may be set in a control region or a non-control region, the determining, by the base station, a time domain index of the resource element location according to a time-domain intermediate variable includes: determining the time domain index l of the resource element location according to a formula $l=l' \mod 2$, where $l'$ is the time-domain intermediate variable, $$l' = \begin{cases} 0, 1, 2, \text{ or } 3; & \text{if } n_s \mod 2 = 0 \text{ and the } TTI \text{ is in a special} \\ & \text{subframe of configuration 1, 2, 6, or 7} \\ 0 \text{ or } 1; & \text{if the } TTI \text{ is in a subframe other than a} \\ & \text{special subframe of configuration 1, 2, 6, or 7} \end{cases}$$

and $n_s$ is an index of a timeslot in which the TTI is located.

In this embodiment, when a resource element location for sending a downlink signal can be set only in a non-control region, the determining, by the base station, a time domain index of the resource element location according to a time-domain intermediate variable and a CFI of a cell in which UE is located includes: determining, by the base station, the time domain index l of the resource element location according to a formula $$l' = \begin{cases} l' \mod 2 + CFI; & \text{if } n_s \mod 2 = 0 \text{ and the } TTI \text{ is} \\ & \text{in a special subframe of configuration} \\ & \text{1, 2, 6, or 7} \\ l' \mod 2 + CFI + 3\lfloor l'/2 \rfloor; & \text{if } n_s \mod 2 = 0 \text{ and the } TTI \text{ is} \\ & \text{in a special subframe of configuration} \\ & \text{1, 2, 6, or 7} \end{cases},$$

where $n_s$ is an index of a timeslot in which the TTI is located, l' is the time-domain intermediate variable, and $$l' = \begin{cases} 0, 1, 2, \text{ or } 3; & \text{if } n_s \bmod 2 = 0 \text{ and the } \mathit{TTI} \text{ is in a special} \\ & \text{subframe of configuration 1, 2, 6, or 7} \\ 0 \text{ or } 1; & \text{if the } \mathit{TTI} \text{ is in a subframe other than a} \\ & \text{special subframe of configuration 1, 2, 6, or 7} \end{cases}.$$

In this embodiment, the downlink information is specifically the DMRS, and the duration of the TTI is equal to the time length of one timeslot. The time domain index of the resource element location is an index of a symbol included in the TTI, and the frequency domain index of the resource element location is a subcarrier number. The resource element location may be determined according to the frequency domain index of the resource element location and the time domain index of the resource element location. The time-domain intermediate variable is a time-domain intermediate variable determined by the base station according to the type of the subframe in which the TTI is located. When the timeslot in which the TTI is located is a slot 1, because a control region of an existing LTE system does not exist in the slot 1, the time domain index of the resource element location needs to be determined according to only the time-domain intermediate variable, and the resource element location may be set to a relatively front symbol location in the timeslot, for example, a resource element location at which a subcarrier number is 0 and a symbol index is 2 in the slot 1, so as to provide more demodulation processing time for the UE. When the timeslot in which the TTI is located is a slot 0, because a control region of an existing LTE system may exist in the timeslot, the time domain index of the resource element location needs to be determined according to the time-domain intermediate variable and the CFI. Therefore, in this embodiment, the resource element location cannot be set to a resource element location of the control region of the existing LTE system, so as to avoid a case in which a process in which a base station in the existing LTE system sends control information in the control region is affected when the base station sends the downlink information within the TTI less than or equal to the time length of one timeslot. For example, the downlink signal cannot be received at a resource element location at which a subcarrier number is 0 and a symbol index is 2 in the slot 0.

It should be noted that, in this embodiment, the slot 0 represents a timeslot whose timeslot index mod 2 is equal to 0, and the slot 1 represents a timeslot whose timeslot index mod 2 is equal to 1. When the base station sends the downlink information within the TTI less than or equal to the time length of one timeslot, a frequency domain resource or time domain resource used by the base station may be different from that used by the base station in the existing LTE system. In this case, the time domain index of the resource element location needs to be determined according to only the time-domain intermediate variable, without differentiating a relationship between the slot 0 and the slot 1.

It should be noted that a condition for a value of the time-domain intermediate variable l' provided in this embodiment is merely an example showing that a subframe type in the solution in this embodiment coexists with that of the existing LTE system. Alternatively, l' may be a value in {0, 1}, {2, 3}, or {0, 1, 2, 3}. This is not limited in the present invention.

Step 703: The base station determines the resource element location according to the frequency domain index of the resource element location and the time domain index of the resource element location.

It should be noted that other steps in this embodiment are the same as the method steps in the embodiment shown in FIG. 7. Details are not described herein again.

According to the downlink information processing method provided in this embodiment, when the downlink information includes the DMRS and the duration of the TTI is equal to the time length of one timeslot, the base station determines the frequency domain index of the resource element location according to the cell-specific frequency shift of the downlink information and determines the time domain index of the resource element location according to the time-domain intermediate variable, or determines the frequency domain index of the resource element location according to the cell-specific frequency shift of the downlink information and determines the time domain index of the resource element location according to the time-domain intermediate variable and the CFI, and then determines the resource element location according to the frequency domain index of the resource element location and the time domain index of the resource element location; and the base station sends the downlink information at the resource element location within the TTI, so that the UE can receive the downlink information within the current TTI, and demodulate downlink data according to the downlink information. For timeslots in which different TTIs are located, the base station may determine a frequency domain index of a resource element location according to the cell-specific frequency shift of the downlink information, and determine a time domain index of the resource element location according to a time-domain intermediate variable, or determine a time domain index of the resource element location according to a time-domain intermediate variable and a CFI. In this case, the base station can not only send the downlink information at a front symbol location in the timeslot in which the TTI is located, so as to reserve more demodulation processing time for the UE, but can also avoid sending the downlink information at the resource element location of the control region, so that sending of the control information in the control region by the base station in the existing LTE system is not affected when the base station sends the downlink information within the TTI whose duration is the time length of one timeslot.

Embodiment 8

Figure 9:
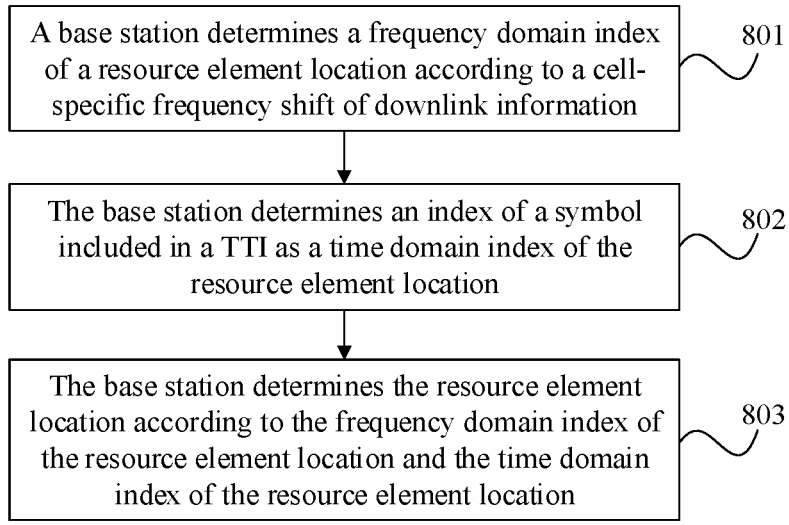
FIG. 9 is a flowchart of a downlink information processing method according to Embodiment 8 of the present invention.

FIG. 9 is a flowchart of a downlink information processing method according to Embodiment 8 of the present invention. This embodiment relates to a specific implementation process of the step "the base station determines the resource element location according to the cell-specific frequency shift of the downlink information" in a case in which the downlink information includes a DMRS and duration of a TTI is greater than or equal to a time length of one symbol and less than a time length of one timeslot. As shown in FIG. 9, the method includes the following steps.

Step 801: The base station determines a frequency domain index k of the resource element location according to the cell-specific frequency shift of the downlink information.

In this embodiment, the determining a frequency domain index of the resource element location according to the cell-specific frequency shift of the downlink information includes: determining the frequency domain index k of the resource element location according to a formula $k=6m'+N_{sc}^{RB}n_{PRB}+(k'+v_{shift2})$mod 6; $l \neq l''$, where $m'=0$ or 1, $k'=0$ or 3, $$l'' = \begin{cases} 0 \text{ or } N_{symb}^{DL}-3; & \text{if } n=1 \text{ or } 2 \\ 0, 1, \text{ or } N_{symb}^{DL}-3; & \text{if } n=4 \end{cases},$$

$N_{sc}^{RB}$ is a frequency domain resource block size, $n_{PRB}$ is a physical resource block number and $n_{PRB}$ is a positive integer, $v_{shift2}$ is the cell-specific frequency shift of the downlink information, n is a quantity of antenna ports configured for CRSs sent by the base station, $N_{symb}^{DL}$ is a quantity of OFDM symbols or SC-FDMA symbols in one downlink timeslot, and l is a time domain index of the resource element location.

In this embodiment, a time-domain intermediate variable l'' is determined by the base station according to the quantity $N_{symb}^{DL}$ of OFDM symbols or SC-FDMA symbols in one downlink timeslot and the quantity n of antenna ports configured for the CRSs sent by the base station. When l=l'', the frequency domain index k of the resource element location is determined according to the formula $k=6m'+N_{sc}^{RB}n_{PRB}(k'+v_{shift2})$mod 6. The resource element location determined by using this method may be a resource element location of a non-control region or may be a resource element location of a control region. As shown in FIG. 1, the base station may send the DMRS at a resource element location of a control region at which a symbol index is 3 and a subcarrier number is 0 in a slot 0. In this way, when the duration of the TTI is greater than or equal to the time length of one symbol and less than the time length of one timeslot, it is ensured that when the base station sends the DMRS at the resource element location, UE can still receive the DMRS, so as to complete demodulation processing.

It should be noted that, in this embodiment, a value of k' depends on a number p of an antenna port on which the DMRS is located. For example, when $p \in \{107\}$, k'=0; or when $p \in \{108\}$, k'=3. The port numbers 107 and 108 are merely an example for describing the solution in this embodiment. Alternatively, the number p of the antenna port on which the DMRS is located may be another port number. This is not limited in the present invention.

In this embodiment, the step "the base station determines a frequency domain index k of the resource element location according to the cell-specific frequency shift of the downlink information" may alternatively be implemented by using the following method, including: determining the frequency domain index k of the resource element location according to a formula $k=6m'+N_{sc}^{RB}n_{PRB}+(k'+v_{shift2})$mod 6; $l \neq l''$, where $m'=0$ or 1, $k'=0$ or 3, $$l'' = \begin{cases} 0 \text{ or } N_{symb}^{DL}-3; & \text{if } n_s \bmod 2 = 1 \text{ and } n=1 \text{ or } 2 \\ 0, 1, \text{ or } N_{symb}^{DL}-3; & \text{if } n_s \bmod 2 = 1 \text{ and } n=4 \\ (0 \text{ to } CFI-1) \text{ or } N_{symb}^{DL}-3; & \text{if } n_s \bmod 2 = 0 \text{ and } n=1 \text{ or } 2, \\ (0 \text{ to } \max(CFI-1,1)) \text{ or } & \text{if } n_s \bmod 2 = 0 \text{ and } n=4 \\ N_{symb}^{DL}-3; & \end{cases}$$

$N_{sc}^{RB}$ is a frequency domain resource block size, $n_{PRB}$ is a physical resource block number and $n_{PRB}$ is a positive integer, $v_{shift2}$ is the cell-specific frequency shift of the downlink information, n is a quantity of antenna ports configured for CRSs sent by the base station, $N_{symb}^{DL}$ is a quantity of OFDM symbols or SC-FDMA symbols in one downlink timeslot, a CFI is control format indicator information carried on a PCFICH sent by the base station, $n_s$ is an index of a timeslot in which the TTI is located, and a time domain index l of the resource element location is an index of a symbol included in the TTI. It should be noted that the CFI may be a value and a value range of the CFI is (1, 2, 3). Therefore, 0 to CFI-1 indicates that a value of l'' is any integer in an interval between 0 and CFI-1. For example, if a value of the CFI is equal to 3, the value of l'' is 0, 1, or 2. Likewise, 0 to max(CFI-1, 1) indicates that the value of l'' is any integer in an interval between 0 and max(CFI-1, 1). For example, if the value of the CFI is equal to 1, the value of l'' is 0 or 1.

In this embodiment, a time-domain intermediate variable l'' is a variable determined by the base station according to the quantity $N_{symb}^{DL}$ of OFDM symbols or SC-FDMA symbols in one downlink timeslot, the quantity n of antenna ports configured for the CRSs sent by the base station, the CFI, and the index of the timeslot in which the TTI is located. When l=l'', the base station determines the frequency domain index k of the resource element location according to the formula $k=6m'+N_{sc}^{RB}n_{PRB}+(k'+v_{shift2})$mod 6. The time-domain intermediate variable l'' is limited, so that the resource element location does not coincide with a resource element location of a control region, thereby avoiding a case in which a process in which a base station in an existing LTE system sends control information in the control region is affected when the base station sends the downlink information within the TTI whose duration is at least the length of one symbol. As shown in FIG. 1, the base station cannot send the DMRS at a resource element location at which a symbol index is 2 and a subcarrier number is 0 in a slot 0.

Step 802: The base station determines an index of a symbol included in the TTI as a time domain index of the resource element location.

The symbol is an OFDMA symbol or an SC-FDMA symbol.

In this embodiment, the time domain index of the resource element location is the index of the symbol included in the TTI, and the frequency domain index of the resource element location is a subcarrier number. The resource element location may be determined according to the frequency domain index of the resource element location and the time domain index of the resource element location. Because the duration of the TTI is greater than or equal to the time length of one symbol and less than the time length of one timeslot, the time domain index of the resource element location is the index of the symbol on which the TTI is located. For example, as shown in FIG. 1, if a symbol on which a TTI is located is a symbol 4 in the slot 0, a time domain index of a resource element location is 4, that is, the base station can send the downlink information at the resource element location corresponding to the symbol on which the TTI is located, that is, the symbol 4 in the slot 0. In this embodiment, the symbol is an OFDMA symbol or an SC-FDMA symbol.

Step 803: The base station determines the resource element location according to the frequency domain index of the resource element location and the time domain index of the resource element location.

In this embodiment, the time domain index of the resource element location is the index of the symbol included in the TTI, and the frequency domain index of the resource element location is a subcarrier number. The resource element location may be determined according to the frequency domain index of the resource element location and the time domain index of the resource element location.

It should be noted that other steps in this embodiment are the same as the method steps in the embodiment shown in FIG. 7. Details are not described herein again.

According to the downlink information processing method provided in this embodiment, when the downlink information includes the DMRS and the duration of the TTI is greater than or equal to the time length of one symbol and less than the time length of one timeslot, the base station determines the frequency domain index of the resource element location according to the cell-specific frequency shift of the downlink information, determines the index of the symbol included in the TTI as the time domain index of the resource element location, and determines the resource element location according to the frequency domain index of the resource element location and the time domain index of the resource element location. In this way, when the duration of the TTI is greater than or equal to the time length of one symbol and less than the time length of one timeslot, the base station sends the downlink information at the resource element location, so as to ensure that the UE can receive the downlink information and complete demodulation processing of downlink data according to the downlink information.

Embodiment 9

Figure 10:
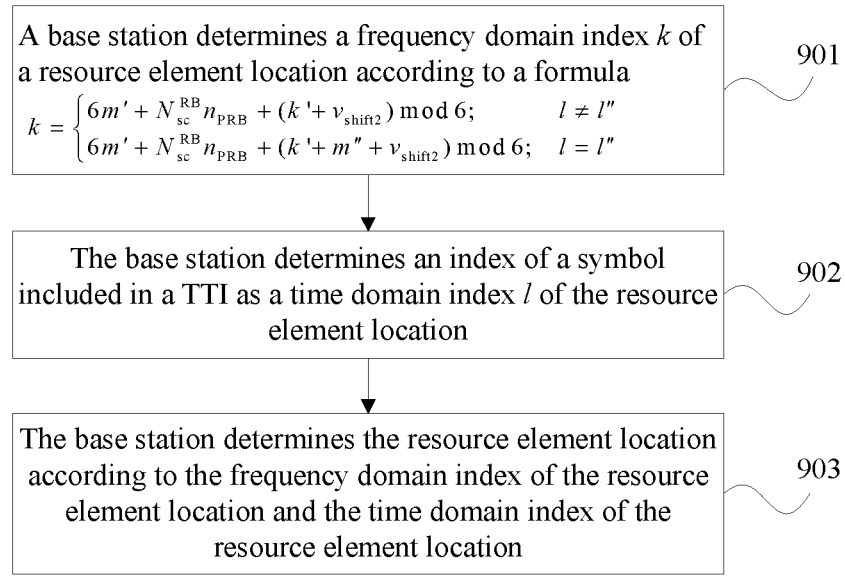
FIG. 10 is a flowchart of a downlink information processing method according to Embodiment 9 of the present invention.

FIG. 10 is a flowchart of a downlink information processing method according to Embodiment 9 of the present invention. This embodiment relates to a specific implementation process of the step "the base station determines the resource element location according to the cell-specific frequency shift of the downlink information" in a case in which the downlink information includes a PDCCH or an EPDCCH. As shown in FIG. 10, the method includes the following steps.

Step 901: The base station determines a frequency domain index k of the resource element location according to a formula $$k = \begin{cases} 6m' + N_{sc}^{RB} n_{PRB} + (k' + v_{shift2}) \bmod 6; & l \neq l'' \\ 6m' + N_{sc}^{RB} n_{PRB} + (k' + m'' + v_{shift2}) \bmod 6; & l = l'' \end{cases}.$$

m'=0 or 1, $$l'' = \begin{cases} 0 \text{ or } N_{symb}^{DL} - 3; & \text{if } n = 1 \text{ or } 2 \\ 0, 1, \text{ or } N_{symb}^{DL} - 3; & \text{if } n = 4 \end{cases},$$

k'=0 or 3, $N_{sc}^{RB}$ is a frequency domain resource block size, $n_{PRB}$ is a physical resource block number and $n_{PRB}$ is a positive integer, $v_{shift2}$ is the cell-specific frequency shift of the downlink information, n is a quantity of antenna ports configured for CRSs sent by the base station, $N_{symb}^{DL}$ is a quantity of OFDM symbols or SC-FDMA symbols in one downlink timeslot, and m" is any one or a combination of −2, −1, 1, or 2.

In this embodiment, a time-domain intermediate variable l" is a variable determined by the base station according to the quantity $N_{symb}^{DL}$ of OFDM symbols or SC-FDMA symbols in one downlink timeslot and the quantity n of antenna ports configured for the CRSs sent by the base station. In this method, considering that a frequency domain resource or time domain resource used by the base station within a TTI less than or equal to a time length of one timeslot may be different from that used by a base station within a TTI whose duration is 1 ms in an existing LTE system, the resource element location may be set to a resource element location of a non-control region or may be set to a resource element location of a control region.

In this embodiment, the base station sends the PDCCH or the EPDCCH at a resource element location of a symbol on which the TTI is located, so that UE can receive the downlink information within a shorter TTI and demodulate downlink data, thereby implementing a shorter RTT and a shorter data transmission delay.

Optionally, in this embodiment, if the downlink information includes a PDCCH or an EPDCCH, considering that a segment of time domain resource or frequency domain resource used by the base station within a TTI less than or equal to a time length of one timeslot may be the same as that used by a base station in an existing LTE system, the step "the base station determines the resource element location according to the cell-specific frequency shift of the downlink information" may alternatively be completed by using the following method, and the method is specifically as follows:

The base station determines a frequency domain index k of the resource element location according to a formula $$k = \begin{cases} 6m' + N_{sc}^{RB} n_{PRB} + (k' + v_{shift2}) \bmod 6; & l \neq l'' \\ 6m' + N_{sc}^{RB} n_{PRB} + (k' + m'' + v_{shift2}) \bmod 6; & l = l'' \end{cases},$$

where m'=0 or 1, $$l'' = \begin{cases} 0 \text{ or } N_{symb}^{DL} - 3; & \text{if } n_s \bmod 2 = 1 \text{ and } n = 1 \text{ or } 2 \\ 0, 1, \text{ or } N_{symb}^{DL} - 3; & \text{if } n_s \bmod 2 = 1 \text{ and } n = 4 \\ (0 \text{ to } CFI - 1) \text{ or } N_{symb}^{DL} - 3; & \text{if } n_s \bmod 2 = 0 \text{ and } n = 1 \text{ or } 2 \\ (0 \text{ to } \max(CFI - 1, 1)) \text{ or } & \text{if } n_s \bmod 2 = 0 \text{ and } n = 4 \\ N_{symb}^{DL} - 3; \end{cases}$$

k'=0 or 3, $N_{sc}^{RB}$ is a frequency domain resource block size, $n_{PRB}$ is a physical resource block number and $n_{PRB}$ is a positive integer, $v_{shift2}$ is the cell-specific frequency shift of the downlink information, n is a quantity of antenna ports configured for CRSs sent by the base station, $N_{symb}^{DL}$ is a quantity of OFDM symbols or SC-FDMA symbols in one downlink timeslot, m" is any one or a combination of −2, −1, 1, or 2, a CFI is control format indicator information carried on a PCFICH sent by the base station, and $n_s$ is an index of a timeslot in which the TTI is located. It should be noted that the CFI may be a value and a value range of the CFI is (1, 2, 3). Therefore, 0 to CFI-1 indicates that a value of l" is any integer in an interval between 0 and CFI-1. For example, if a value of the CFI is equal to 3, the value of l" is 0, 1, or 2. Likewise, 0 to max(CFI-1, 1) indicates that the value of l" is any integer in an interval between 0 and max(CFI-1, 1). For example, if the value of the CFI is equal to 1, the value of l" is 0 or 1.

In this embodiment, considering that the segment of time domain resource or frequency domain resource used by the base station within the TTI less than or equal to the time length of one timeslot may be the same as that used by the base station in the existing LTE system, the base station can send the PDCCH or the EPDCCH within the TTI less than or equal to the time length of one timeslot only at a resource element location of a non-control region, so as to avoid a case in which a process in which the base station in the existing LTE system sends control information in a control region is affected when the base station sends the downlink information within the TTI less than or equal to the time length of one symbol. Therefore, a time-domain intermediate variable l″ is related to the CFI and the index of the timeslot in which the TTI is located. For example, in a slot 0 shown in FIG. 1, the base station cannot send the PDCCH or the EPDCCH at a resource element location at which a symbol index is 3 and a subcarrier number is 0.

Step 902: The base station determines an index of a symbol included in a TTI as a time domain index l of the resource element location.

The symbol is an OFDM symbol or an SC-FDMA symbol.

In this embodiment, because duration of the TTI is greater than or equal to a time length of one symbol and less than the time length of one timeslot, the time domain index l of the resource element location is the index of the symbol included in the TTI.

Step 903: The base station determines the resource element location according to the frequency domain index of the resource element location and the time domain index of the resource element location.

It should be noted that other steps in this embodiment are the same as the method steps in the embodiment shown in FIG. 7. Details are not described herein again.

According to the downlink information processing method provided in this embodiment, when the downlink information includes the PDCCH or the EPDCCH, the base station determines the frequency domain index k of the resource element location according to the formula $$k = \begin{cases} 6m' + N_{sc}^{RB} n_{PRB} + (k' + v_{shift2}) \bmod 6; & l \neq l'' \\ 6m' + N_{sc}^{RB} n_{PRB} + (k' + m'' + v_{shift2}) \bmod 6; & l = l'' \end{cases},$$

and determines the index of the symbol included in the TTI as the time domain index l of the resource element location, so that when the downlink information is a downlink control channel such as the PDCCH or the EPDCCH, the base station sends the downlink information at the resource element location, so as to ensure that the UE can still receive the downlink information and complete demodulation processing of the downlink data according to the downlink information. In addition, the time-domain intermediate variable may be limited, so as to flexibly set whether the resource element location can coincide with the resource element location of the control region, so that the base station can select a proper method according to a current situation to set a resource element location for sending the downlink information. This avoids the case in which the process in which the base station in the existing LTE system sends the control information in the control region is affected when the base station sends the downlink information within the TTI less than or equal to the time length of one timeslot.

Optionally, in any one of the foregoing embodiments shown in FIG. 7 to FIG. 10, before the determining, by the base station, that the cell-specific frequency shift of the downlink information is equal to a cell-specific frequency shift of the CRS, the method further includes: determining, by the base station, the cell-specific frequency shift $v_{shift1}$ of the CRS according to a formula $v_{shift1} = N_{ID}^{cell} \bmod 6$, where $N_{ID}^{cell}$ is a physical layer cell identifier of a cell in which the UE is located.

Embodiment 10

Figure 11A:
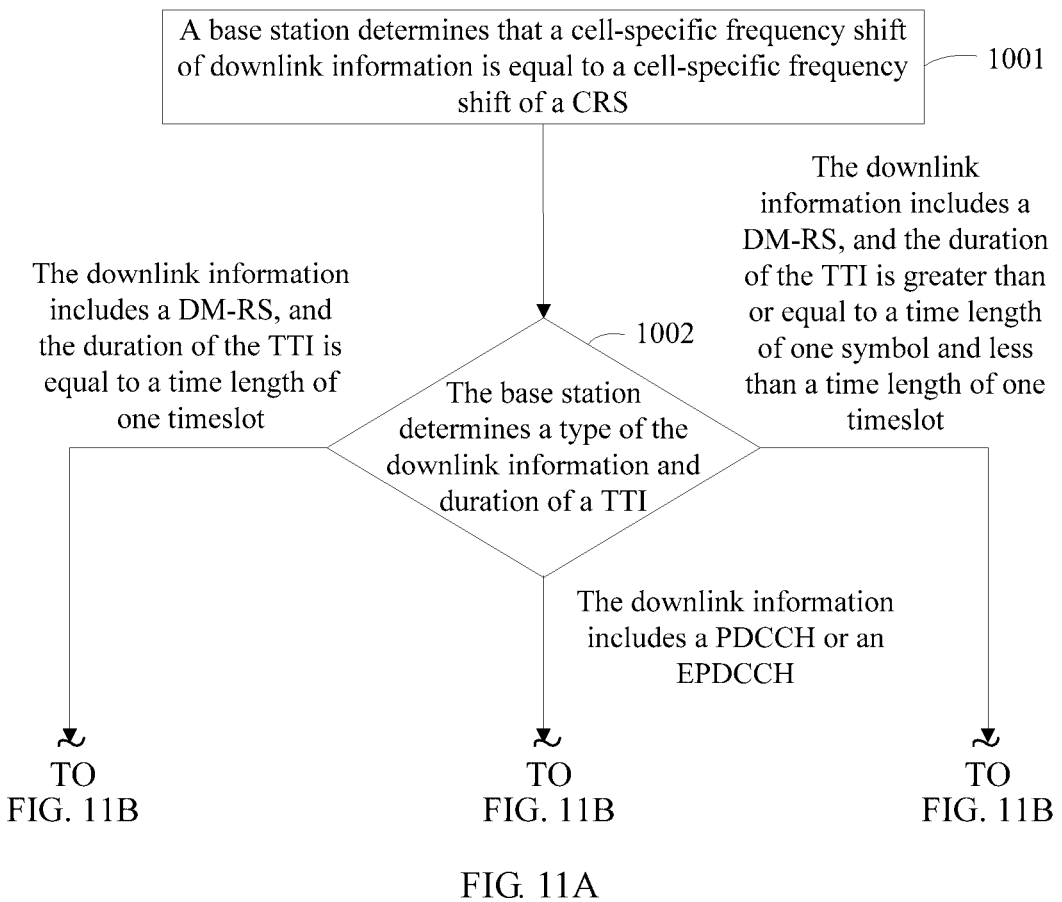
FIG. 11A and FIG. 11B are an instance flowchart of a downlink information processing method according to Embodiment 10 of the present invention.
Figure 11B:
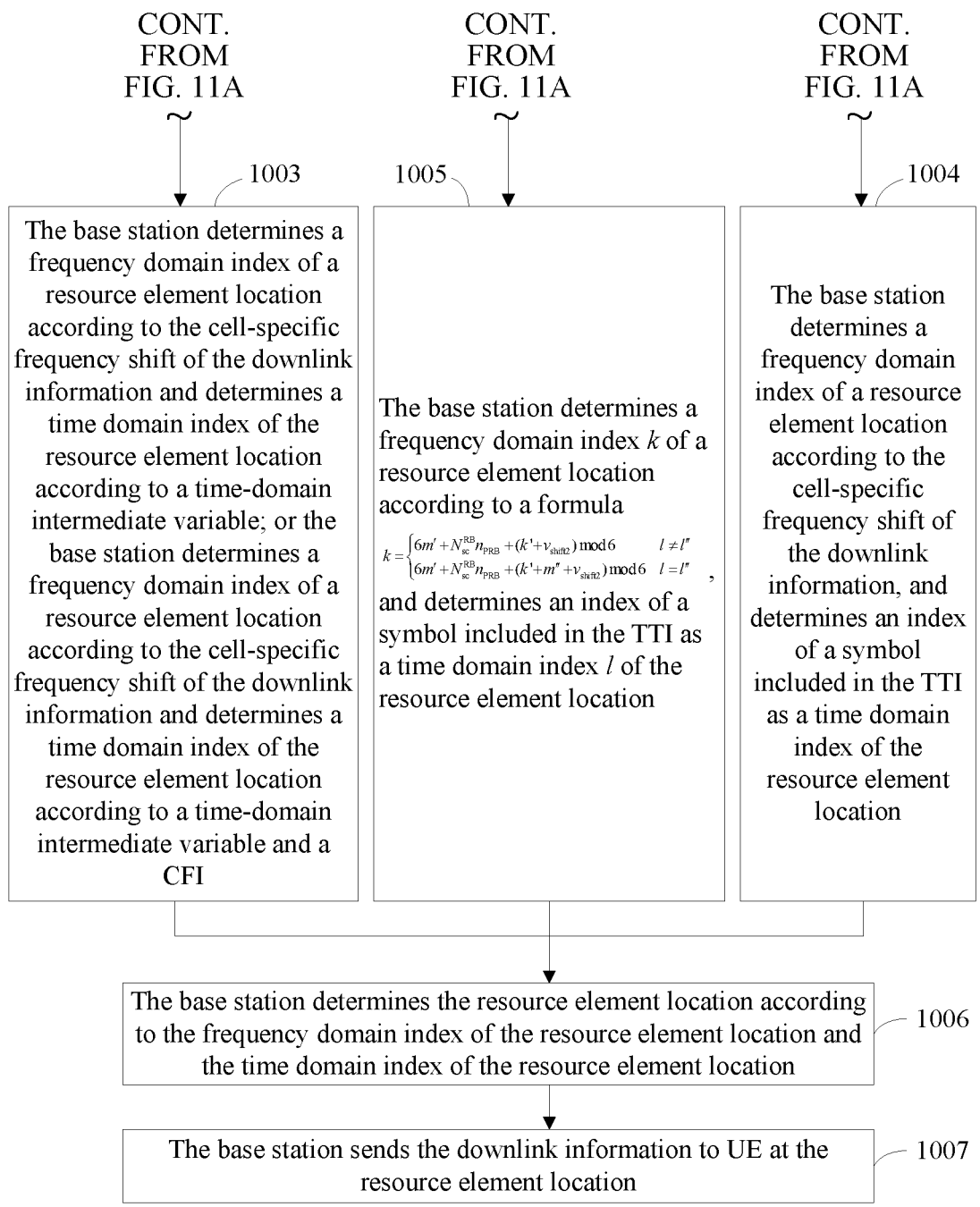

FIG. 11A and FIG. 11B are an instance flowchart of a downlink information processing method according to Embodiment 10 of the present invention. As shown in FIG. 11A and FIG. 11B, the method includes the following steps.

Step 1001: A base station determines that a cell-specific frequency shift of downlink information is equal to a cell-specific frequency shift of a CRS.

The CRS is a cell-specific reference signal sent by the base station, and the downlink information includes any one of a DMRS, a PDCCH, or an EPDCCH.

Optionally, in this embodiment, the base station determines the cell-specific frequency shift $v_{shift1}$ of the CRS according to a formula $v_{shift1} = N_{ID}^{cell} \bmod 6$, where $N_{ID}^{cell}$ is a physical layer cell identifier of a cell in which UE is located.

Step 1002: The base station determines a type of the downlink information and duration of a TTI; the base station performs step 1003 if the downlink information includes a DMRS and the duration of the TTI is equal to a time length of one timeslot; or the base station performs step 1004 if the downlink information includes a DMRS and the duration of the TTI is greater than or equal to a time length of one symbol and less than a time length of one timeslot; or the base station performs step 1005 if the downlink information includes a PDCCH or an EPDCCH.

Step 1003: The base station determines a frequency domain index k of a resource element location according to the cell-specific frequency shift of the downlink information and determines a time domain index of the resource element location according to a time-domain intermediate variable; or the base station determines a frequency domain index k of a resource element location according to the cell-specific frequency shift of the downlink information and determines a time domain index of the resource element location according to a time-domain intermediate variable and a CFI; then, the base station performs step 1006.

Optionally, in this embodiment, the determining, by the base station, a frequency domain index of a resource element location according to the cell-specific frequency shift of the downlink information includes: determining, by the base station, the frequency domain index k of the resource element location according to a formula $k = 3m' + N_{sc}^{RB} k' + (v_{shift2}) \bmod 3 + 1$, where m'=0, 1, or 2, k'=0 or 1, $N_{sc}^{RB}$ is a frequency domain resource block size, $n_{PRB}$ is a physical resource block number and $n_{PRB}$ is a positive integer, and $v_{shift2}$ is the cell-specific frequency shift of the downlink information.

In this embodiment, the base station determines the time domain index of the resource element location by using the following two specific methods:

A first method: If the base station sends the downlink information within the TTI whose duration is the time length of one timeslot, and a frequency domain resource or time domain resource used by the base station is different from that used by a base station in an existing LTE system, the base station may send the DMRS at a resource element location of a control region or a non-control region. Specifically, the base station determines the time domain index l of the resource element location according to a formula l=l' mod 2, where l' is the time-domain intermediate variable, $$l' = \begin{cases} 0, 1, 2, \text{ or } 3; & \text{if } n_s \bmod 2 = 0 \text{ and the } TTI \text{ is in a special} \\ & \text{subframe of configuration } 1, 2, 6, \text{ or } 7 \\ 0 \text{ or } 1; & \text{if the } TTI \text{ is in a subframe other than a} \\ & \text{special subframe of configuration } 1, 2, 6, \text{ or } 7 \end{cases}$$

and $n_s$ is the TTI.

When information is p∈{107,108}, sending of control information in a control region by a base station in an existing LTE system is affected, and the base station can send the DMRS only at a resource element location of a non-control region. Specifically, the base station determines the time domain index l of the resource element location according to a formula $$l = \begin{cases} l' \bmod 2 + CFI; & \text{if } n_s \bmod 2 = 0 \text{ and the } TTI \text{ is} \\ & \text{in a special subframe of configuration} \\ & 1, 2, 6, \text{ or } 7 \\ l' \bmod 2 + CFI + 3\lfloor l'/2 \rfloor; & \text{if } n_s \bmod 2 = 0 \text{ and the } TTI \text{ is} \\ & \text{in a special subframe of configuration} \\ & 1, 2, 6, \text{ or } 7 \end{cases}$$

where $n_s$ is an index of a timeslot in which the TTI is located, l' is the time-domain intermediate variable, and $$l' = \begin{cases} 0, 1, 2, \text{ or } 3; & \text{if } n_s \bmod 2 = 0 \text{ and the } TTI \text{ is in a special} \\ & \text{subframe of configuration } 1, 2, 6, \text{ or } 7 \\ 0 \text{ or } 1; & \text{if the } TTI \text{ is in a subframe other than a} \\ & \text{special subframe of configuration } 1, 2, 6, \text{ or } 7 \end{cases}$$

Step 1004: The base station determines a frequency domain index k of a resource element location according to the cell-specific frequency shift of the downlink information, and determines an index of a symbol included in the TTI as a time domain index of the resource element location; then, the base station performs step 1006.

In this embodiment, because the duration of the TTI is the time length of one symbol, the time domain index of the resource element location is the index of the symbol included in the TTI. The frequency domain index of the resource element location is determined by using the following two specific methods:

A first method: If the base station sends the downlink information within the TTI whose duration is the time length of one symbol, and a frequency domain resource or time domain resource used by the base station is different from that used by a base station in an existing LTE system, the base station may send the DMRS at a resource element location of a control region or a non-control region. Specifically, the base station determines the frequency domain index k of the resource element location according to a formula k=6m'+$N_{sc}^{RB}$$n_{PRB}$+(k'+$v_{shift2}$)mod 6; l≠l", where m'=0 or 1, k'=0 or 3, $$l'' = \begin{cases} 0 \text{ or } N_{symb}^{DL} - 3; & \text{if } n = 1 \text{ or } 2 \\ 0, 1, \text{ or } N_{symb}^{DL} - 3; & \text{if } n = 4 \end{cases}$$

$N_{sc}^{RB}$ is a frequency domain resource block size, $n_{PRB}$ is a physical resource block number and $n_{PRB}$ is a positive integer, $v_{shift2}$ is the cell-specific frequency shift of the downlink information, n is a quantity of antenna ports configured for CRSs sent by the base station, $N_{symb}^{DL}$ is a quantity of OFDM symbols or SC-FDMA symbols in one downlink timeslot, and l is the time domain index of the resource element location.

A second method: If the base station sends the downlink information within the TTI whose duration is the time length of one symbol, and a frequency domain resource or time domain resource used by the base station is the same as that used by a base station in an existing LTE system, the base station can send the DMRS only at a resource element location of a non-control region, so as to avoid affecting sending of control information in a control region by the base station in the existing LTE system. Specifically, the base station determines the frequency domain index k of the resource element location according to a formula k=6m'+$N_{sc}^{RB}$$n_{PRB}$+(k'+$v_{shift2}$)mod 6; l≠l", wherein m'=0 or 1, k'=0 or 3, $$l'' = \begin{cases} 0 \text{ or } N_{symb}^{DL} - 3; & \text{if } n_s \bmod 2 = 1 \text{ and } n = 1 \text{ or } 2 \\ 0, 1, \text{ or } N_{symb}^{DL} - 3; & \text{if } n_s \bmod 2 = 1 \text{ and } n = 4 \\ (0 \text{ to } CFI - 1) \text{ or } N_{symb}^{DL} - 3; & \text{if } n_s \bmod 2 = 0 \text{ and } n = 1 \text{ or } 2 \\ (0 \text{ to } \max(CFI - 1, 1)) \text{ or } & \text{if } n_s \bmod 2 = 0 \text{ and } n = 4 \\ N_{symb}^{DL} - 3; & \end{cases}$$

$N_{sc}^{RB}$ is a frequency domain resource block size, $n_{PRB}$ is a physical resource block number and $n_{PRB}$ is a positive integer, $v_{shift2}$ is the cell-specific frequency shift of the downlink information, n is a quantity of antenna ports configured for CRSs sent by the base station, $N_{symb}^{DL}$ is a quantity of OFDM symbols or SC-FDMA symbols in one downlink timeslot, a CFI is format indicator information carried on a PCFICH sent by the base station, and $n_s$ is an index of a timeslot in which the TTI is located. It should be noted that the CFI may be a value and a value range of the CFI is (1, 2, 3). Therefore, 0 to CFI-1 indicates that a value of l" is any integer in an interval between 0 and CFI-1. For example, if a value of the CFI is equal to 3, the value of l" is 0, 1, or 2. Likewise, 0 to max(CFI-1, 1) indicates that the value of l" is any integer in an interval between 0 and max(CFI-1, 1). For example, if the value of the CFI is equal to 1, the value of l" is 0 or 1.

Step 1005: The base station determines a frequency domain index k of a resource element location according to a formula $$k = \begin{cases} 6m' + N_{sc}^{RB}n_{PRB} + (k' + v_{shift2}) \bmod 6; & l \neq l'' \\ 6m' + N_{sc}^{RB}n_{PRB} + (k' + m'' + v_{shift2}) \bmod 6; & l = l'' \end{cases},$$

and determines an index of a symbol included in the TTI as a time domain index l of the resource element location, where m'=0 or 1, l" is an intermediate time-domain variable, k'=0 or 3, $N_{sc}^{RB}$ is a frequency domain resource block size, $n_{PRB}$ is a physical resource block number and $n_{PRB}$ is a positive integer, $v_{shift2}$ is the cell-specific frequency shift of the downlink information, n is a quantity of antenna ports configured for CRSs sent by the base station, and m" is any one or a combination of −2, −1, 1, or 2.

In this embodiment, the downlink information is the PDCCH or the EPDCCH. Because the PDCCH or the EPDCCH is corresponding to one symbol, the time domain index l of the resource element location is the index of the symbol included in the TTI. In this embodiment, a value of the frequency domain index of the resource element location may be changed by controlling a value of the intermediate variable l", and there are the following two methods:

A first method: If a frequency domain resource or time domain resource used by the base station is different from that used by a base station in an existing LTE system, the base station may send the DMRS at a resource element location of a control region or a non-control region.

$$l'' = \begin{cases} 0 \text{ or } N_{symb}^{DL} - 3; & \text{if } n = 1 \text{ or } 2 \\ 0, 1, \text{ or } N_{symb}^{DL} - 3; & \text{if } n = 4 \end{cases},$$

and $N_{symb}^{DL}$ is a quantity of OFDM symbols or SC-FDMA symbols in one downlink timeslot.

A second method: If a frequency domain resource or time domain resource used by the base station is the same as that used by a base station in an existing LTE system, the base station can send the DMRS only at a resource element location of a non-control region, so as to avoid affecting sending of control information in a control region by the base station in the existing LTE system, $$l'' = \begin{cases} 0 \text{ or } N_{symb}^{DL} - 3; & \text{if } n_s \bmod 2 = 1 \text{ and } n = 1 \text{ or } 2 \\ 0, 1, \text{ or } N_{symb}^{DL} - 3; & \text{if } n_s \bmod 2 = 1 \text{ and } n = 4 \\ (0 \text{ to } CFI - 1) \text{ or } N_{symb}^{DL} - 3; & \text{if } n_s \bmod 2 = 0 \text{ and } n = 1 \text{ or } 2, \\ (0 \text{ to } \max(CFI - 1, 1)) \text{ or } & \text{if } n_s \bmod 2 = 0 \text{ and } n = 4 \\ N_{symb}^{DL} - 3; & \end{cases}$$

k'=0 or 3, n is a quantity of antenna ports configured for CRSs sent by the base station, $N_{symb}^{DL}$ is a quantity of OFDM symbols or SC-FDMA symbols in one downlink timeslot, a CFI is format indicator information carried on a PCFICH sent by the base station, and $n_s$ is an index of a timeslot in which the TTI is located. It should be noted that the CFI may be a value and a value range of the CFI is (1, 2, 3). Therefore, 0 to CFI-1 indicates that a value of l" is any integer in an interval between 0 and CFI-1. For example, if a value of the CFI is equal to 3, the value of l" is 0, 1, or 2. Likewise, 0 to max(CFI-1, 1) indicates that the value of l" is any integer in an interval between 0 and max(CFI-1, 1). For example, if the value of the CFI is equal to 1, the value of l" is 0 or 1.

Step 1006: The base station determines the resource element location according to the frequency domain index of the resource element location and the time domain index of the resource element location.

Step 1007: The base station sends the downlink information to UE at the resource element location.

According to the downlink information processing method provided in this embodiment, the base station determines that the cell-specific frequency shift of the downlink information is equal to the cell-specific frequency shift of the CRS, and determines the type of the downlink information and the duration of the TTI; if the downlink information includes the DMRS and the duration of the TTI is equal to the time length of one timeslot, the base station determines the frequency domain index of the resource element location according to the cell-specific frequency shift of the downlink information and determines the time domain index of the resource element location according to the time-domain intermediate variable, or the base station determines the frequency domain index of the resource element location according to the cell-specific frequency shift of the downlink information and determines the time domain index of the resource element location according to the time-domain intermediate variable and the CFI; if the downlink information includes the DMRS and the duration of the TTI is greater than or equal to the time length of one symbol and less than the time length of one timeslot, the base station determines the frequency domain index of the resource element location according to the cell-specific frequency shift of the downlink information and determines the index of the symbol included in the TTI as the time domain index of the resource element location; or if the downlink information includes the PDCCH or the EPDCCH, the base station determines the frequency domain index of the resource element location according to the formula $$k = \begin{cases} 6m' + N_{sc}^{RB} n_{PRB} + (k' + v_{shift2}) \bmod 6; & l \neq l'' \\ 6m' + N_{sc}^{RB} n_{PRB} + (k' + m'' + v_{shift2}) \bmod 6; & l = l'' \end{cases}$$

and determines the index of the symbol included in the TTI as the time domain index l of the resource element location; and then the base station determines the resource element location according to the frequency domain index of the resource element location and the time domain index of the resource element location. In this embodiment, the base station obtains the resource element location by using different methods according to the type of the downlink information and the duration of the TTI, so that the downlink information sent by the base station within a relatively short TTI can be received by the UE. Particularly, when a frequency domain resource or time domain resource used by the base station within the relatively short TTI is the same as that used by the base station in the existing LTE system, the resource element location is prevented from being set in the control region, so as to avoid a technical problem that sending of the control information in the control region by the base station in the existing LTE system is affected when the base station sends the downlink information within the relatively short TTI.

Embodiment 11

Figure 12:
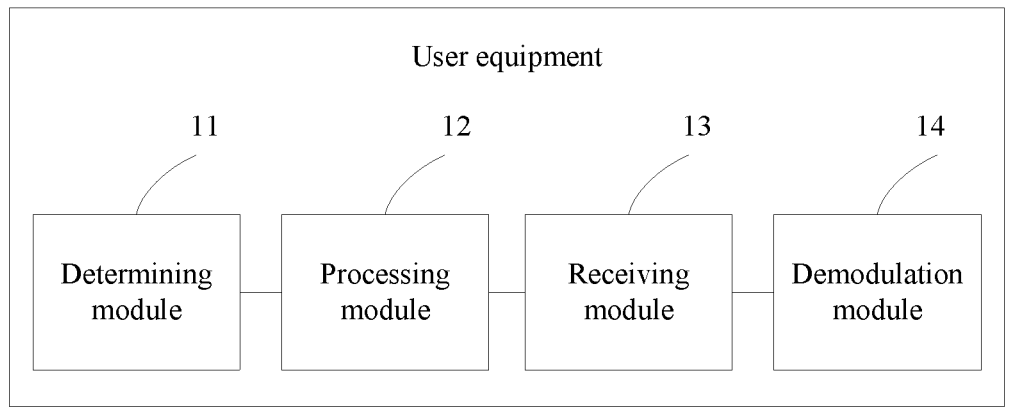
FIG. 12 is a schematic structural diagram of UE according to Embodiment 11 of the present invention.

FIG. 12 is a schematic structural diagram of UE according to Embodiment 11 of the present invention. As shown in FIG. 12, the UE includes a determining module 11, a processing module 12, a receiving module 13, and a demodulation module 14. The determining module 11 is configured to determine that a cell-specific frequency shift of downlink information is equal to a cell-specific frequency shift of a CRS, where the CRS is a cell-specific reference signal of a cell in which the user equipment UE is located. The processing module 12 is configured to determine a resource element location according to the cell-specific frequency shift of the downlink information, where duration of a transmission time interval TTI to which the resource element location belongs is less than or equal to a time length of one timeslot. The receiving module 13 is configured to receive the downlink information at the resource element location. The demodulation module 14 is configured to demodulate downlink data according to the downlink information.

Optionally, in this embodiment, that the processing module 12 determines the resource element location according to the cell-specific frequency shift of the downlink information includes: after an index of a symbol included in the TTI is determined, if a symbol index corresponding to the resource element location is the same as a symbol index of a resource element location of the CRS, the processing module 12 may set, according to the cell-specific frequency shift of the downlink information by using a preset formula or a predefined manner, a subcarrier number corresponding to the resource element location for receiving the downlink information, so that the resource element location does not coincide with the resource element location at which the CRS is located. Alternatively, a preset formula or a predefined method is used to make a subcarrier number corresponding to the resource element location for receiving the downlink information be not equal to a number 0, 3, or the like of a subcarrier on which the CRS signal is located. If a symbol index corresponding to the resource element location is different from a symbol index of the CRS, the processing module 12 may set the resource element location to a location adjacent to a resource element location at which the CRS is located. In addition, in this embodiment, the downlink information cannot be received at the resource element location for receiving the CRS. Therefore, it is determined that the cell-specific frequency shift of the downlink information is equal to the cell-specific frequency shift of the CRS, and the frequency shift of the downlink information varies with the cell-specific frequency shift of the CRS, thereby ensuring that the resource element location for receiving the downlink information does not coincide with the resource element location for receiving the CRS. For example, the cell-specific frequency shift of the CRS is $v_{shift1} = N_{ID}^{cell} \mod 6$, where $N_{ID}^{cell}$ is a physical layer cell identifier.

It should be noted that a timeslot length in this embodiment is less than or equal to 0.5 ms, that is, the duration of the TTI is less than or equal to 0.5 ms. In an LTE system with a 15 kHz subcarrier spacing, a length of one timeslot is 0.5 ms. In a communications system with a subcarrier spacing greater than 15 kHz, a length of one timeslot may be a time unit shorter than 0.5 ms.

Optionally, in this embodiment, the downlink information includes any one of a DMRS, a PDCCH, or an EPDCCH.

Optionally, in this embodiment, the determining module 11 is further configured to determine the cell-specific frequency shift $v_{shift1}$ of the CRS according to the formula $v_{shift1} = N_{ID}^{cell} \mod 6$, where $N_{ID}^{cell}$ is the physical layer cell identifier of the cell in which the UE is located.

The UE in this embodiment may be configured to perform the technical solution of the method embodiment shown in FIG. 2, and implementation principles and technical effects thereof are similar. Details are not described herein again.

Embodiment 12

Further, according to UE provided in Embodiment 12 of the present invention, if downlink information includes a DMRS and duration of a TTI is equal to a time length of one timeslot, that a processing module determines a resource element location according to a cell-specific frequency shift of the downlink information includes: the processing module 12 determines a frequency domain index k of the resource element location according to the cell-specific frequency shift of the downlink information; determines a time domain index of the resource element location according to a time-domain intermediate variable or determines a time domain index of the resource element location according to a time-domain intermediate variable and a CFI, where the time-domain intermediate variable is a variable determined according to a type of a subframe in which the TTI is located, and the CFI is control format indicator information carried on a physical control format indicator channel PCFICH of a cell in which the UE is located; and determines the resource element location according to the frequency domain index of the resource element location and the time domain index of the resource element location, where the time-domain intermediate variable is a variable determined according to a type of a subframe in which the TTI is located.

Optionally, in this embodiment, that the processing module 12 determines a frequency domain index k of the resource element location according to the cell-specific frequency shift of the downlink information includes: the processing module 12 determines the frequency domain index k of the resource element location according to a formula $k = 3m' + N_{sc}^{RB} n_{PRB} + k' + (v_{shift2}) \mod 3 + 1$, wher m'=0, 1, or 2, k'=0 or 1, $N_{sc}^{RB}$ is a frequency domain resource block size, $n_{PRB}$ is a physical resource block number and $n_{PRB}$ is a positive integer, and $v_{shift2}$ is the cell-specific frequency shift of the downlink information. It should be noted that, in this embodiment, a value of k' depends on a number p of an antenna port on which the DMRS is located. For example, when p∈{107,108}, k'=1; or when p∈{109, 100}, k'=0. The port numbers 107, 108, 109, and 110 are merely an example for describing the solution in this embodiment. Alternatively, the number p of the antenna port on which the DMRS is located may be another port number. This is not limited in the present invention.

Optionally, in this embodiment, when a resource element location for receiving a downlink signal may be set in a control region or a non-control region, that the processing module 12 determines a time domain index of the resource element location according to a time-domain intermediate variable includes: the processing module 12 determines the time domain index l of the resource element location according to a formula l=l' mod 2, where l' is the time-domain intermediate variable, $$l' = \begin{cases} 0, 1, 2, \text{ or } 3; & \text{if } n_s \mod 2 = 0 \text{ and the } TTI \text{ is in a special} \\ & \text{subframe of configuration 1, 2, 6, or 7} \\ 0 \text{ or } 1; & \text{if the } TTI \text{ is in a subframe other than a} \\ & \text{special subframe of configuration 1, 2, 6, or 7} \end{cases},$$

and $n_s$ is an index of a timeslot in which the TTI is located.

Optionally, in this embodiment, when a resource element location for receiving a downlink signal can be set only in a non-control region, that the processing module 12 determines a time domain index of the resource element location according to a time-domain intermediate variable and a CFI of the cell in which the UE is located includes: the processing module 12 determines the time domain index l of the resource element location according to a formula $$l = \begin{cases} l' \mod 2 + CFI; & \text{if } n_s \mod 2 = 0 \text{ and the } TTI \text{ is} \\ & \text{in a special subframe of configuration} \\ & \text{1, 2, 6, or 7} \\ l' \mod 2 + CFI + 3\lfloor l'/2 \rfloor; & \text{if } n_s \mod 2 = 0 \text{ and the } TTI \text{ is} \\ & \text{in a special subframe of configuration} \\ & \text{1, 2, 6, or 7} \end{cases},$$

where $n_s$ is an index of a timeslot in which the TTI is located, l' is the time-domain intermediate variable, and $$l' = \begin{cases} 0, 1, 2, \text{ or } 3; & \text{if } n_s \bmod 2 = 0 \text{ and the } TTI \text{ is in a special} \\ & \text{subframe of configuration 1, 2, 6, or 7} \\ 0 \text{ or } 1; & \text{if the } TTI \text{ is in a subframe other than a} \\ & \text{special subframe of configuration 1, 2, 6, or 7} \end{cases}.$$

In this embodiment, for a specific implementation principle of determining the time domain index of the resource element location by the processing module 12, refer to step 202 in the embodiment shown in FIG. 3. Details are not described herein.

It should be noted that, in this embodiment, a slot 0 represents a timeslot whose timeslot index mod 2 is equal to 0, and a slot 1 represents a timeslot whose timeslot index mod 2 is equal to 1. In addition, a condition for a value of the time-domain intermediate variable l' provided in this embodiment is merely an example showing that a subframe type in the solution in this embodiment coexists with that of an existing LTE system. Alternatively, l' may be a value in {0, 1}, {2, 3}, or {0, 1, 2, 3}. This is not limited in the present invention.

An apparatus in this embodiment may be configured to perform the technical solution of the method embodiment shown in FIG. 3, and implementation principles and technical effects thereof are similar. Details are not described herein again.

Embodiment 13

Still further, according to UE provided in Embodiment 13 of the present invention, if downlink information includes a DMRS and duration of a TTI is greater than or equal to a time length of one symbol and less than a time length of one timeslot, that a processing module determines a resource element location according to a cell-specific frequency shift of the downlink information includes: the processing module 12 determines a frequency domain index k of the resource element location according to the cell-specific frequency shift of the downlink information, determines an index of a symbol included in the TTI as a time domain index of the resource element location, where the symbol is an OFDM symbol or an SC-FDMA symbol, and determines the resource element location according to the frequency domain index of the resource element location and the time domain index of the resource element location.

Optionally, in this embodiment, that the processing module 12 determines a frequency domain index k of the resource element location according to the cell-specific frequency shift of the downlink information includes: the processing module 12 determines the frequency domain index k of the resource element location according to a formula $k=6m'+N_{sc}^{RB}n_{PRB}+(k'+v_{shift2})\bmod 6$; $l \neq l''$, where m'=0 or 1, k'=0 or 3, $$l'' = \begin{cases} 0 \text{ or } N_{symb}^{DL} - 3; & \text{if } n = 1 \text{ or } 2 \\ 0, 1, \text{ or } N_{symb}^{DL} - 3; & \text{if } n = 4 \end{cases},$$

$N_{sc}^{RB}$ is a frequency domain resource block size, $n_{PRB}$ is a physical resource block number and $n_{PRB}$ is a positive integer, $v_{shift2}$ is the cell-specific frequency shift of the downlink information, n is a quantity of antenna ports configured for CRSs of a cell in which the UE is located, $N_{symb}^{DL}$ is a quantity of OFDM symbols or SC-FDMA symbols in one downlink timeslot, and l is the time domain index of the resource element location. In this embodiment, the time-domain intermediate variable l'' is determined by the processing module 12 according to the quantity $N_{symb}^{DL}$ of OFDM symbols or SC-FDMA symbols in one downlink timeslot and the quantity n of antenna ports configured for the CRSs of the cell in which the UE is located. When l=l'', the processing module 12 determines the frequency domain index k of the resource element location according to the formula $k=6m'+N_{sc}^{RB}n_{PRB}+(k'+v_{shift2})\bmod 6$. The resource element location determined by using this method may be a resource element location of a non-control region or may be a resource element location of a control region.

It should be noted that, in this embodiment, if l=l'', a downlink information processing apparatus does not need to receive the DMRS sent by a base station, but uses the CRS signal to demodulate downlink data. In addition, in this embodiment, a value of k' depends on a number p of an antenna port on which the DMRS is located. For example, when p∈{107}, k'=0; or when p∈{108}, k'=3. The port numbers 107 and 108 are merely an example for describing the solution in this embodiment. Alternatively, the number p of the antenna port on which the DMRS is located may be another port number. This is not limited in the present invention.

Optionally, in this embodiment, that the processing module 12 determines a frequency domain index k of the resource element location according to the cell-specific frequency shift of the downlink information includes: the processing module 12 determines the frequency domain index k of the resource element location according to a formula $k=6m'+N_{sc}^{RB}n_{PRB}+(k'+v_{shift2})\bmod 6$; $l \neq l''$, where m'=0 or 1, k'=0 or 3, $$l'' = \begin{cases} 0 \text{ or } N_{symb}^{DL} - 3; & \text{if } n_s \bmod 2 = 1 \text{ and } n = 1 \text{ or } 2 \\ 0, 1, \text{ or } N_{symb}^{DL} - 3; & \text{if } n_s \bmod 2 = 1 \text{ and } n = 4 \\ (0 \text{ to } CFI - 1) \text{ or } N_{symb}^{DL} - 3; & \text{if } n_s \bmod 2 = 0 \text{ and } n = 1 \text{ or } 2, \\ (0 \text{ to } \max(CFI - 1, 1)) \text{ or } & \text{if } n_s \bmod 2 = 0 \text{ and } n = 4 \\ N_{symb}^{DL} - 3; \end{cases}$$

$N_{sc}^{RB}$ is a frequency domain resource block size, $n_{PRB}$ is a physical resource block number and $n_{PRB}$ is a positive integer, $v_{shift2}$ is the cell-specific frequency shift of the downlink information, n is a quantity of antenna ports configured for CRSs of a cell in which the UE is located, $N_{symb}^{DL}$ is a quantity of OFDM symbols or SC-FDMA symbols in one downlink timeslot, a CFI is control format indicator information carried on a physical control format indicator channel PCFICH of the cell in which the UE is located, $n_s$ is an index of a timeslot in which the TTI is located, and l is the time domain index of the resource element location. In this embodiment, the time-domain intermediate variable l'' is a variable determined by the processing module 12 according to the quantity $N_{symb}^{DL}$ of OFDM symbols or SC-FDMA symbols in one downlink timeslot, the quantity n of antenna ports configured for the CRSs of the cell in which the downlink information processing apparatus is located, the CFI, and the index of the timeslot in which the TTI is located. When l=l'', the processing module 12 determines the frequency domain index k of the resource element location according to the formula $k=6m'+N_{sc}^{RB}n_{PRB}+(k'+v_{shift2})\bmod 6$. The time-domain intermediate variable l″ is limited, so that the resource element location does not coincide with a resource element location of a control region, thereby avoiding a case in which a process in which UE still using a legacy demodulation mode receives control information in the control region is affected when the UE receives the downlink information within the TTI that is less than the time length of one timeslot and greater than or equal to the time length of one symbol. It should be noted that, in this embodiment, if l=l″, the UE does not need to receive the DMRS sent by a base station, but uses the CRS signal to demodulate downlink data.

The apparatus in this embodiment may be configured to perform the technical solution of the method embodiment shown in FIG. 4, and implementation principles and technical effects thereof are similar. Details are not described herein again.

Embodiment 14

Still further, according to UE provided in Embodiment 14 of the present invention, if downlink information includes a PDCCH or an EPDCCH, that a processing module determines a resource element location according to a cell-specific frequency shift of the downlink information includes: the processing module 12 determines a frequency domain index k of the resource element location according to a formula $$k = \begin{cases} 6m' + N_{sc}^{RB} n_{PRB} + (k' + v_{shift2}) \bmod 6; & l \neq l'' \\ 6m' + N_{sc}^{RB} n_{PRB} + (k' + m'' + v_{shift2}) \bmod 6; & l = l'' \end{cases},$$

determines an index of a symbol included in a TTI as a time domain index l of the resource element location, and determines the resource element location according to the frequency domain index of the resource element location and the time domain index of the resource element location, where m'=0 or 1

$$l'' = \begin{cases} 0 \text{ or } N_{symb}^{DL} - 3; & \text{if } n = 1 \text{ or } 2 \\ 0, 1, \text{ or } N_{symb}^{DL} - 3; & \text{if } n = 4 \end{cases},$$

k'=0 or 3, $N_{sc}^{RB}$ is a frequency domain resource block size, $n_{PRB}$ is a physical resource block number and $n_{PRB}$ is a positive integer, $v_{shift2}$ is the cell-specific frequency shift of the downlink information, n is a quantity of antenna ports configured for CRSs of a cell in which the UE is located, $N_{symb}^{DL}$ is a quantity of OFDM symbols or SC-FDMA symbols in one downlink timeslot, m″ is any one or a combination of −2, −1, 1, or 2, and the symbol is an OFDM symbol or an SC-FDMA symbol. The time-domain intermediate variable l″ is a variable determined by the processing module 12 according to the quantity $N_{symb}^{DL}$ of OFDM symbols or SC-FDMA symbols in one downlink timeslot and the quantity n of antenna ports configured for the CRSs of the cell in which the UE is located. In this method, considering that a frequency domain resource or time domain resource used by the UE within a TTI less than or equal to a time length of one timeslot may be different from that used by UE within a TTI whose duration is 1 ms in an existing LTE system, the resource element location may be set to a resource element location of a non-control region or may be set to a resource element location of a control region.

Optionally, in this embodiment, if the downlink information includes a PDCCH or an EPDCCH, considering that a segment of time domain resource or frequency domain resource used by the UE within a TTI less than or equal to a time length of one timeslot may be the same as that used by UE using a legacy demodulation mode, the processing module 12 determines a frequency domain index k of the resource element location according to a formula $$k = \begin{cases} 6m' + N_{sc}^{RB} n_{PRB} + (k' + v_{shift2}) \bmod 6; & l \neq l'' \\ 6m' + N_{sc}^{RB} n_{PRB} + (k' + m'' + v_{shift2}) \bmod 6; & l = l'' \end{cases},$$

where m'=0 or 1, $$l'' = \begin{cases} 0 \text{ or } N_{symb}^{DL} - 3; & \text{if } n_s \bmod 2 = 1 \text{ and } n = 1 \text{ or } 2 \\ 0, 1, \text{ or } N_{symb}^{DL} - 3; & \text{if } n_s \bmod 2 = 1 \text{ and } n = 4 \\ (0 \text{ to } CFI - 1) \text{ or } N_{symb}^{DL} - 3; & \text{if } n_s \bmod 2 = 0 \text{ and } n = 1 \text{ or } 2 \\ (0 \text{ to } \max(CFI - 1, 1)) \text{ or } & \text{if } n_s \bmod 2 = 0 \text{ and } n = 4 \\ N_{symb}^{DL} - 3; \end{cases}$$

k'=0 or 3, $N_{sc}^{RB}$ is a frequency domain resource block size, $n_{PRB}$ is a physical resource block number and $n_{PRB}$ is a positive integer, $v_{shift2}$ is the cell-specific frequency shift of the downlink information, n is a quantity of antenna ports configured for CRSs of a cell in which the UE is located, $N_{symb}^{DL}$ is a quantity of OFDM symbols or SC-FDMA symbols in one downlink timeslot, m″ is any one or a combination of −2, −1, 1, or 2, a CFI is control format indicator information carried on a physical control format indicator channel PCFICH of the cell in which the UE is located, and $n_s$ is an index of a timeslot in which the TTI is located. In this embodiment, considering that the segment of time domain resource or frequency domain resource used by the UE within the TTI less than or equal to the time length of one timeslot may be the same as that used by the UE using the legacy demodulation mode, the UE can receive the PDCCH or the EPDCCH within the TTI less than or equal to the time length of one timeslot only at a resource element location of a non-control region, so as to avoid a case in which a process in which the UE still using the legacy demodulation mode receives control information in a control region is affected when the UE receives the downlink information within the TTI less than or equal to the time length of one timeslot. Therefore, the time-domain intermediate variable l″ is related to the CFI and the index of the timeslot in which the TTI is located.

An apparatus in this embodiment may be configured to perform the technical solution of the method embodiment shown in FIG. 5, and implementation principles and technical effects thereof are similar. Details are not described herein again.

Embodiment 15

Figure 13:
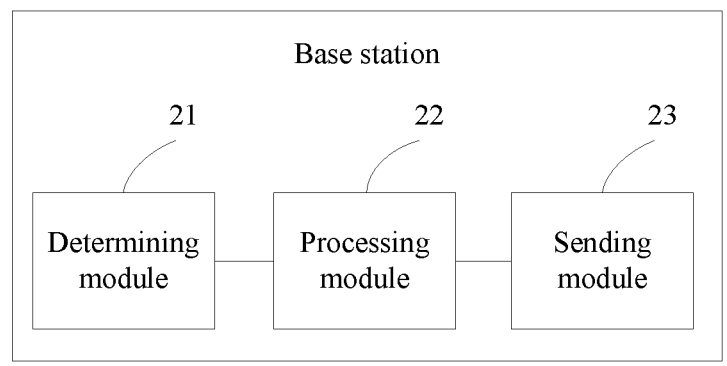
FIG. 13 is a schematic structural diagram of a base station according to Embodiment 15 of the present invention.

FIG. 13 is a schematic structural diagram of a base station according to Embodiment 15 of the present invention. As shown in FIG. 13, the apparatus includes a determining module 21, a processing module 22, and a sending module 23. The determining module 21 is configured to determine that a cell-specific frequency shift of downlink information is equal to a cell-specific frequency shift of a CRS, where the CRS is a cell-specific reference signal sent by the base station. The processing module 22 is configured to determine a resource element location according to the cell-specific frequency shift of the downlink information, where duration of a transmission time interval TTI to which the resource element location belongs is less than or equal to a time length of one timeslot. The sending module 23 is configured to send the downlink information to UE at the resource element location.

It should be noted that, in this embodiment, one base station may serve one or more cells simultaneously. A cell served by the base station has a unique physical layer cell identifier. The base station may use the physical layer cell identifier to determine a cell-specific frequency shift of a CRS of the cell. In addition, the physical layer cell identifier of the cell in this embodiment is a physical layer cell identifier of a cell in which UE corresponding to the base station is located.

In this embodiment, for a specific implementation principle of determining the resource element location by the processing module 22 according to the cell-specific frequency shift of the downlink information, refer to an implementation principle of step 602 in the embodiment shown in FIG. 7. Details are not described herein again.

It should be noted that a timeslot length in this embodiment is less than or equal to 0.5 ms, that is, the duration of the TTI is less than or equal to 0.5 ms.

Optionally, in this embodiment, the downlink information includes any one of a demodulation reference signal DMRS, a physical downlink control channel PDCCH, or an enhanced physical downlink control channel EPDCCH.

Optionally, in this embodiment, the determining module 21 is further configured to determine the cell-specific frequency shift $v_{shift1}$ of the CRS according to a formula $v_{shift1}=N_{ID}^{cell}$ mod 6. $N_{ID}^{cell}$ is the physical layer cell identifier of the cell in which the UE is located.

The apparatus in this embodiment may be configured to perform the technical solution of the method embodiment shown in FIG. 7, and implementation principles and technical effects thereof are similar. Details are not described herein again.

Embodiment 16

Further, according to a base station provided in Embodiment 16 of the present invention, if downlink information includes a DMRS and duration of a TTI is equal to a time length of one timeslot, that a processing module determines a resource element location according to a cell-specific frequency shift of the downlink information includes: the processing module 22 determines a frequency domain index k of the resource element location according to the cell-specific frequency shift of the downlink information; determines a time domain index of the resource element location according to a time-domain intermediate variable or determines a time domain index of the resource element location according to a time-domain intermediate variable and a CFI, where the time-domain intermediate variable is a variable determined according to a type of a subframe in which the TTI is located, and the CFI is control format indicator information carried on a physical control format indicator channel PCFICH sent by the base station; and determines the resource element location according to the frequency domain index of the resource element location and the time domain index of the resource element location.

Optionally, in this embodiment, that the processing module 22 determines a frequency domain index k of the resource element location according to the cell-specific frequency shift of the downlink information includes: the processing module 22 determines the frequency domain index k of the resource element location according to a formula $k=3m'+N_{sc}^{RB}n_{PRB}+k'+(v_{shift2})$mod $3+1$, where $m'=0$, 1, or 2, $k'=1$ or 0, $N_{sc}^{RB}$ is a frequency domain resource block size, $n_{PRB}$ is a physical resource block number and $n_{PRB}$ is a positive integer, and $v_{shift2}$ is the cell-specific frequency shift of the downlink information. It should be noted that a value of k' depends on a number p of an antenna port on which the DMRS is located. For example, when $p\in\{107,108\}$, $k'=1$; or when $p\in\{109,110\}$, $k'=0$. The port numbers 107, 108, 109, and 110 are merely an example for describing the solution in this embodiment. Alternatively, the number p of the antenna port on which the DMRS is located may be another port number. This is not limited in the present invention.

Optionally, in this embodiment, when a resource element location for sending a downlink signal may be set in a control region or a non-control region, that the processing module 22 determines a time domain index of the resource element location according to a time-domain intermediate variable includes: the processing module 22 determines the time domain index l of the resource element location according to a formula l=l' mod 2, where l' is the time-domain intermediate variable, $$l' = \begin{cases} 0, 1, 2, \text{ or } 3; & \text{if } n_s \bmod 2 = 0 \text{ and the } TTI \text{ is in a special} \\ & \text{subframe of configuration 1, 2, 6, or 7} \\ 0 \text{ or } 1; & \text{if the } TTI \text{ is in a subframe other than a} \\ & \text{special subframe of configuration 1, 2, 6, or 7} \end{cases},$$

and $n_s$ is an index of a timeslot in which the TTI is located. For a method implementation principle in this embodiment, refer to step 702 in the embodiment shown in FIG. 8. Details are not described herein again.

Optionally, in this embodiment, when a resource element location for sending a downlink signal can be set only in a non-control region, that the processing module 22 determines a time domain index of the resource element location according to a time-domain intermediate variable and a CFI includes: the processing module 22 determines the time domain index l of the resource element location according to a formula $$l = \begin{cases} l' \bmod 2 + CFI; & \text{if } n_s \bmod 2 = 0 \text{ and the } TTI \text{ is} \\ & \text{in a special subframe of configuration} \\ & 1, 2, 6, \text{ or } 7 \\ l' \bmod 2 + CFI + 3\lfloor l'/2 \rfloor; & \text{if } n_s \bmod 2 = 0 \text{ and the } TTI \text{ is} \\ & \text{in a special subframe of configuration} \\ & 1, 2, 6, \text{ or } 7 \end{cases},$$

where $n_s$ is an index of a timeslot in which the TTI is located, l' is the time-domain intermediate variable, and $$l' = \begin{cases} 0, 1, 2, \text{ or } 3; & \text{if } n_s \bmod 2 = 0 \text{ and the } TTI \text{ is in a special} \\ & \text{subframe of configuration 1, 2, 6, or 7} \\ 0 \text{ or } 1; & \text{if the } TTI \text{ is in a subframe other than a} \\ & \text{special subframe of configuration 1, 2, 6, or 7} \end{cases}.$$

For a method implementation principle in this embodiment, refer to step 702 in the embodiment shown in FIG. 8. Details are not described herein again.

An apparatus in this embodiment may be configured to perform the technical solution of the method embodiment shown in FIG. 8, and implementation principles and technical effects thereof are similar. Details are not described herein again.

Embodiment 17

Still further, according to a downlink information processing apparatus provided in Embodiment 17 of the present invention, if downlink information includes a DMRS and duration of a TTI is greater than or equal to a time length of one symbol and less than a time length of one timeslot, that a processing module determines a resource element location according to a cell-specific frequency shift of the downlink information includes: the processing module 22 determines a frequency domain index k of the resource element location according to the cell-specific frequency shift of the downlink information, determines an index of a symbol included in the TTI as a time domain index of the resource element location, where the symbol is an OFDM symbol or an SC-FDMA symbol, and determines the resource element location according to the frequency domain index of the resource element location and the time domain index of the resource element location.

Optionally, in this embodiment, that the processing module 22 determines a frequency domain index k of the resource element location according to the cell-specific frequency shift of the downlink information includes: the processing module 22 determines the frequency domain index k of the resource element location according to a formula $k=6m'+N_{sc}^{RB}n_{PRB}+(k'+v_{shift2}) \bmod 6$; $l \neq l''$, where $m'=0$ or 1, $k'=0$ or 3, $$l'' = \begin{cases} 0 \text{ or } N_{symb}^{DL} - 3; & \text{if } n = 1 \text{ or } 2 \\ 0, 1, \text{ or } N_{symb}^{DL} - 3; & \text{if } n = 4 \end{cases},$$

$N_{sc}^{RB}$ is a frequency domain resource block size, $n_{PRB}$ is a physical resource block number and $n_{PRB}$ is a positive integer, $v_{shift2}$ is the cell-specific frequency shift of the downlink information, n is a quantity of antenna ports configured for CRSs sent by a base station, $N_{symb}^{DL}$ is a quantity of OFDM symbols or SC-FDMA symbols in one downlink timeslot, and l is the time domain index of the resource element location. The time-domain intermediate variable l" is determined by the processing module 22 according to the quantity $N_{symb}^{DL}$ of OFDM symbols or SC-FDMA symbols in one downlink timeslot and the quantity n of antenna ports configured for the CRSs sent by the base station. When l=l", the processing module 22 determines the frequency domain index k of the resource element location according to the formula $k=6m'+N_{sc}^{RB}n_{PRB}+(k'+v_{shift2}) \bmod 6$. The resource element location determined by using this method may be a resource element location of a non-control region or may be a resource element location of a control region.

It should be noted that, in this embodiment, a value of k' depends on a number p of an antenna port on which the DMRS is located. For example, when p∈{107}, k'=0; or when p∈{108}, k'=3. The port numbers 107 and 108 are merely an example for describing the solution in this embodiment. Alternatively, the number p of the antenna port on which the DMRS is located may be another port number. This is not limited in the present invention.

Optionally, in this embodiment, that the processing module 22 determines a frequency domain index k of the resource element location according to the cell-specific frequency shift of the downlink information includes: the processing module 22 determines the frequency domain index k of the resource element location according to a formula $k=6m'+N_{sc}^{RB}n_{PRB}+(k'+v_{shift2}) \bmod 6$; $l \neq l''$, where $m'=0$ or 1, $k'=0$ or 3, $$l'' = \begin{cases} 0 \text{ or } N_{symb}^{DL} - 3; & \text{if } n_s \bmod 2 = 1 \text{ and } n = 1 \text{ or } 2 \\ 0, 1, \text{ or } N_{symb}^{DL} - 3; & \text{if } n_s \bmod 2 = 1 \text{ and } n = 4 \\ (0 \text{ to } CFI - 1) \text{ or } N_{symb}^{DL} - 3; & \text{if } n_s \bmod 2 = 0 \text{ and } n = 1 \text{ or } 2, \\ (0 \text{ to } \max(CFI - 1, 1)) \text{ or } & \text{if } n_s \bmod 2 = 0 \text{ and } n = 4 \\ N_{symb}^{DL} - 3; \end{cases}$$

$N_{sc}^{RB}$ is a frequency domain resource block size, $n_{PRB}$ is a physical resource block number and $n_{PRB}$ is a positive integer, $v_{shift2}$ is the cell-specific frequency shift of the downlink information, n is a quantity of antenna ports configured for CRSs sent by a base station, $N_{symb}^{DL}$ is a quantity of OFDM symbols or SC-FDMA symbols in one downlink timeslot, a CFI is control format indicator information carried on a physical control format indicator channel PCFICH sent by the base station, $n_s$ is an index of a timeslot in which the TTI is located, and l is the time domain index of the resource element location. It should be noted that the CFI may be a value and a value range of the CFI is (1, 2, 3). Therefore, 0 to CFI-1 indicates that a value of l" is any integer in an interval between 0 and CFI-1. For example, if a value of the CFI is equal to 3, the value of l" is 0, 1, or 2. Likewise, 0 to max(CFI-1, 1) indicates that the value of l" is any integer in an interval between 0 and max(CFI-1, 1). For example, if the value of the CFI is equal to 1, the value of l" is 0 or 1.

Optionally, in this embodiment, the time-domain intermediate variable l" is a variable determined by the processing module 22 according to the quantity $N_{symb}^{DL}$ of OFDM symbols or SC-FDMA symbols in one downlink timeslot, the quantity n of antenna ports configured for the CRSs sent by the base station, the CFI, and the index of the timeslot in which the TTI is located. When l=l", the processing module 22 determines the frequency domain index k of the resource element location according to a formula $k=6m'+N_{sc}^{RB}n_{PRB}+(k'+v_{shift2}) \bmod 6$. The time-domain intermediate variable l" is limited, so that the resource element location does not coincide with a resource element location of a control region, so as to avoid a case in which a process in which a base station in an existing LTE system sends control information in the control region is affected when the base station sends the downlink information within the TTI whose duration is at least the time length of one symbol.

The apparatus in this embodiment may be configured to perform the technical solution of the method embodiment shown in FIG. 9, and implementation principles and technical effects thereof are similar. Details are not described herein again.

Embodiment 18

Still further, according to a downlink information processing apparatus provided in Embodiment 18 of the present invention, if downlink information includes a PDCCH or an EPDCCH, that a processing module determines a resource element location according to a cell-specific frequency shift of the downlink information includes: the processing module 22 determines a frequency domain index k of the resource element location according to a formula $$k = \begin{cases} 6m' + N_{sc}^{RB} n_{PRB} + (k' + v_{shift2}) \bmod 6; & l \neq l'' \\ 6m' + N_{sc}^{RB} n_{PRB} + (k' + m'' + v_{shift2}) \bmod 6; & l = l'' \end{cases},$$

determines an index of a symbol included in a TTI as a time domain index l of the resource element location, and determines the resource element location according to the frequency domain index of the resource element location and the time domain index of the resource element location, where m'=0 or 1, $$l'' = \begin{cases} 0 \text{ or } N_{symb}^{DL} - 3; & \text{if } n = 1 \text{ or } 2 \\ 0, 1, \text{ or } N_{symb}^{DL} - 3; & \text{if } n = 4 \end{cases},$$

k'=0 or 3, $N_{sc}^{RB}$ is a frequency domain resource block size, $n_{PRB}$ is a physical resource block number and $n_{PRB}$ is a positive integer, $v_{shift2}$ is the cell-specific frequency shift of the downlink information, n is a quantity of antenna ports configured for CRSs sent by a base station, $N_{symb}^{DL}$ is a quantity of OFDM symbols or SC-FDMA symbols in one downlink timeslot, m" is any one or a combination of −2, −1, 1, or 2, and the symbol is an OFDM symbol or an SC-FDMA symbol.

Optionally, in this embodiment, the time-domain intermediate variable l" is a variable determined by the processing module 22 according to the quantity $N_{symb}^{DL}$ of OFDM symbols or SC-FDMA symbols in one downlink timeslot and the quantity n of antenna ports configured for the CRSs sent by the base station. In this method, considering that a frequency domain resource or time domain resource used by the base station within a TTI less than or equal to a time length of one timeslot may be different from that used by a base station within a TTI whose duration is 1 ms in an existing LTE system, the resource element location may be set to a resource element location of a non-control region or may be set to a resource element location of a control region.

Optionally, in this embodiment, if the downlink information includes a PDCCH or an EPDCCH, considering that a segment of time domain resource or frequency domain resource used by the base station within a TTI less than or equal to a time length of one timeslot may be the same as that used by a base station in an existing LTE system, that a processing module determines a resource element location according to a cell-specific frequency shift of the downlink information includes: the processing module 22 determines a frequency domain index k of the resource element location according to a formula $$k = \begin{cases} 6m' + N_{sc}^{RB} n_{PRB} + (k' + v_{shift2}) \bmod 6; & l \neq l'' \\ 6m' + N_{sc}^{RB} n_{PRB} + (k' + m'' + v_{shift2}) \bmod 6; & l = l'' \end{cases},$$

determines an index of a symbol included in a TTI as a time domain index l of the resource element location, and determines the resource element location according to the frequency domain index of the resource element location and the time domain index of the resource element location, where m'=0, 1, $$l'' = \begin{cases} 0 \text{ or } N_{symb}^{DL} - 3; & \text{if } n_s \bmod 2 = 1 \text{ and } n = 1 \text{ or } 2 \\ 0, 1, \text{ or } N_{symb}^{DL} - 3; & \text{if } n_s \bmod 2 = 1 \text{ and } n = 4 \\ (0 \text{ to } CFI - 1) \text{ or } N_{symb}^{DL} - 3; & \text{if } n_s \bmod 2 = 0 \text{ and } n = 1 \text{ or } 2 \\ (0 \text{ to } \max(CFI-1, 1)) \text{ or } & \text{if } n_s \bmod 2 = 0 \text{ and } n = 4 \\ N_{symb}^{DL} - 3; \end{cases}$$

k'=0 or 3, $N_{sc}^{RB}$ is a frequency domain resource block size, $n_{PRB}$ is a physical resource block number and $n_{PRB}$ is a positive integer, $v_{shift2}$ is the cell-specific frequency shift of the downlink information, n is a quantity of antenna ports configured for CRSs sent by the base station, $N_{symb}^{DL}$ is a quantity of OFDM symbols or SC-FDMA symbols in one downlink timeslot, m" is any one or a combination of −2, −1, 1, or 2, a CFI is format indicator information carried on a physical control format indicator channel PCFICH sent by the base station, $n_s$ is an index of a timeslot in which the TTI is located, and the symbol is an OFDM symbol or an SC-FDMA symbol.

It should be noted that the CFI may be a value and a value range of the CFI is (1, 2, 3). Therefore, 0 to CFI−1 indicates that a value of l" is any integer in an interval between 0 and CFI−1. For example, if a value of the CFI is equal to 3, the value of l" is 0, 1, or 2. Likewise, 0 to max(CFI−1, 1) indicates that the value of l" is any integer in an interval between 0 and max(CFI−1, 1).

The apparatus in this embodiment may be configured to perform the technical solution of the method embodiment shown in FIG. 10, and implementation principles and technical effects thereof are similar. Details are not described herein again.

Embodiment 19

Figure 14:
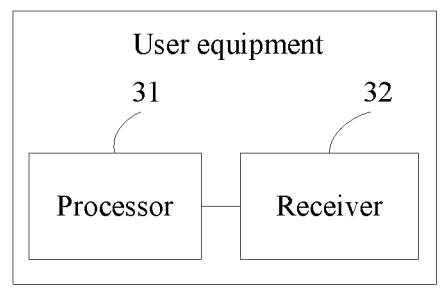
FIG. 14 is a schematic structural diagram of UE according to Embodiment 19 of the present invention.

FIG. 14 is a schematic structural diagram of UE according to Embodiment 19 of the present invention. As shown in FIG. 14, the UE includes a processor 31 and a receiver 32. The processor 31 is configured to determine that a cell-specific frequency shift of downlink information is equal to a cell-specific frequency shift of a cell-specific reference signal CRS, where the CRS is a cell-specific reference signal of a cell in which the UE is located. The processor 31 is further configured to determine a resource element location according to the cell-specific frequency shift of the downlink information, where duration of a transmission time interval TTI to which the resource element location belongs is less than or equal to a time length of one timeslot. The receiver 32 is configured to receive the downlink information at the resource element location. The processor 31 is further configured to demodulate downlink data according to the downlink information. For a method implementation principle in this embodiment, refer to a method implementation principle in the embodiment shown in FIG. 2. Details are not described herein again.

Optionally, the downlink information includes any one of a demodulation reference signal DMRS, a physical downlink control channel PDCCH, or an enhanced physical downlink control channel EPDCCH.

Optionally, if the downlink information includes the DMRS and the duration of the TTI is equal to the time length of one timeslot, that the processor 31 determines the resource element location according to the cell-specific frequency shift of the downlink information includes: the processor 31 determines a frequency domain index k of the resource element location according to the cell-specific frequency shift of the downlink information; determines a time domain index of the resource element location according to a time-domain intermediate variable or determines a time domain index of the resource element location according to a time-domain intermediate variable and a CFI, where the time-domain intermediate variable is a variable determined according to a type of a subframe in which the TTI is located, and the CFI is control format indicator information carried on a physical control format indicator channel PCFICH of the cell in which the UE is located; and determines the resource element location according to the frequency domain index of the resource element location and the time domain index of the resource element location. For a method implementation principle in this embodiment, refer to a method implementation principle in the embodiment shown in FIG. 3. Details are not described herein again.

Optionally, in this embodiment, that the processor 31 determines a frequency domain index k of the resource element location according to the cell-specific frequency shift of the downlink information includes: the processor 31 determines the frequency domain index k of the resource element location according to a formula $k=3m'+N_{sc}^{RB}n_{PRB}+k'+(v_{shift2})\bmod 3+1$, where m'=0, 1, or 2, k'=0 or 1, $N_{sc}^{RB}$ is a frequency domain resource block size, $n_{PRB}$ is a physical resource block number and $n_{PRB}$ is a positive integer, and $v_{shift2}$ is the cell-specific frequency shift of the downlink information. For a method implementation principle in this embodiment, refer to a method implementation principle of step 202 in the embodiment shown in FIG. 3. Details are not described herein again.

Optionally, in this embodiment, when a resource element location for receiving a downlink signal may be set in a control region or a non-control region, that the processor 31 determines a time domain index of the resource element location according to a time-domain intermediate variable includes: the processor 31 determines the time domain index l of the resource element location according to a formula l=l' mod 2, where l' is the time-domain intermediate variable, $$l' = \begin{cases} 0, 1, 2, \text{ or } 3; & \text{if } n_s \bmod 2 = 0 \text{ and the } TTI \text{ is in a special} \\ & \text{subframe of configuration } 1, 2, 6, \text{ or } 7 \\ 0 \text{ or } 1; & \text{if the } TTI \text{ is in a subframe other than a} \\ & \text{special subframe of configuration } 1, 2, 6, \text{ or } 7 \end{cases},$$

and $n_s$ is an index of a timeslot in which the TTI is located. For a method implementation principle in this embodiment, refer to a method implementation principle of step 202 in the embodiment shown in FIG. 3. Details are not described herein again.

Optionally, in this embodiment, when a resource element location for receiving a downlink signal can be set only in a non-control region, that the processor 31 determines a time domain index of the resource element location according to a time-domain intermediate variable and a CFI includes: the processor 31 determines the time domain index l of the resource element location according to a formula $$l = \begin{cases} l' \bmod 2 + CFI; & \text{if } n_s \bmod 2 = 0 \text{ and the } TTI \text{ is} \\ & \text{in a special subframe of configuration} \\ & 1, 2, 6, \text{ or } 7 \\ l' \bmod 2 + CFI + 3\lfloor l'/2 \rfloor; & \text{if } n_s \bmod 2 = 0 \text{ and the } TTI \text{ is} \\ & \text{in a special subframe of configuration} \\ & 1, 2, 6, \text{ or } 7 \end{cases},$$

where $n_s$ is an index of a timeslot in which the TTI is located, l' is the time-domain intermediate variable, and $$l' = \begin{cases} 0, 1, 2, \text{ or } 3; & \text{if } n_s \bmod 2 = 0 \text{ and the } TTI \text{ is in a special} \\ & \text{subframe of configuration } 1, 2, 6, \text{ or } 7 \\ 0 \text{ or } 1; & \text{if the } TTI \text{ is in a subframe other than a} \\ & \text{special subframe of configuration } 1, 2, 6, \text{ or } 7 \end{cases}.$$

For a method implementation principle in this embodiment, refer to a method implementation principle of step 202 in the embodiment shown in FIG. 3. Details are not described herein again.

Optionally, if the downlink information includes the DMRS and the duration of the TTI is greater than or equal to a time length of one symbol and less than the time length of one timeslot, that the processor 31 determines the resource element location according to the cell-specific frequency shift of the downlink information includes: the processor 31 determines a frequency domain index k of the resource element location according to the cell-specific frequency shift of the downlink information, determines an index of a symbol included in the TTI as a time domain index of the resource element location, where the symbol is an OFDM symbol or an SC-FDMA symbol, and determines the resource element location according to the frequency domain index of the resource element location and the time domain index of the resource element location. For a method implementation principle in this embodiment, refer to a method implementation principle in the embodiment shown in FIG. 4. Details are not described herein again.

Optionally, in this embodiment, that the processor 31 determines a frequency domain index k of the resource element location according to the cell-specific frequency shift of the downlink information includes: the processor 31 determines the frequency domain index k of the resource element location according to a formula $k=6m'+T_{sc}^{RB}n_{PRB}+(k'+v_{shift2})\bmod 6$; l≠l", where m'=0 or 1, k'=0 or 3, $$l'' = \begin{cases} 0 \text{ or } N_{symb}^{DL} - 3; & \text{if } n = 1 \text{ or } 2 \\ 0, 1, \text{ or } N_{symb}^{DL} - 3; & \text{if } n = 4 \end{cases},$$

$N_{sc}^{RB}$ is a frequency domain resource block size, $n_{PRB}$ is a physical resource block number and $n_{PRB}$ is a positive integer, $v_{shift2}$ is the cell-specific frequency shift of the downlink information, n is a quantity of antenna ports configured for CRSs of the cell in which the UE is located, $N_{symb}^{DL}$ is a quantity of OFDM symbols or SC-FDMA symbols in one downlink timeslot, and l is the time domain index of the resource element location. The resource element location determined by using this method may be a resource element location of a non-control region or may be a resource element location of a control region. For a method implementation principle in this embodiment, refer to a method implementation principle of step 301 in the embodiment shown in FIG. 4. Details are not described herein again.

Optionally, in this embodiment, that the processor 31 determines a frequency domain index k of the resource element location according to the cell-specific frequency shift of the downlink information includes: the processor 31 determines the frequency domain index k of the resource element location according to a formula k=6m'+$N_{sc}^{RB}$n$_{PRB}$+ (k'+v$_{shift2}$)mod 6; l≠l", where m'=0 or 1, k'=0 or 3, $$l'' = \begin{cases} 0 \text{ or } N_{symb}^{DL} - 3; & \text{if } n_s \bmod 2 = 1 \text{ and } n = 1 \text{ or } 2 \\ 0, 1, \text{ or } N_{symb}^{DL} - 3; & \text{if } n_s \bmod 2 = 1 \text{ and } n = 4 \\ (0 \text{ to } CFI - 1) \text{ or } N_{symb}^{DL} - 3; & \text{if } n_s \bmod 2 = 0 \text{ and } n = 1 \text{ or } 2, \\ (0 \text{ to } \max(CFI - 1, 1)) \text{ or } & \text{if } n_s \bmod 2 = 0 \text{ and } n = 4 \\ N_{symb}^{DL} - 3; \end{cases}$$

$N_{sc}^{RB}$ is a frequency domain resource block size, n$_{PRB}$ is a physical resource block number and n$_{PRB}$ is a positive integer, v$_{shift2}$ is the cell-specific frequency shift of the downlink information, n is a quantity of antenna ports configured for CRSs of the cell in which the UE is located, $N_{symb}^{DL}$ is a quantity of OFDM symbols or SC-FDMA symbols in one downlink timeslot, a CFI is control format indicator information carried on a physical control format indicator channel PCFICH of the cell in which the UE is located, n$_s$ is an index of a timeslot in which the TTI is located, and l is the time domain index of the resource element location. The resource element location determined by using this method can be only a resource element location of a non-control region. For a method implementation principle in this embodiment, refer to a method implementation principle of step 301 in the embodiment shown in FIG. 4. Details are not described herein again.

Optionally, if the downlink information includes the PDCCH or the EPDCCH, that the processor 31 determines the resource element location according to the cell-specific frequency shift of the downlink information includes: the processor 31 determines a frequency domain index k of the resource element location according to a formula $$k = \begin{cases} 6m' + N_{sc}^{RB} n_{PRB} + (k' + v_{shift2}) \bmod 6; & l \neq l'' \\ 6m' + N_{sc}^{RB} n_{PRB} + (k' + m'' + v_{shift2}) \bmod 6; & l = l'' \end{cases},$$

determines an index of a symbol included in the TTI as a time domain index l of the resource element location, and determines the resource element location according to the frequency domain index of the resource element location and the time domain index of the resource element location, where m'=0 or 1, $$l'' = \begin{cases} 0 \text{ or } N_{symb}^{DL} - 3; & \text{if } n = 1 \text{ or } 2 \\ 0, 1, \text{ or } N_{symb}^{DL} - 3; & \text{if } n = 4 \end{cases},$$

k'=0 or 3, $N_{sc}^{RB}$ is a frequency domain resource block size, n$_{PRB}$ is a physical resource block number and n$_{PRB}$ is a positive integer, v$_{shift2}$ is the cell-specific frequency shift of the downlink information, n is a quantity of antenna ports configured for CRSs of the cell in which the UE is located, $N_{symb}^{DL}$ is a quantity of OFDM symbols or SC-FDMA symbols in one downlink timeslot, m" is any one or a combination of −2, −1, 1, or 2, and the symbol is an OFDM symbol or an SC-FDMA symbol. In this method, considering that a frequency domain resource or time domain resource used by the UE within the TTI less than or equal to the time length of one timeslot may be different from that used by UE within a TTI whose duration is 1 ms in an existing LTE system, the resource element location may be set to a resource element location of a non-control region or may be set to a resource element location of a control region.

Optionally, if the downlink information includes the PDCCH or the EPDCCH, that the processor 31 determines the resource element location according to the cell-specific frequency shift of the downlink information includes: the processor 31 determines a frequency domain index k of the resource element location according to a formula $$k = \begin{cases} 6m' + N_{sc}^{RB} n_{PRB} + (k' + v_{shift2}) \bmod 6; & l \neq l'' \\ 6m' + N_{sc}^{RB} n_{PRB} + (k' + m'' + v_{shift2}) \bmod 6; & l = l'' \end{cases},$$

determines an index of a symbol included in the TTI as a time domain index l of the resource element location, and determines the resource element location according to the frequency domain index of the resource element location and the time domain index of the resource element location, where m'=0 or 1, $$l'' = \begin{cases} 0 \text{ or } N_{symb}^{DL} - 3; & \text{if } n_s \bmod 2 = 1 \text{ and } n = 1 \text{ or } 2 \\ 0, 1, \text{ or } N_{symb}^{DL} - 3; & \text{if } n_s \bmod 2 = 1 \text{ and } n = 4 \\ (0 \text{ to } CFI - 1) \text{ or } N_{symb}^{DL} - 3; & \text{if } n_s \bmod 2 = 0 \text{ and } n = 1 \text{ or } 2 \\ (0 \text{ to } \max(CFI - 1, 1)) \text{ or } N_{symb}^{DL} - 3; & \text{if } n_s \bmod 2 = 0 \text{ and } n = 4 \end{cases},$$

k'=0 or 3, $N_{sc}^{RB}$ is a frequency domain resource block size, n$_{PRB}$ is a physical resource block number and n$_{PRB}$ is a positive integer, v$_{shift2}$ is the cell-specific frequency shift of the downlink information, n is a quantity of antenna ports configured for CRSs of the cell in which the UE is located, $N_{symb}^{DL}$ is a quantity of OFDM symbols or SC-FDMA symbols in one downlink timeslot, m" is any one or a combination of −2, −1, 1, or 2, a CFI is control format indicator information carried on a physical control format indicator channel PCFICH of the cell in which the UE is located, n$_s$ is an index of a timeslot in which the TTI is located, and the symbol is an OFDM symbol or an SC-FDMA symbol. In this method, considering that a frequency domain resource or time domain resource used by the UE within the TTI less than or equal to the time length of one timeslot may be the same as that used by UE within a TTI whose duration is 1 ms in an existing LTE system, the resource element location can be set only to a resource element location of a non-control region.

Optionally, the processor 31 is further configured to determine the cell-specific frequency shift v$_{shift1}$ of the CRS according to a formula v$_{shift1}$=$N_{ID}^{cell}$ mod 6, where $N_{ID}^{cell}$ is a physical layer cell identifier of the cell in which the UE is located.

The UE provided in this embodiment may be configured to perform the technical solution of the downlink information processing method in any one of the embodiments shown in FIG. 2 to FIG. 6B, and implementation principles and technical effects thereof are similar. Details are not described herein again.

Embodiment 20

Figure 15:
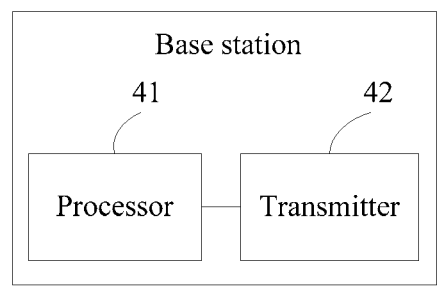
FIG. 15 is a schematic structural diagram of a base station according to Embodiment 20 of the present invention.

FIG. 15 is a schematic structural diagram of a base station according to Embodiment 20 of the present invention. As shown in FIG. 15, the base station includes a processor 41 and a transmitter 42. The processor 41 is configured to determine that a cell-specific frequency shift of downlink information is equal to a cell-specific frequency shift of a cell-specific reference signal CRS, where the CRS is a cell-specific reference signal sent by the base station. The processor 41 is further configured to determine a resource element location according to the cell-specific frequency shift of the downlink information, where duration of a transmission time interval TTI to which the resource element location belongs is less than or equal to a time length of one timeslot. The transmitter 42 sends the downlink information to UE at the resource element location. For a method implementation principle in this embodiment, refer to a method implementation principle in the embodiment shown in FIG. 7. Details are not described herein again.

Optionally, the downlink information includes any one of a demodulation reference signal DMRS, a physical downlink control channel PDCCH, or an enhanced physical downlink control channel EPDCCH.

Optionally, if the downlink information includes the DMRS and the duration of the TTI is equal to the time length of one timeslot, that the processor 41 determines the resource element location according to the cell-specific frequency shift of the downlink information includes: the processor 41 determines a frequency domain index k of the resource element location according to the cell-specific frequency shift of the downlink information; determines a time domain index of the resource element location according to a time-domain intermediate variable or determines a time domain index of the resource element location according to a time-domain intermediate variable and a CFI, where the time-domain intermediate variable is a variable determined according to a type of a subframe in which the TTI is located, and the CFI is control format indicator information carried on a physical control format indicator channel PCFICH sent by the base station; and determines the resource element location according to the frequency domain index of the resource element location and the time domain index of the resource element location. For a method implementation principle in this embodiment, refer to a method implementation principle in the embodiment shown in FIG. 8. Details are not described herein again.

Optionally, in this embodiment, that the processor 41 determines a frequency domain index k of the resource element location according to the cell-specific frequency shift of the downlink information includes: the processor 41 determines the frequency domain index k of the resource element location according to a formula $k=3m'+N_{sc}^{RB}n_{PRB}+k'+(v_{shift2}) \mod 3+1$, where $m'=0, 1,$ or $2$, $k'=1$ or $0$, $N_{sc}^{RB}$ is a frequency domain resource block size, $n_{PRB}$ is a physical resource block number and $n_{PRB}$ is a positive integer, and $v_{shift2}$ is the cell-specific frequency shift of the downlink information. For a method implementation principle in this embodiment, refer to a method implementation principle of step 701 in the embodiment shown in FIG. 8. Details are not described herein again.

Optionally, when a resource element location for sending a downlink signal may be set in a control region or a non-control region, that the processor 41 determines a time domain index of the resource element location according to a time-domain intermediate variable includes: the processor 41 determines the time domain index l of the resource element location according to a formula $l=l' \mod 2$, where l' is the time-domain intermediate variable, $$l' = \begin{cases} 0, 1, 2, \text{ or } 3; & \text{if } n_s \mod 2 = 0 \text{ and the } TTI \text{ is in a special} \\ & \text{subframe of configuration } 1, 2, 6, \text{ or } 7 \\ 0 \text{ or } 1; & \text{if the } TTI \text{ is in a subframe other than a} \\ & \text{special subframe of configuration } 1, 2, 6, \text{ or } 7 \end{cases},$$

and $n_s$ is an index of a timeslot in which the TTI is located. For a method implementation principle in this embodiment, refer to a method implementation principle of step 702 in the embodiment shown in FIG. 8. Details are not described herein again.

Optionally, when a resource element location for sending a downlink signal can be set only in a non-control region, that the processor 41 determines a time domain index of the resource element location according to a time-domain intermediate variable and a CFI includes: the processor 41 determines the time domain index l of the resource element location according to a formula $$l = \begin{cases} l' \mod 2 + CFI; & \text{if } n_s \mod 2 = 0 \text{ and the } TTI \text{ is} \\ & \text{in a special subframe of configuration} \\ & 1, 2, 6, \text{ or } 7 \\ l' \mod 2 + CFI + 3\lfloor l'/2 \rfloor; & \text{if } n_s \mod 2 = 0 \text{ and the } TTI \text{ is} \\ & \text{in a special subframe of configuration} \\ & 1, 2, 6, \text{ or } 7 \end{cases},$$

where $n_s$ is an index of a timeslot in which the TTI is located, l' is the time-domain intermediate variable, and $$l' = \begin{cases} 0, 1, 2, \text{ or } 3; & \text{if } n_s \mod 2 = 0 \text{ and the } TTI \text{ is in a special} \\ & \text{subframe of configuration } 1, 2, 6, \text{ or } 7 \\ 0 \text{ or } 1; & \text{if the } TTI \text{ is in a subframe other than a} \\ & \text{special subframe of configuration } 1, 2, 6, \text{ or } 7 \end{cases}.$$

For a method implementation principle in this embodiment, refer to a method implementation principle of step 702 in the embodiment shown in FIG. 8. Details are not described herein again.

Optionally, if the downlink information includes the DMRS and the duration of the TTI is greater than or equal to a time length of one symbol and less than the time length of one timeslot, that the processor 41 determines the resource element location according to the cell-specific frequency shift of the downlink information includes: the processor 41 determines a frequency domain index of the resource element location according to the cell-specific frequency shift of the downlink information, determines an index of a symbol included in the TTI as a time domain index of the resource element location, where the symbol is an OFDM symbol or an SC-FDMA symbol, and determines the resource element location according to the frequency domain index of the resource element location and the time domain index of the resource element location. For a method implementation principle in this embodiment, refer to a method implementation principle in the embodiment shown in FIG. 9. Details are not described herein again.

Optionally, in this embodiment, that the processor 41 determines a frequency domain index k of the resource element location according to the cell-specific frequency shift of the downlink information includes: the processor 41 determines the frequency domain index k of the resource element location according to a formula $k=6m'++(k'+v_{shift2})$ mod 6; $l \neq l''$, $m'=0$ or 1, $k'=0$ or 3, where $$l'' = \begin{cases} 0 \text{ or } N_{symb}^{DL} - 3; & \text{if } n = 1 \text{ or } 2 \\ 0, 1, \text{ or } N_{symb}^{DL} - 3; & \text{if } n = 4 \end{cases},$$

$N_{sc}^{RB}$ is a frequency domain resource block size, $n_{PRB}$ is a physical resource block number and $n_{PRB}$ is a positive integer, $v_{shift2}$ is the cell-specific frequency shift of the downlink information, n is a quantity of antenna ports configured for CRSs sent by the base station, $N_{symb}^{DL}$ is a quantity of OFDM symbols or SC-FDMA symbols in one downlink timeslot, and l is the time domain index of the resource element location. The resource element location determined by using this method may be a resource element location of a non-control region or may be a resource element location of a control region. For a method implementation principle in this embodiment, refer to a method implementation principle of step 801 in the embodiment shown in FIG. 9. Details are not described herein again.

Optionally, in this embodiment, that the processor 41 determines a frequency domain index k of the resource element location according to the cell-specific frequency shift of the downlink information includes: the processor 41 determines the frequency domain index k of the resource element location according to a formula $k=6m'+N_{sc}^{RB}n_{PRB}+(k'+v_{shift2})$ mod 6; $l \neq l''$, where $m'=0$ or 1, $k'=0$ or 3, $$l'' = \begin{cases} 0 \text{ or } N_{symb}^{DL} - 3; & \text{if } n_s \bmod 2 = 1 \text{ and } n = 1 \text{ or } 2 \\ 0, 1, \text{ or } N_{symb}^{DL} - 3; & \text{if } n_s \bmod 2 = 1 \text{ and } n = 4 \\ (0 \text{ to } CFI - 1) \text{ or } N_{symb}^{DL} - 3; & \text{if } n_s \bmod 2 = 0 \text{ and } n = 1 \text{ or } 2, \\ (0 \text{ to } \max(CFI - 1, 1)) \text{ or } & \text{if } n_s \bmod 2 = 0 \text{ and } n = 4 \\ N_{symb}^{DL} - 3; \end{cases}$$

$N_{sc}^{RB}$ is a frequency domain resource block size, $n_{PRB}$ is a physical resource block number and $n_{PRB}$ is a positive integer, $v_{shift2}$ is the cell-specific frequency shift of the downlink information, n is a quantity of antenna ports configured for CRSs sent by the base station, $N_{symb}^{DL}$ is a quantity of OFDM symbols or SC-FDMA symbols in one downlink timeslot, a CFI is control format indicator information carried on a physical control format indicator channel PCFICH sent by the base station, $n_s$ is an index of a timeslot in which the TTI is located, and l is the time domain index of the resource element location. The resource element location determined by using this method can be only a resource element location of a non-control region. For a method implementation principle in this embodiment, refer to a method implementation principle of step 801 in the embodiment shown in FIG. 9. Details are not described herein again.

Optionally, if the downlink information includes the PDCCH or the EPDCCH, that the processor 41 determines the resource element location according to the cell-specific frequency shift of the downlink information includes: the processor 41 determines a frequency domain index k of the resource element location according to a formula $$k = \begin{cases} 6m' + N_{sc}^{RB}n_{PRB} + (k' + v_{shift2}) \bmod 6; & l \neq l'' \\ 6m' + N_{sc}^{RB}n_{PRB} + (k' + m'' + v_{shift2}) \bmod 6; & l = l'' \end{cases},$$

determines an index of a symbol included in the TTI as a time domain index l of the resource element location, and determines the resource element location according to the frequency domain index of the resource element location and the time domain index of the resource element location, where $m'=0$ or 1, $$l'' = \begin{cases} 0 \text{ or } N_{symb}^{DL} - 3; & \text{if } n = 1 \text{ or } 2 \\ 0, 1, \text{ or } N_{symb}^{DL} - 3; & \text{if } n = 4 \end{cases},$$

$k'=0$ or 3, $N_{sc}^{RB}$ is a frequency domain resource block size, $n_{PRB}$ is a physical resource block number and $n_{PRB}$ is a positive integer, $v_{shift2}$ is the cell-specific frequency shift of the downlink information, n is a quantity of antenna ports configured for CRSs sent by the base station, $N_{symb}^{DL}$ is a quantity of OFDM symbols or SC-FDMA symbols in one downlink timeslot, m" is any one or a combination of −2, −1, 1, or 2, and the symbol is an OFDM symbol or an SC-FDMA symbol. In this method, considering that a frequency domain resource or time domain resource used by the base station within the TTI less than or equal to the time length of one timeslot may be different from that used by a base station within a TTI whose duration is 1 ms in an existing LTE system, the resource element location may be set to a resource element location of a non-control region or may be set to a resource element location of a control region. For a method implementation principle in this embodiment, refer to a method implementation principle in the embodiment shown in FIG. 10. Details are not described herein again.

Optionally, if the downlink information includes the PDCCH or the EPDCCH, that the processor 41 determines the resource element location according to the cell-specific frequency shift of the downlink information includes: the processor 41 determines a frequency domain index k of the resource element location according to a formula $$k = \begin{cases} 6m' + N_{sc}^{RB}n_{PRB} + (k' + v_{shift2}) \bmod 6; & l \neq l'' \\ 6m' + N_{sc}^{RB}n_{PRB} + (k' + m'' + v_{shift2}) \bmod 6; & l = l'' \end{cases},$$

determines an index of a symbol included in the TTI as a time domain index l of the resource element location, and determines the resource element location according to the frequency domain index of the resource element location and the time domain index of the resource element location, where $m'=0$ or 1, $$l'' = \begin{cases} 0 \text{ or } N_{symb}^{DL} - 3; & \text{if } n_s \bmod 2 = 1 \text{ and } n = 1 \text{ or } 2 \\ 0, 1, \text{ or } N_{symb}^{DL} - 3; & \text{if } n_s \bmod 2 = 1 \text{ and } n = 4 \\ (0 \text{ to } CFI - 1) \text{ or } N_{symb}^{DL} - 3; & \text{if } n_s \bmod 2 = 0 \text{ and } n = 1 \text{ or } 2, \\ (0 \text{ to } \max(CFI - 1, 1)) \text{ or } & \text{if } n_s \bmod 2 = 0 \text{ and } n = 4 \\ N_{symb}^{DL} - 3; \end{cases}$$

k'=0 or 3, $N_{sc}^{RB}$ is a frequency domain resource block size, $n_{PRB}$ is a physical resource block number and $n_{PRB}$ is a positive integer, $v_{shift2}$ is the cell-specific frequency shift of the downlink information, n is a quantity of antenna ports configured for CRSs sent by the base station, $N_{symb}^{DL}$ is a quantity of OFDM symbols or SC-FDMA symbols in one downlink timeslot, m" is any one or a combination of −2, −1, 1, or 2, a CFI is format indicator information carried on a physical control format indicator channel PCFICH sent by the base station, $n_s$ is an index of a timeslot in which the TTI is located, and the symbol is an OFDM symbol or an SC-FDMA symbol. In this method, considering that a frequency domain resource or time domain resource used by the base station within the TTI less than or equal to the time length of one timeslot may be the same as that used by a base station within a TTI whose duration is 1 ms in an existing LTE system, the resource element location can be set only to a resource element location of a non-control region. For a method implementation principle in this embodiment, refer to a method implementation principle in the embodiment shown in FIG. 10. Details are not described herein again.

Optionally, the processor 41 is further configured to determine the cell-specific frequency shift $v_{shift1}$ of the CRS according to a formula $v_{shift1}=N_{ID}^{cell} \mod 6$, where $N_{ID}^{cell}$ is a physical layer cell identifier of a cell in which the UE is located.

The base station provided in this embodiment may be configured to perform the technical solution of the downlink information processing method in any one of the embodiments shown in FIG. 7 to FIG. 11B, and implementation principles and technical effects thereof are similar. Details are not described herein again.

An embodiment of the present invention further provides a communications system, including any UE provided in the embodiment shown in FIG. 14 and any base station provided in the embodiment shown in FIG. 15.

The UE in this embodiment may be configured to perform the technical solution of the downlink information processing method in any one of the embodiments shown in FIG. 2 to FIG. 6B, the base station in this embodiment may be configured to perform the technical solution of the downlink information processing method in any one of the embodiments shown in FIG. 7 to FIG. 11B, and implementation principles and technical effects thereof are similar. Details are not described herein again.

A person of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a read-only memory (ROM), a random access memory (RAM), a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, a person of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A downlink information processing method, comprising:

determining, by a terminal device, a cell-specific frequency shift of downlink information, wherein the cell-specific frequency shift of downlink information is equal to a cell-specific frequency shift of a cell-specific reference signal (CRS) of a cell in which the terminal device is located, a pattern of the CRS is one of three CRS patterns, and the downlink information comprises one of a demodulation reference signal (DMRS), a physical downlink control channel (PDCCH), and an enhanced physical downlink control channel (EPDCCH);

after determining the cell-specific frequency shift of the downlink information, determining, by the terminal device, a resource element location according to the determined cell-specific frequency shift of the downlink information, wherein a duration of a transmission time interval (TTI) to which the resource element location belongs is less than or equal to a time length of one timeslot;

receiving, by the terminal device, the downlink information at the resource element location; and demodulating, by the terminal device, downlink data according to the downlink information.

2. The method according to claim 1, wherein, if the downlink information comprises the DMRS and the duration of the TTI is equal to the time length of one timeslot, the determining, by the terminal device, a resource element location according to the cell-specific frequency shift of the downlink information comprises:

determining, by the terminal device, a frequency domain index of the resource element location according to the cell-specific frequency shift of the downlink information;

determining, by the terminal device, a time domain index of the resource element location according to a time-domain intermediate variable and a control format indicator (CFI), wherein the time-domain intermediate variable comprises a variable determined according to a type of a subframe in which the TTI is located, and the CFI comprises control format indicator information carried on a physical control format indicator channel (PCFICH) of the cell in which the terminal device is located; and determining, by the terminal device, the resource element location according to the frequency domain index of the resource element location and the time domain index of the resource element location.

3. The method according to claim 2, wherein the determining, by the terminal device, a frequency domain index of the resource element location according to the cell-specific frequency shift of the downlink information comprises:

determining, by the terminal device, the frequency domain index k of the resource element location according to a formula $k=3m'+N_{sc}^{RB}n_{PRB}+k'+(v_{shift2}) \mod 3+1$, wherein m=0, 1, or 2 k'=0 or 1, $N_{sc}^{RB}$ represents a frequency domain resource block size, $n_{PRB}$ represents a physical resource block number and is a positive integer, and $v_{shift2}$ represents the cell-specific frequency shift of the downlink information.

4. The method according to claim 2, wherein the determining a time domain index of the resource element location according to a time-domain intermediate variable and a control format indicator (CFI) comprises:

determining, by the terminal device, the time domain index l of the resource element location according to a formula $$l = \begin{cases} l' \bmod 2 + CFI; & \text{if } n_s \bmod 2 = 0 \text{ and the } TTI \text{ is} \\ & \text{in a special subframe of configuration} \\ & 1, 2, 6, \text{ or } 7 \\ l' \bmod 2 + CFI + 3\lfloor l'/2 \rfloor; & \text{if } n_s \bmod 2 = 0 \text{ and the } TTI \text{ is} \\ & \text{in a special subframe of configuration} \\ & 1, 2, 6, \text{ or } 7 \end{cases},$$

wherein $n_s$ represents an index of a timeslot in which the TTI is located, l' represents the time-domain intermediate variable, and $$l' = \begin{cases} 0, 1, 2, \text{ or } 3; & \text{if } n_s \bmod 2 = 0 \text{ and the } TTI \text{ is in a special} \\ & \text{subframe of configuration } 1, 2, 6, \text{ or } 7 \\ 0 \text{ or } 1; & \text{if the } TTI \text{ is in a subframe other than a} \\ & \text{special subframe of configuration } 1, 2, 6, \text{ or } 7 \end{cases}.$$

5. The method according to claim 1, wherein if the downlink information comprises the DMRS and the duration of the TTI is greater than or equal to a time length of one symbol and less than the time length of one timeslot, the determining, by the terminal device, a resource element location according to the cell-specific frequency shift of the downlink information comprises:

determining, by the terminal device, a frequency domain index of the resource element location according to the cell-specific frequency shift of the downlink information;

determining, by the terminal device, an index of a symbol included in the TTI as a time domain index of the resource element location, wherein the symbol is an orthogonal frequency division multiplexing (OFDM) symbol or a single-carrier frequency division multiple access (SC-FDMA) symbol; and determining, by the terminal device, the resource element location according to the frequency domain index of the resource element location and the time domain index of the resource element location.

6. The method according to claim 5, wherein the determining, by the terminal device, a frequency domain index of the resource element location according to the cell-specific frequency shift of the downlink information comprises:

determining, by the terminal device, the frequency domain index k of the resource element location according to a formula $$k = 6m' + N_{sc}^{RB} n_{PRB} + (k' + v_{shift2}) \bmod 6; \ l \neq l'',$$

wherein m'=0 or 1, k'=0 or 3

$$l'' = \begin{cases} 0 \text{ or } N_{symb}^{DL} - 3; & \text{if } n_s \bmod 2 = 1 \text{ and } n = 1 \text{ or } 2 \\ 0, 1, \text{ or } N_{symb}^{DL} - 3; & \text{if } n_s \bmod 2 = 1 \text{ and } n = 4 \\ (0 \text{ to } CFI - 1) \text{ or } N_{symb}^{DL} - 3; & \text{if } n_s \bmod 2 = 0 \text{ and } n = 1 \text{ or } 2, \\ (0 \text{ to } \max(CFI - 1, 1)) \text{ or } & \text{if } n_s \bmod 2 = 0 \text{ and } n = 4 \\ N_{symb}^{DL} - 3; \end{cases}$$

$N_{sc}^{RB}$ represents a frequency domain resource block size, $n_{PRB}$ represents a physical resource block number and is a positive integer, $v_{shift2}$ represents the cell-specific frequency shift of the downlink information, n represents a quantity of antenna ports configured for CRSs of the cell in which the terminal device is located, $N_{symb}^{DL}$ represents a quantity of orthogonal frequency division multiplexing OFDM symbols or single-carrier frequency division multiple access SC-FDMA symbols in one downlink timeslot, a control format indicator (CFI) represents control format indicator information carried on a physical control format indicator channel (PCFICH) of the cell in which the terminal device is located, $n_s$ represents an index of a timeslot in which the TTI is located, and l represents the time domain index of the resource element location.

7. A terminal device comprising:
at least one processor;
a non-transitory computer-readable storage medium coupled to the processor and storing programming instructions for execution by the at least one processor, the programming instructions instruct the at least one processor to:
determine a cell-specific frequency shift of downlink information, wherein the cell-specific frequency shift of downlink information is equal to a cell-specific frequency shift of a cell-specific reference signal (CRS) of a cell in which the terminal device is located, a pattern of the CRS is one of three CRS patterns, and the downlink information comprises one of a demodulation reference signal (DMRS), a physical downlink control channel (PDCCH), and an enhanced physical downlink control channel (EPDCCH); and
after determining the cell-specific frequency shift of the downlink information, determine a resource element location according to the determined cell-specific frequency shift of the downlink information, wherein a duration of a transmission time interval (TTI) to which the resource element location belongs is less than or equal to a time length of one timeslot; and
a receiver configured to receive the downlink information at the resource element location, wherein the programming instructions further instruct the at least one processor to demodulate downlink data according to the downlink information.

8. The terminal device according to claim 7, wherein, if the downlink information comprises the DMRS and the duration of the TTI is equal to the time length of one timeslot, determining the resource element location according to the cell-specific frequency shift of the downlink information comprises:

determining a frequency domain index of the resource element location according to the cell-specific frequency shift of the downlink information;

determining a time domain index of the resource element location according to a time-domain intermediate variable and a control format indicator (CFI), wherein the time-domain intermediate variable comprises a variable determined according to a type of a subframe in which the TTI is located, and the CFI comprises control format indicator information carried on a physical control format indicator channel (PCFICH) of the cell in which the terminal device is located; and determining the resource element location according to the frequency domain index of the resource element location and the time domain index of the resource element location.

9. The terminal device according to claim 8, wherein the programming instructions instruct the at least one processor to determine a frequency domain index k of the resource element location according to the cell-specific frequency shift of the downlink information by determining the frequency domain index k of the resource element location according to a formula k=3m'+$N_{sc}^{RB}$$n_{PRB}$+k'+($v_{shift2}$) mod 3+1, wherein m'=0, 1, or 2 k'=0 or 1, $N_{sc}^{RB}$ represents a frequency domain resource block size, $n_{PRB}$ represents a physical resource block number and is a positive integer, and $v_{shift2}$ represents the cell-specific frequency shift of the downlink information.

10. The terminal device according to claim 8, wherein the programming instructions instruct the at least one processor to determine a time domain index of the resource element location according to a time-domain intermediate variable and a control format indicator (CFI) by determining the time domain index l of the resource element location according to a formula $$l = \begin{cases} l' \bmod 2 + CFI; & \text{if } n_s \bmod 2 = 0 \text{ and the TTI is} \\ & \text{in a special subframe of configuration} \\ & 1, 2, 6, \text{ or } 7 \\ l' \bmod 2 + CFI + 3\lfloor l'/2 \rfloor; & \text{if } n_s \bmod 2 = 0 \text{ and the TTI is} \\ & \text{in a special subframe of configuration} \\ & 1, 2, 6, \text{ or } 7 \end{cases},$$

wherein $n_s$ represents an index of a timeslot in which the TTI is located, l' represents the time-domain intermediate variable, and $$l' = \begin{cases} 0, 1, 2, \text{ or } 3; & \text{if } n_s \bmod 2 = 0 \text{ and the TTI is in a special} \\ & \text{subframe of configuration } 1, 2, 6, \text{ or } 7 \\ 0 \text{ or } 1; & \text{if the TTI is in a subframe other than a} \\ & \text{special subframe of configuration } 1, 2, 6, \text{ or } 7 \end{cases}.$$

11. The terminal device according to claim 7, wherein if the downlink information comprises the DMRS and the duration of the TTI is greater than or equal to a time length of one symbol and less than the time length of one timeslot, the programming instructions instruct the at least one processor to determine the resource element location according to the cell-specific frequency shift of the downlink information by:

determining a frequency domain index of the resource element location according to the cell-specific frequency shift of the downlink information;

determining an index of a symbol comprised in the TTI as a time domain index of the resource element location, wherein the symbol is an orthogonal frequency division multiplexing (OFDM) symbol or a single-carrier frequency division multiple access (SC-FDMA) symbol; and determining the resource element location according to the frequency domain index of the resource element location and the time domain index of the resource element location.

12. The terminal device according to claim 11, wherein the programming instructions instruct the at least one processor to determine a frequency domain index of the resource element location according to the cell-specific frequency shift of the downlink information by determining the frequency domain index k of the resource element location according to a formula k=6m'+$N_{sc}^{RB}$$n_{PRB}$+(k'+$v_{shift2}$) mod 6; l≠l", wherein m'=0 or 1, k'=0 or 3, $$l'' = \begin{cases} 0 \text{ or } N_{symb}^{DL} - 3; & \text{if } n_s \bmod 2 = 1 \text{ and } n = 1 \text{ or } 2 \\ 0, 1, \text{ or } N_{symb}^{DL} - 3; & \text{if } n_s \bmod 2 = 1 \text{ and } n = 4 \\ (0 \text{ to } CFI - 1) \text{ or } N_{symb}^{DL} - 3; & \text{if } n_s \bmod 2 = 0 \text{ and } n = 1 \text{ or } 2, \\ (0 \text{ to } \max(CFI - 1, 1)) \text{ or } & \text{if } n_s \bmod 2 = 0 \text{ and } n = 4 \\ N_{symb}^{DL} - 3; \end{cases}$$

$N_{sc}^{RB}$ represents a frequency domain resource block size, $n_{PRB}$ represents a physical resource block number and is a positive integer, $v_{shift2}$ represents the cell-specific frequency shift of the downlink information, n represents a quantity of antenna ports configured for CRSs of the cell in which the terminal device is located, $N_{symb}^{DL}$ represents a quantity of orthogonal frequency division multiplexing (OFDM) symbols or single-carrier frequency division multiple access (SC-FDMA) symbols in one downlink timeslot, a control format indicator (CFI) comprises control format indicator information carried on a physical control format indicator channel (PCFICH) of the cell in which the terminal device is located, $n_s$ represents an index of a timeslot in which the TTI is located, and l represents the time domain index of the resource element location.

13. A base station comprising:
at least one processor;
a non-transitory computer-readable storage medium coupled to the processor and storing programming instructions for execution by the at least one processor, the programming instructions instruct the at least one processor to:
determine a cell-specific frequency shift of downlink information, wherein the cell-specific frequency shift of downlink information is equal to a cell-specific frequency shift of a cell-specific reference signal (CRS) sent by the base station, a pattern of the CRS is one of three CRS patterns, and the downlink information comprises one of a demodulation reference signal (DMRS), a physical downlink control channel (PDCCH), and an enhanced physical downlink control channel (EPDCCH); and
after determining the cell-specific frequency shift of the downlink information, determine a resource element location according to the determined cell-specific frequency shift of the downlink information, wherein a duration of a transmission time interval (TTI) to which the resource element location belongs is less than or equal to a time length of one timeslot associated with a frequency of subcarrier spacing of a communications system; and a transmitter configured to send the downlink information to a terminal device at the resource element location.

14. The base station according to claim 13, wherein, if the downlink information comprises the DMRS and the duration of the TTI is equal to the time length of one timeslot, the programming instructions instruct the at least one processor to determine the resource element location according to the cell-specific frequency shift of the downlink information by:

determining a frequency domain index of the resource element location according to the cell-specific frequency shift of the downlink information;

determining a time domain index of the resource element location according to a time-domain intermediate variable and a control format indicator (CFI), wherein the time-domain intermediate variable comprises a variable determined according to a type of a subframe in which the TTI is located, and the CFI comprises control format indicator information carried on a physical control format indicator channel (PCFICH) sent by the base station; and determining the resource element location according to the frequency domain index of the resource element location and the time domain index of the resource element location.

15. The base station according to claim 14, wherein the programming instructions instruct the at least one processor to determine a frequency domain index k of the resource element location according to the cell-specific frequency shift of the downlink information by:

determining the frequency domain index k of the resource element location according to a formula $k=3m'+N_{sc}^{RB} - n_{PRP}+k'+(v_{shift2}) \bmod 3+1$, wherein $m'=0$, 1, or 2 $k'=1$ or 0, $N_{sc}^{RB}$ represents a frequency domain resource block size, $n_{PRB}$ represents a physical resource block number and is a positive integer, and $v_{shift2}$ represents the cell-specific frequency shift of the downlink information.

16. The base station according to claim 14, wherein the programming instructions instruct the at least one processor to determine a time domain index of the resource element location according to a time-domain intermediate variable and a control format indicator (CFI) by:

determining the time domain index l of the resource element location according to a formula $$l = \begin{cases} l' \bmod 2 + CFI; & \text{if } n_s \bmod 2 = 0 \text{ and the } TTI \text{ is} \\ & \text{in a special subframe of configuration} \\ & 1, 2, 6, \text{ or } 7 \\ l' \bmod 2 + CFI + 3\lfloor l'/2 \rfloor; & \text{if } n_s \bmod 2 = 0 \text{ and the } TTI \text{ is} \\ & \text{in a special subframe of configuration} \\ & 1, 2, 6, \text{ or } 7 \end{cases}$$

wherein $n_s$ represents an index of a timeslot in which the TTI is located, l' represents the time-domain intermediate variable, and $$l' = \begin{cases} 0, 1, 2, \text{ or } 3; & \text{if } n_s \bmod 2 = 0 \text{ and the } TTI \text{ is in a special} \\ & \text{subframe of configuration } 1, 2, 6, \text{ or } 7 \\ 0 \text{ or } 1; & \text{if the } TTI \text{ is in a subframe other than a} \\ & \text{special subframe of configuration } 1, 2, 6, \text{ or } 7 \end{cases}$$

17. The base station according to claim 13, wherein if the downlink information comprises the DMRS and the duration of the TTI is greater than or equal to a time length of one symbol and less than the time length of one timeslot, the programming instructions instruct the at least one processor to determine the resource element location according to the cell-specific frequency shift of the downlink information by:

determining a frequency domain index of the resource element location according to the cell-specific frequency shift of the downlink information, determining an index of a symbol comprised in the TTI as a time domain index of the resource element location, wherein the symbol is an orthogonal frequency division multiplexing (OFDM) symbol or a single-carrier frequency division multiple access (SC-FDMA) symbol, and determining the resource element location according to the frequency domain index of the resource element location and the time domain index of the resource element location.

18. The base station according to claim 17, wherein the programming instructions instruct the at least one processor to determine a frequency domain index of the resource element location according to the cell-specific frequency shift of the downlink information by:

determining the frequency domain index k of the resource element location according to a formula $k=6m'+N_{sc}^{RB} n_{PRB}+(k'+v_{shift2}) \bmod 6$; $l \neq l''$, wherein $m'=0$ or 1, $k'=0$ or 3

$$l'' = \begin{cases} 0 \text{ or } N_{symb}^{DL} - 3; & \text{if } n_s \bmod 2 = 1 \text{ and } n = 1 \text{ or } 2 \\ 0, 1, \text{ or } N_{symb}^{DL} - 3; & \text{if } n_s \bmod 2 = 1 \text{ and } n = 4 \\ (0 \text{ to } CFI - 1) \text{ or } N_{symb}^{DL} - 3; & \text{if } n_s \bmod 2 = 0 \text{ and } n = 1 \text{ or } 2, \\ (0 \text{ to } \max(CFI - 1, 1)) \text{ or } & \text{if } n_s \bmod 2 = 0 \text{ and } n = 4 \\ N_{symb}^{DL} - 3; \end{cases}$$

$N_{sc}^{RB}$ represents a frequency domain resource block size, $n_{PRB}$ represents a physical resource block number and is a positive integer, $v_{shift2}$ represents the cell-specific frequency shift of the downlink information, n represents a quantity of antenna ports configured for CRSs sent by the base station, $N_{symb}^{DL}$ represents a quantity of orthogonal frequency division multiplexing (OFDM) symbols or single-carrier frequency division multiple access (SC-FDMA) symbols in one downlink timeslot, a control format indicator (CFI) comprises control format indicator information carried on a physical control format indicator channel (PCFICH) sent by the base station, $n_s$ represents an index of a timeslot in which the TTI is located, and l represents the time domain index of the resource element location.

* * * * *

UNITED STATES PATENT AND TRADEMARK OFFICE
CERTIFICATE OF CORRECTION

PATENT NO. : 10,587,378 B2  
APPLICATION NO. : 15/895712  
DATED : March 10, 2020  
INVENTOR(S) : Jiafeng Shao and Sha Ma Page 1 of 2

It is certified that error appears in the above-identified patent and that said Letters Patent is hereby corrected as shown below:

On the Title Page

In Column 2, item (74), (Attorney, Agent, or Firm), Line 1, delete "Richard" and insert -- Richardson --, therefor.

In the Claims

In Column 82, Line 63, in Claim 3, delete "m=0, 1, or 2" and insert -- m'=0, 1, or 2, --, therefor.

In Column 83, Line 12, in Claim 4, delete "special subframe" and insert -- subframe other than a special subframe --, therefor.

In Column 83, Line 67, in Claim 6, delete "$v_{shift2}$)mod" and insert -- $v_{shift2}$) mod --, therefor.

In Column 84, Line 1, in Claim 6, delete "3" and insert -- 3, --, therefor.

In Column 85, Line 18, in Claim 9, delete "2" and insert -- 2, --, therefor.

In Column 85, Line 33, in Claim 10, delete "special subframe" and insert -- subframe other than a special subframe --, therefor.

In Column 87, Line 38, in Claim 15, delete "$n_{PRP}$" and insert -- $n_{PRB}$ --, therefor.

In Column 87, Line 39, in Claim 15, delete "2" and insert -- 2, --, therefor.

In Column 87, Line 54, in Claim 16, delete "special subframe" and insert -- subframe other than a special subframe --, therefor.

Signed and Sealed this  
Nineteenth Day of May, 2020

Andrei Iancu  
*Director of the United States Patent and Trademark Office*

In Column 88, Lines 36-37, in Claim 18, delete "$N_{sc}^{RB}$ $n_{PRB}$" and insert -- $N_{sc}^{RB}n_{PRB}$ --, therefor.

In Column 88, Line 37, in Claim 18, delete "3" and insert -- 3, --, therefor.